(12) United States Patent
McManus et al.

(10) Patent No.: US 6,729,669 B2
(45) Date of Patent: May 4, 2004

(54) SLIDE-OUT ROOM WITH ELEVATED TRAVEL

(75) Inventors: Patrick W. McManus, Osceola, IN (US); Martin P. McManus, Mishawaka, IN (US)

(73) Assignee: VT Holdings II, Inc., Reno, NV (US)

( * ) Notice: Subject to any disclaimer, the term of this patent is extended or adjusted under 35 U.S.C. 154(b) by 0 days.

(21) Appl. No.: 09/952,686

(22) Filed: Sep. 11, 2001

(65) Prior Publication Data

US 2002/0074816 A1 Jun. 20, 2002

Related U.S. Application Data

(60) Provisional application No. 60/231,795, filed on Sep. 11, 2000, provisional application No. 60/247,365, filed on Nov. 10, 2000, and provisional application No. 60/296,751, filed on Jun. 8, 2001.

(51) Int. Cl.$^7$ .................................................. B60P 3/34
(52) U.S. Cl. ................................... 296/26.13; 296/172
(58) Field of Search .......................... 296/26.13, 26.12, 296/170, 171, 172, 173, 175, 176, 165

(56) References Cited

U.S. PATENT DOCUMENTS

| 2,813,747 | A |   | 11/1957 | Rice, Jr. |         |
|-----------|---|---|---------|----------|---------|
| 3,106,750 | A |   | 10/1963 | Jarman |         |
| 3,719,386 | A |   | 3/1973 | Puckett et al. |    |
| 4,930,837 | A |   | 6/1990 | Marsh et al. |      |
| 5,491,933 | A |   | 2/1996 | Miller et al. |     |
| 5,567,003 | A |   | 10/1996 | Gill |             |
| 5,577,351 | A | * | 11/1996 | Dewald, Jr. et al. | 296/171 |
| 5,620,224 | A | * | 4/1997 | DiBiagio et al. | 296/171 |
| 5,658,032 | A |   | 8/1997 | Gardner |          |
| 5,706,612 | A |   | 1/1998 | Tillett |          |
| 5,787,650 | A |   | 8/1998 | Miller et al. |    |
| 5,788,306 | A | * | 8/1998 | DiBiagio et al. | 296/171 |
| 5,902,001 | A |   | 5/1999 | Schneider |        |
| 5,984,396 | A |   | 11/1999 | Schneider |       |
| 6,052,952 | A |   | 4/2000 | Frerichs et al. |  |
| 6,108,983 | A |   | 8/2000 | Dewald, Jr. et al. | |
| 6,109,683 | A | * | 8/2000 | Schneider ................ | 296/171 |
| 6,176,045 | B1 | * | 1/2001 | McManus et al. ...... | 296/26.13 |
| 6,182,401 | B1 |  | 2/2001 | McManus et al. |    |
| 6,202,362 | B1 |  | 3/2001 | McManus et al. |    |
| 6,227,607 | B1 |  | 5/2001 | Dewald, Jr. et al. | |
| 2002/0084663 | A1 | * | 7/2002 | McManus et al. ...... | 296/26.13 |
| 2002/0180232 | A1 | * | 12/2002 | Schneider et al. ..... | 296/26.13 |

FOREIGN PATENT DOCUMENTS

| AU | A-83 439-82 | 11/1982 |
| FR | 2360444 | 9/1978 |

* cited by examiner

*Primary Examiner*—Glenn Dayoan
*Assistant Examiner*—Hilary Gutman
(74) *Attorney, Agent, or Firm*—Baker & Daniels

(57) ABSTRACT

A lifting mechanism elevates a slide-out room above the floor of a vehicle as the room is moved between an extended and retracted position. The lifting assembly in one embodiment includes a pair of rollers which support the room and which move vertically to elevate the slide-out room. In other embodiments of the invention, the rollers are attached to rotatable levers, which rotate upon retraction of the slide-out room to elevate the slide-out room floor. Accordingly, the room is moved between the extended and retracted positions with minimal damaging contact with the finished floor surface of the vehicle.

34 Claims, 80 Drawing Sheets

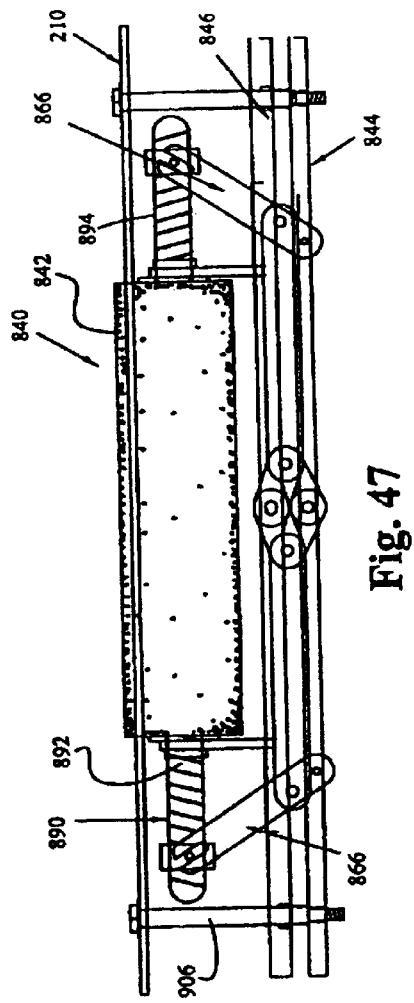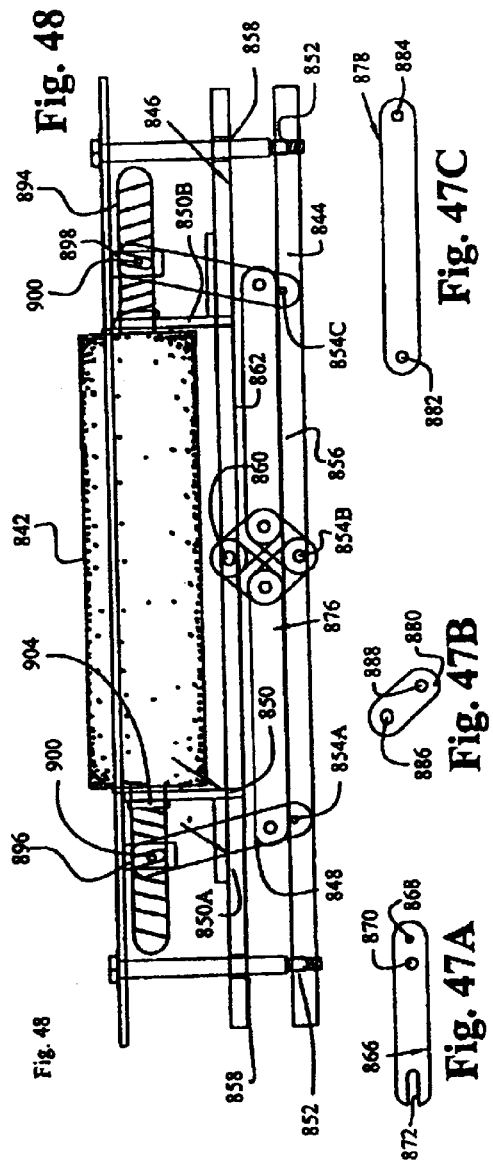

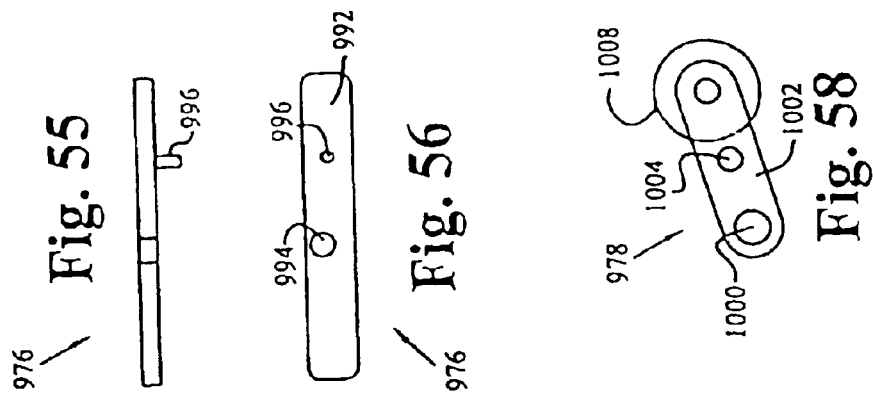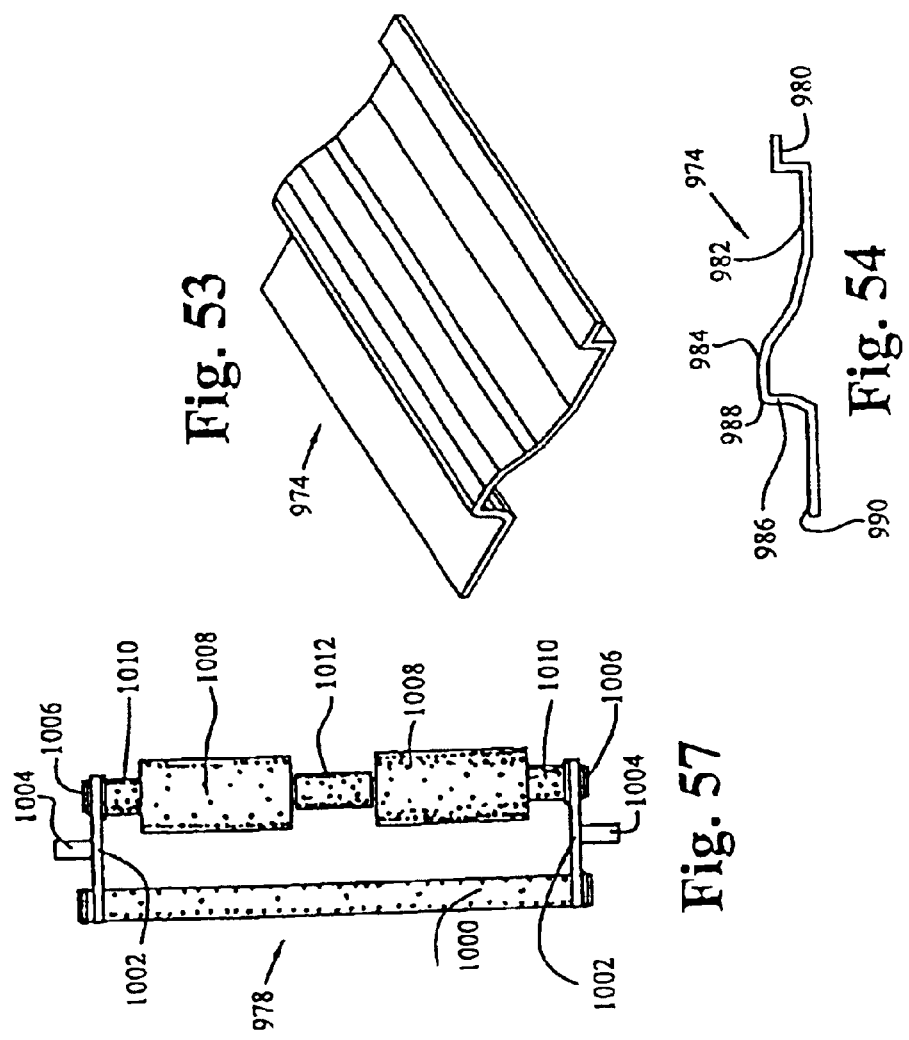

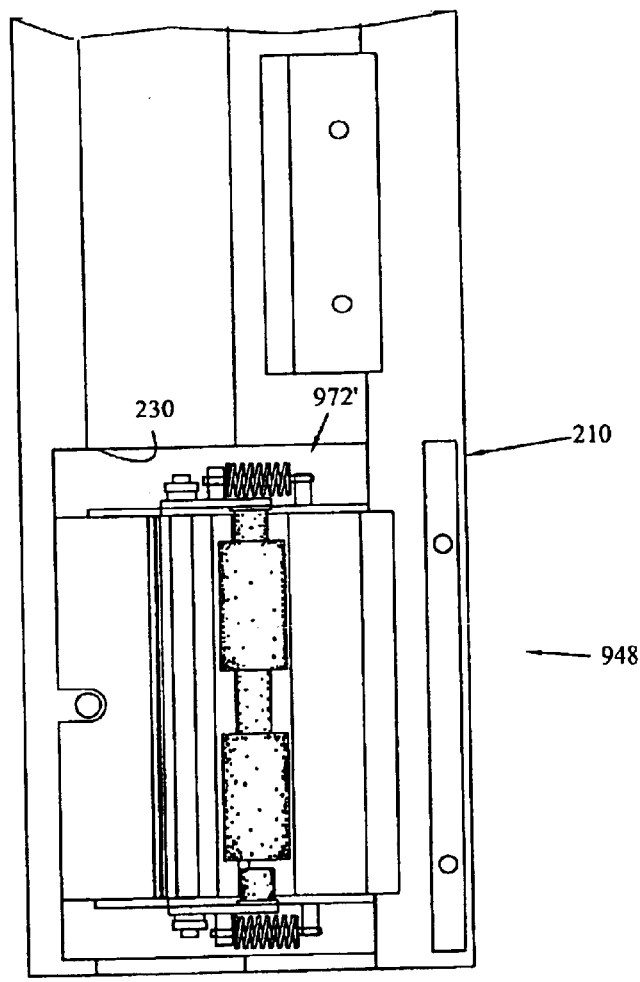
Fig. 67
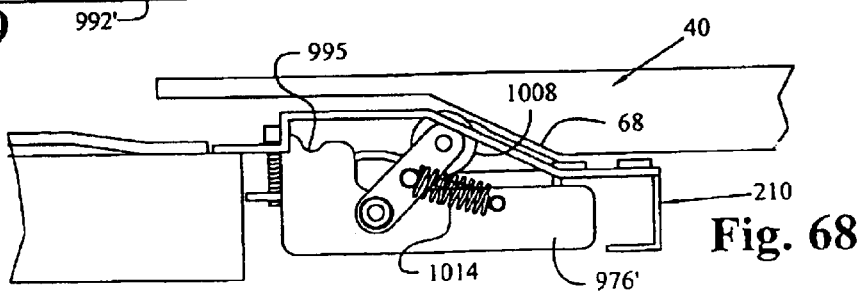
Fig. 69
Fig. 68

SLIDE-OUT ROOM WITH ELEVATED TRAVEL

FIELD OF THE INVENTION

This invention relates generally to slide-out rooms for use with vehicles, and more particularly, to a slide-out room which travels between an extended and retracted position without sliding on the finished floor surface of the interior of the vehicle.

BACKGROUND OF THE INVENTION

The width of recreational vehicles and manufactured housing units is limited by highway regulations. However, occupants of those structures commonly desire a greater amount of interior living space. Accordingly, it is common to provide recreational vehicles with at least one slide-out room which can be retracted into the main living area when the vehicle is being driven, and extended from the main living quarters to provide additional living space when the vehicle is parked. Such slide-out rooms may then be retracted during travel, thereby allowing the vehicle to be in compliance with maximum allowable width regulations on public roadways.

Slide-out rooms are typically extended and retracted through an opening in one of the side walls of the structure defining the main living area. The slide-out room includes a back wall, which is optimally in registry with the opening, when the slide-out room is in the fully retracted position within the main living quarters. It is desirable for the back wall of the room to register with the opening in the side wall of the vehicle so as to ensure that the opening is completely closed, and decals and other ornamental features of the vehicle side wall are aligned with similar features on the back wall of the slide-out room.

Conventional slide-out rooms are retracted into and extended out of the vehicle by a drive mechanism attached adjacent to a lower edge of the room. The room itself slides between the extended and retracted positions on top of, and in direct contact with, the finished surface of the floor of the vehicle. Over time, wear marks or other damage to the finished floor surface may occur. Vehicles having slide-out rooms are generally expensive and considered luxury items by purchasers. Accordingly, any unsightly signs of damage or wear to the vehicle are highly undesirable.

SUMMARY OF THE INVENTION

The objects of the invention have been accomplished by providing a mobile living quarters comprising a frame, a structure supported by the frame defining a main room including side walls, a ceiling and a floor, with one of the sidewalls defining an opening therethrough. A slide-out room is mounted for movement through the opening between a retracted position retracted into the main room and an extended position extended from the main room to provide an auxiliary living area. The slide-out room includes a back wall, sidewalls, a ceiling and a floor, and a lifting mechanism for lifting the slide-out room floor off of the main room floor during the retraction and extension of the slide-out room.

In the preferred embodiment of the invention, the lifting mechanism is comprised of rails extending longitudinally along a lower portion of the slide-out room floor. The lifting mechanism further comprises an engagement member positioned adjacent the opening for cooperation with the longitudinally extending rails. The engagement members are vertically adjustable to adjust the vertical lift of the slide-out room floor off of the main room floor and are defined by rollers. A lower edge of the opening includes an inclined ramp, upon which a leading edge of the slide-out room rests when in the fully extended position. The ramp includes an aperture therethrough, and the rollers project upwardly through the aperture.

In the preferred embodiment of the invention, the mobile living quarters further comprises at least one engagement member positioned adjacent the opening for cooperation with the longitudinally extending rails. The engagement member is defined as a wear bar extending transversely across a lower edge of the opening. The lifting mechanism is mounted to a bottom of the slide-out room floor. A lower edge of the opening includes an inclined ramp, upon which a leading edge of the slide-out room rests when in the fully retracted position. The ramp includes an aperture therethrough, and at least a portion of the lifter mechanism projects upwardly through the aperture. The lifting mechanism is comprised of a roller movable through the aperture, and cooperable with the leading edge of the slide-out room floor to raise the floor. The roller is movable under the influence of fluid pressure, and a fluid actuated cylinder moves the rollers.

Preferably, the roller is cooperable with the slide-out room floor, whereby when the slide-out room floor contacts the roller, the rotation of the roller, moves the roller vertically. The roller is interconnected to a linkage which causes the vertical movement. The roller includes at least one gear mounted thereto, whereby the at least one gear meshes with a mating pinion gear, and the mating pinion gear is attached to a jack screw, and the roller rotation causes the jack screw to also rotate lifting the roller from a base to which it mounts. The roller is mounted on a threaded shaft, and the lifting mechanism further comprises at least one threaded collar cooperable with the threaded shaft, and the threaded collar moves laterally upon rotation of the roller, and the linkage includes a pivot arm movable by the threaded collar, whereby the pivot arm raises the roller. The threaded shaft extends from opposite ends of the roller and has threaded portions with opposite hand threads. The roller is mounted to a carrier member, which is movable relative to a base member, and the pivot arm pivots relative to the base member, the pivot arm being operatively attached to the carrier member to raise the carrier member and roller.

Preferably, the roller is mounted to a rotatable lever, and the lever is rotated in response to the inward movement of the room, to a position increasing the vertical component of the roller, whereby the slide-out room floor is raised by the roller. The roller is rotated in response to engagement of the slide-out room floor with the roller. The lifting mechanism further comprises a contoured ramp positioned intermediate the roller, when the slide-out room is in the fully extended position, and the roller is caused to roll up the contoured ramp upon retraction of the slide-out room. The lever is movable to an over center position, whereby the slide-out room floor is maintained at a vertical spacing above the main room floor. The lever is preferably rotated in response to engagement by an actuator attached to the slide-out room.

In the preferred embodiment of the invention, the lifting mechanism is further profiled to lower the slide-out room, when in the fully extended position, such that the main room floor and slide-out room floor are substantially flush. A lower edge of the opening includes an inclined ramp, to guide a leading edge of the slide-out room upon retraction. A roller mechanism is held in position adjacent the ramp, and has first and second vertical positions, when the roller mechanism is raised to the second vertical position, the slide-out floor rolls on the roller mechanism at a vertical height above the main room floor, and when the slide-out room moves to the fully extended position, and the roller mechanism is lowered to the first position, the slide-out room floor moves to the substantially flush position.

In another embodiment of the invention, a lifting mechanism for a mobile living quarters comprises a frame, a structure supported by the frame defining a main room including side walls, a ceiling and a floor, where one of the sidewalls defines an opening for slidably receiving a slide-out room mounted for movement through the opening between a retracted position retracted into the main room and an extended position extended from the main room to provide an auxiliary living area. The lifting mechanism comprises a lever mechanism, pivotable relative to the main room, and a roller mechanism, having a first position and a second position, where the second position has a vertical component higher than the first position, the lever mechanism being responsive to the movement of the slide-out room, causing the roller mechanism to move to the second position, whereby the slide-out room may retract with the slide-out room floor rolling against the roller mechanism.

In the preferred embodiment of the invention, the ramp includes an aperture therethrough, and at least a portion of the lifter mechanism projects upwardly through the aperture. The roller is mounted to the lever mechanism, and the lever mechanism is pivoted in response to the inward movement of the room, to move the roller mechanism to the second position, whereby the slide-out room floor is raised by the roller. The lever mechanism is pivoted in response to engagement of the slide-out room floor with the roller mechanism. The lifting mechanism further comprises a contoured ramp positioned intermediate the roller mechanism and the opening, when the slide-out room is in the fully extended position, and the roller is caused to roll up the contoured ramp upon retraction of the slide-out room. The lever is movable to an over center position, whereby the slide-out room floor is maintained at the second position above the main room floor. The lever mechanism is comprised of a pair of levers and the roller mechanism is mounted between the pair of levers by way of an axle. The lever mechanism is spring loaded to position the roller mechanism in the first position. The lever mechanism includes end plates having receiving areas for receiving the axle when in the over center position.

Preferably, the lever is rotated in response to engagement by an actuator attached to the slide-out room. The lever mechanism is pivot mounted relative to the main room, and has a lever arm extending outwardly, with a free end pad for contacting an actuating surface of the slide-out room, and the lever is spring loaded upwardly, at a position intermediate the pivot position and the free end pad, whereby when the slide-out room is retracted initially, the weight of the slide-out room is transferred off of the free end pad, and the lever is spring loaded upwardly moving the roller mechanism and the slide-out room vertically upwardly. The roller mechanism is attached to the lever mechanism, and rolls independently of the lever mechanism.

BRIEF DESCRIPTION OF THE DRAWINGS

FIGS. 47 and 48 show yet another embodiment similar to that of FIGS. 43 and 44;

FIGS. 47A–47C show details of the linkages of the mechanism shown in FIG. 47;

FIG. 53 is a perspective view of the ramp mechanism of the roller/lifter assembly mechanism of FIGS. 51 and 52;

FIG. 54 is an end view of the ramp mechanism of FIG. 53;

FIG. 55 is a top plan view of the end plate used in the mechanism of FIGS. 51 and 52;

FIG. 56 is a front plan view of the end plate of FIG. 55;

FIG. 57 is a top plan view of the roller linkage;

FIG. 58 is an end view of the roller linkage shown in FIG. 57;

FIG. 67 shows the top plan view of an alternate embodiment of the device shown in FIGS. 51–66;

FIG. 68 shows the end view of the device shown in FIG. 67;

FIG. 69 shows the side plan view of the end plate of the device of FIGS. 67 and 68;

DETAILED DESCRIPTION OF EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
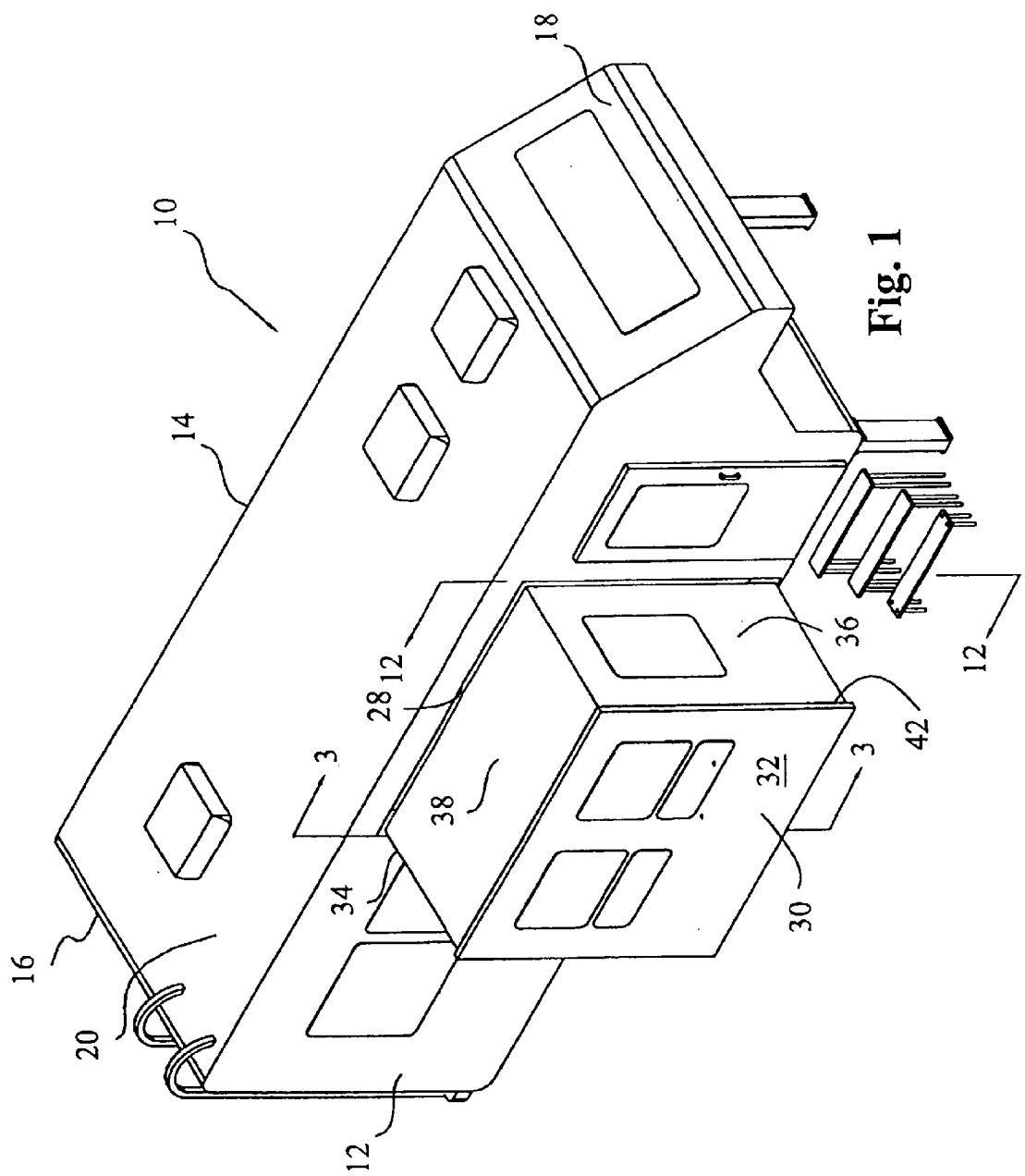
FIG. 1 is a top perspective view of a recreational vehicle showing a slide-out room in the fully extended position.
Figure 2:
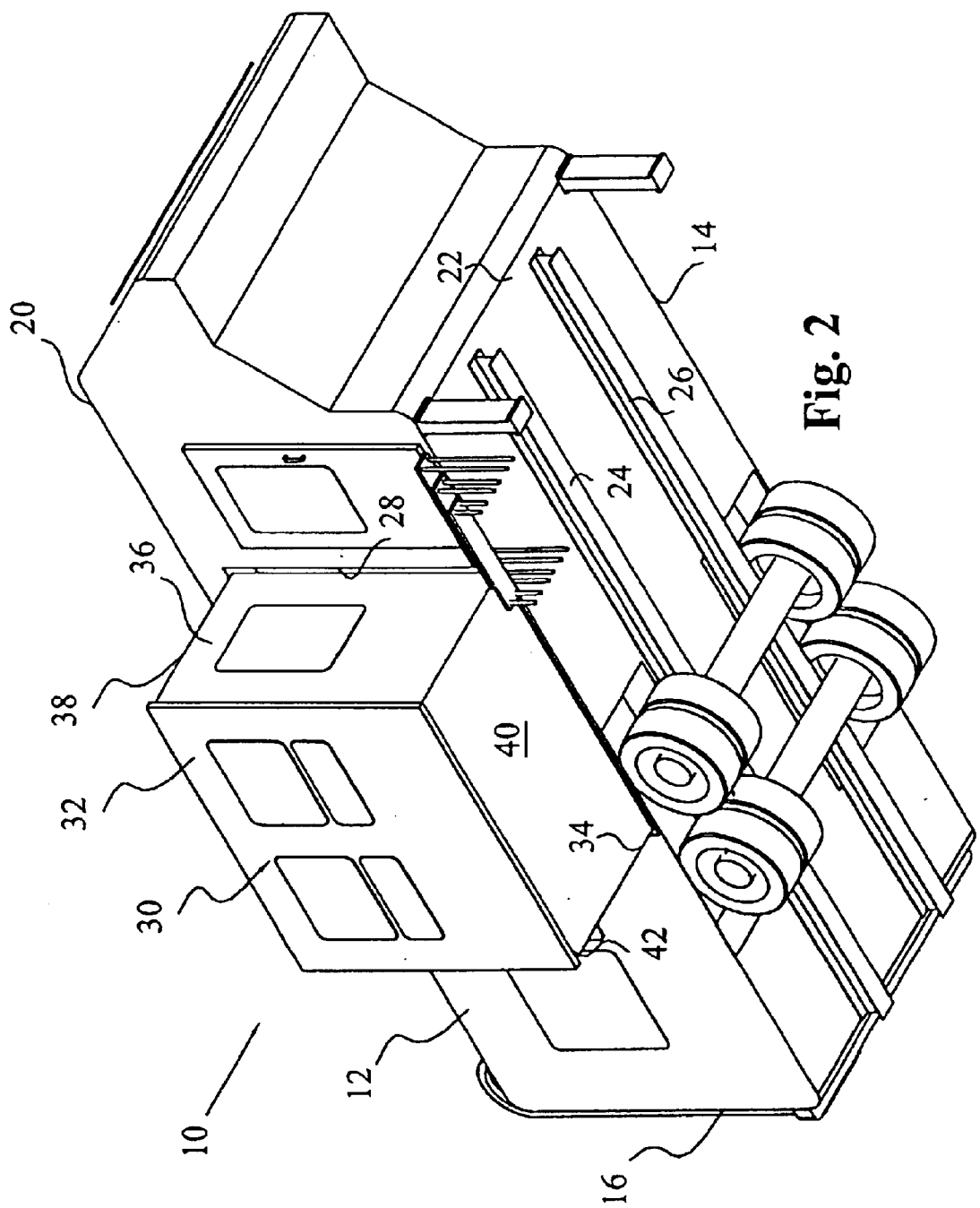
FIG. 2 is a lower perspective view of the recreational vehicle shown in FIG. 1.

Referring now to FIGS. 1 and 2, mobile living quarters, such as a recreational vehicle, generally indicated by the numeral 10, includes side walls 12, 14, end walls 16, 18, a ceiling 20, and a floor 22 (FIG. 2) which is supported on a frame including a pair of frame members 24, 26 that extend substantially parallel to the longitudinal axis of vehicle 10.

Side wall 12 of vehicle 10 includes an opening 28 which receives an expandable area, typically referred to a slide-out room, generally indicated by the numeral 30. Room 30 is mounted for movement relative to side wall 12 between an extended position (illustrated in FIGS. 1 and 2) in which slide-out room 30 is positioned laterally outwardly relative to vehicle 10 to provide auxiliary living space, and a retracted position, retracted within vehicle 10 to reduce the width of vehicle 10 for travel. Slide-out room 30 includes a back wall 32 which, when room 30 is retracted into vehicle 10, is substantially flush with side wall 12. Slide-out room 30 also includes side walls 34, 36, a ceiling 38, and a floor 40 (FIG. 2). It should be noted that back wall 32 extends horizontally beyond side walls 34, 36, and vertically below floor 40 and above ceiling 38, thereby defining a fascia 42 to permit the use of weather stripping or other similar structure to prevent ingress of the elements into the interior living space of vehicle 10 when slide-out room 30 is in its retracted position during travel, as will be described more fully herein.

FIG. 2 shows no specific drive mechanism, but it should be appreciated that any drive mechanism could be incorporated herein. For example, hydraulic drive mechanisms, electric motors, or rack and pinion drive mechanisms could be used interchangeably with the present invention.

Figure 3:
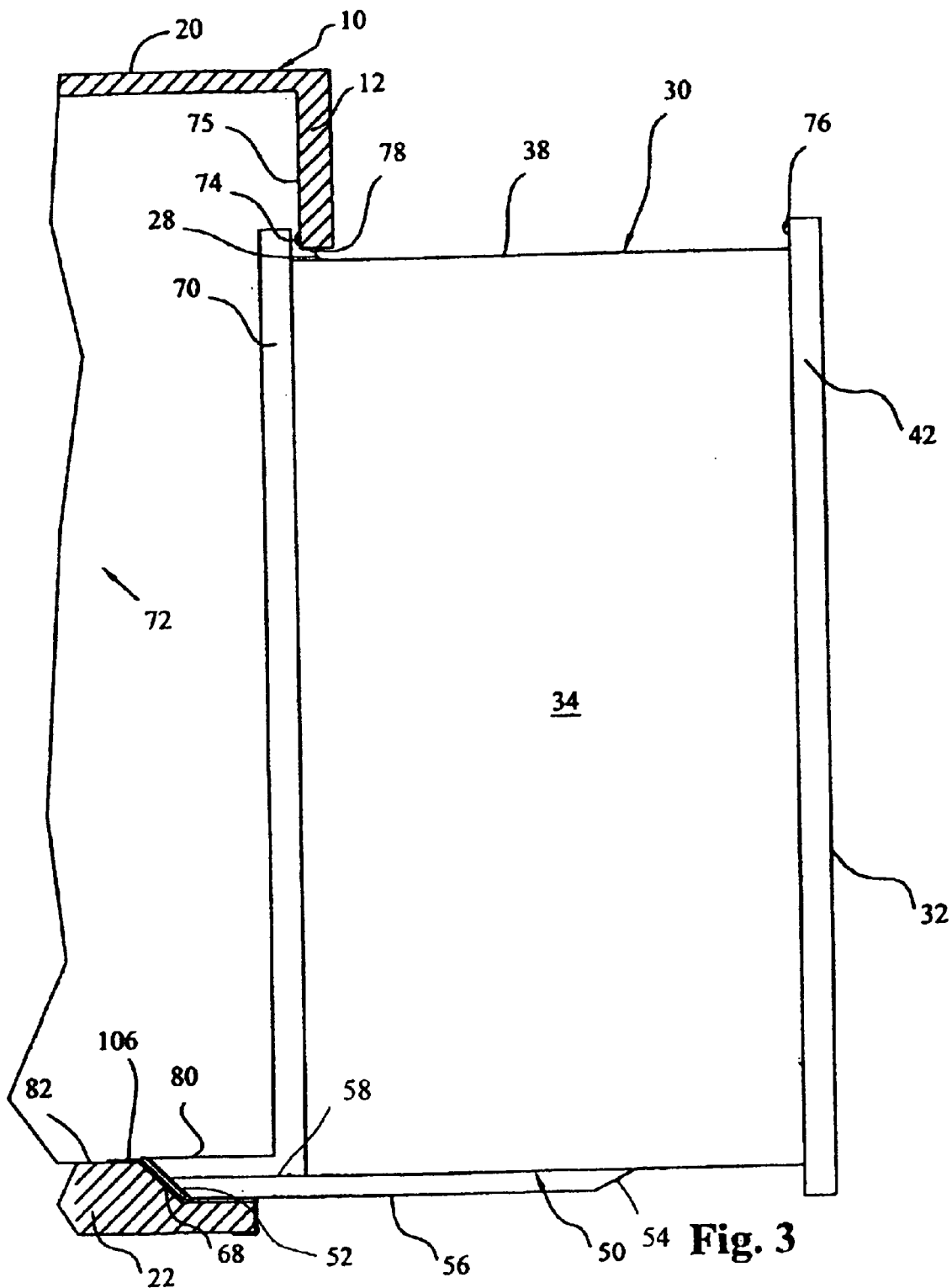
FIG. 3 is a fragmented, cross-sectional view taken through lines 3—3 of FIG. 1.
Figure 4:
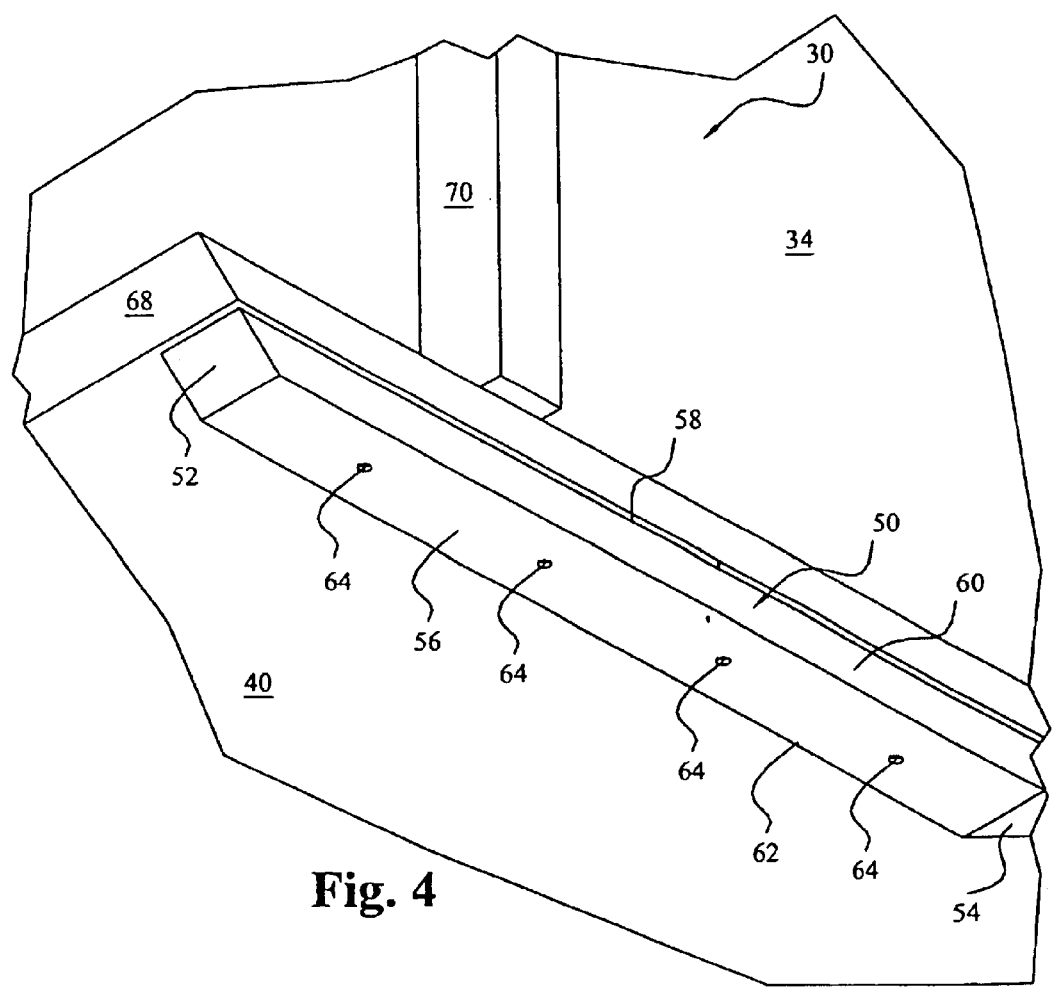
FIG. 4 is a fragmented, lower perspective view of the slide-out room removed from the vehicle, and showing one embodiment of a rail according to the present invention.
Figure 5:
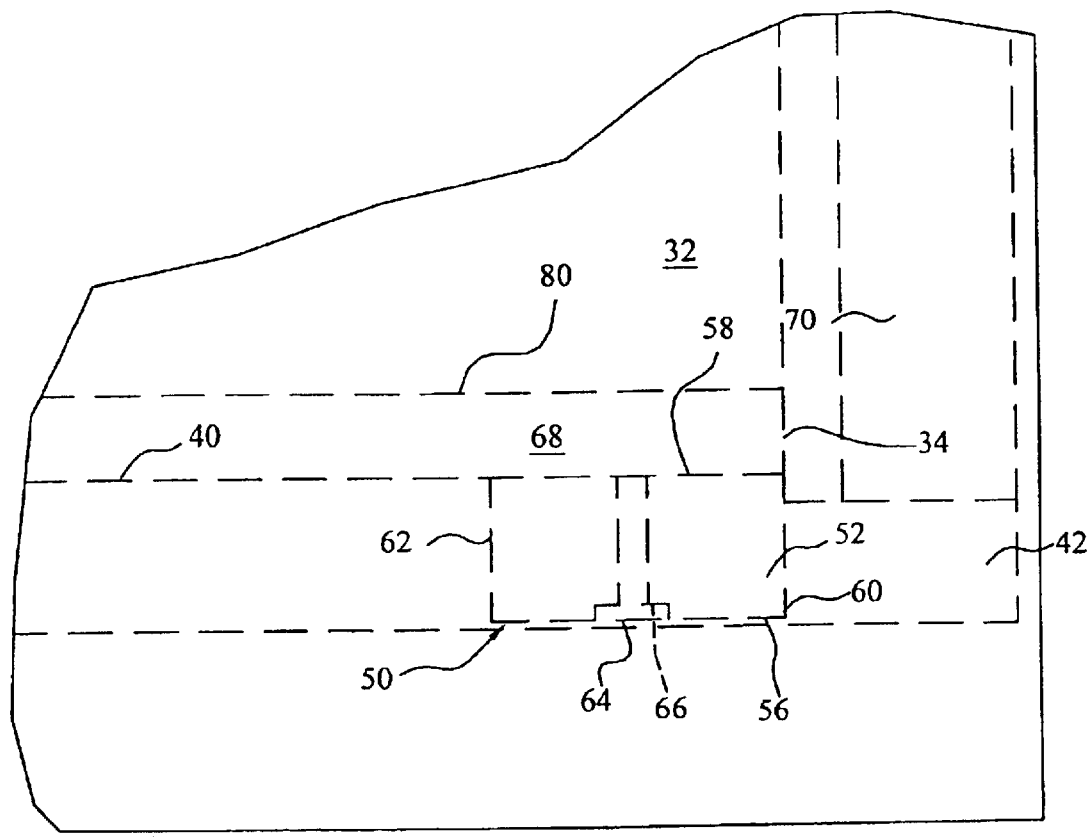
FIG. 5 is a fragmented, front perspective view of the rail shown through the back wall.

FIGS. 3 and 4 show rails 50 (only one of which can be viewed) according to the present invention mounted to floor 40 of room 30, adjacent side wall 34. It should be understood that an identical rail (not shown) is mounted to floor 40 adjacent side wall 36. To simplify this description, only rails 50 will be discussed in detail below. As best shown in FIG. 4, rails 50 include an inner tapered portion 52, an outer tapered portion 54, a lower surface 56, an upper surface 58, and a pair of side surfaces 60, 62. A plurality of openings 64 extend through rails 50 between lower surface 56 and upper surface 58. As best shown in FIG. 5, openings 64 include a recessed portion 66 to receive the head of a fastener, such as a cap screw (not shown), for mounting rails 50 to floor 40 of slide-out room 30. Rails 50 are mounted to floor 40 such that inner tapered portion 52 is spaced away from tapered portion 68 of floor 40. FIG. 4 also shows an inner circumferential flange 70 of slide-out room 30 which seals against an inner surface of vehicle side wall 12 when room 30 is moved to the fully extended position according to principles well known in the art.

As best shown in FIG. 4, side surface 60 of rails 50 is aligned with side wall 34 of room 30 and lower surface 56 is parallel to floor 40. It should be understood that, although rail 50 is shown having a particular width (as defined between side surfaces 60, 62), its width is substantially arbitrary. As will be further describe below, a rail having a relatively large width may be advantageous because the increased lower surface 56 may create reduced indentations on finished floor surfaces such as carpeting.

Figure 9:
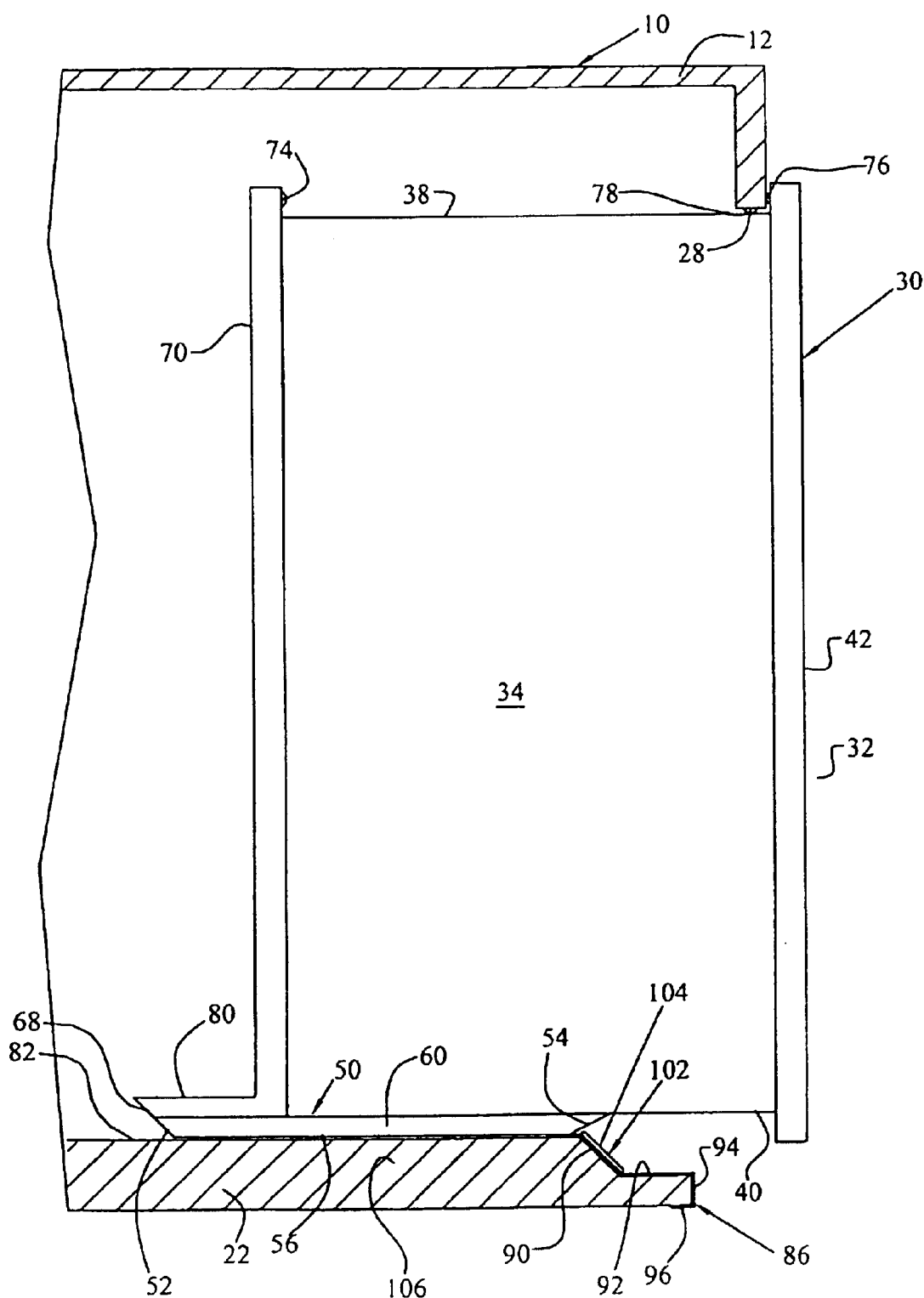
FIG. 9 is a fragmented, cross-sectional view similar to FIG. 8, showing a slide-out room in the fully retracted position.

FIG. 3 shows rails 50 mounted to room 30 in its fully extended position, wherein the interior living space 72 of vehicle 10 is increased. Inner circumferential flange 70 includes a bulb seal 74 which engages an inner surface 75 of vehicle side wall 12 to provide the seal mentioned above. Similarly, a bulb seal 76 is mounted to fascia 42 and seals against vehicle side wall 12 when room 30 is moved to the retracted position as shown in FIG. 9. A wiper seal 78 is mounted to side wall 12 and disposed within opening 28. As room 30 is moved between the extended and retracted positions, wiper seal 78 prevents debris and water from entering the vehicle according to principles well known in the art. As shown in FIG. 3, when room 30 of this embodiment of the invention is in the fully extended position, an upper surface 80 of floor 40 is substantially flush with the top surface 82 of the floor 22.

Figure 6:
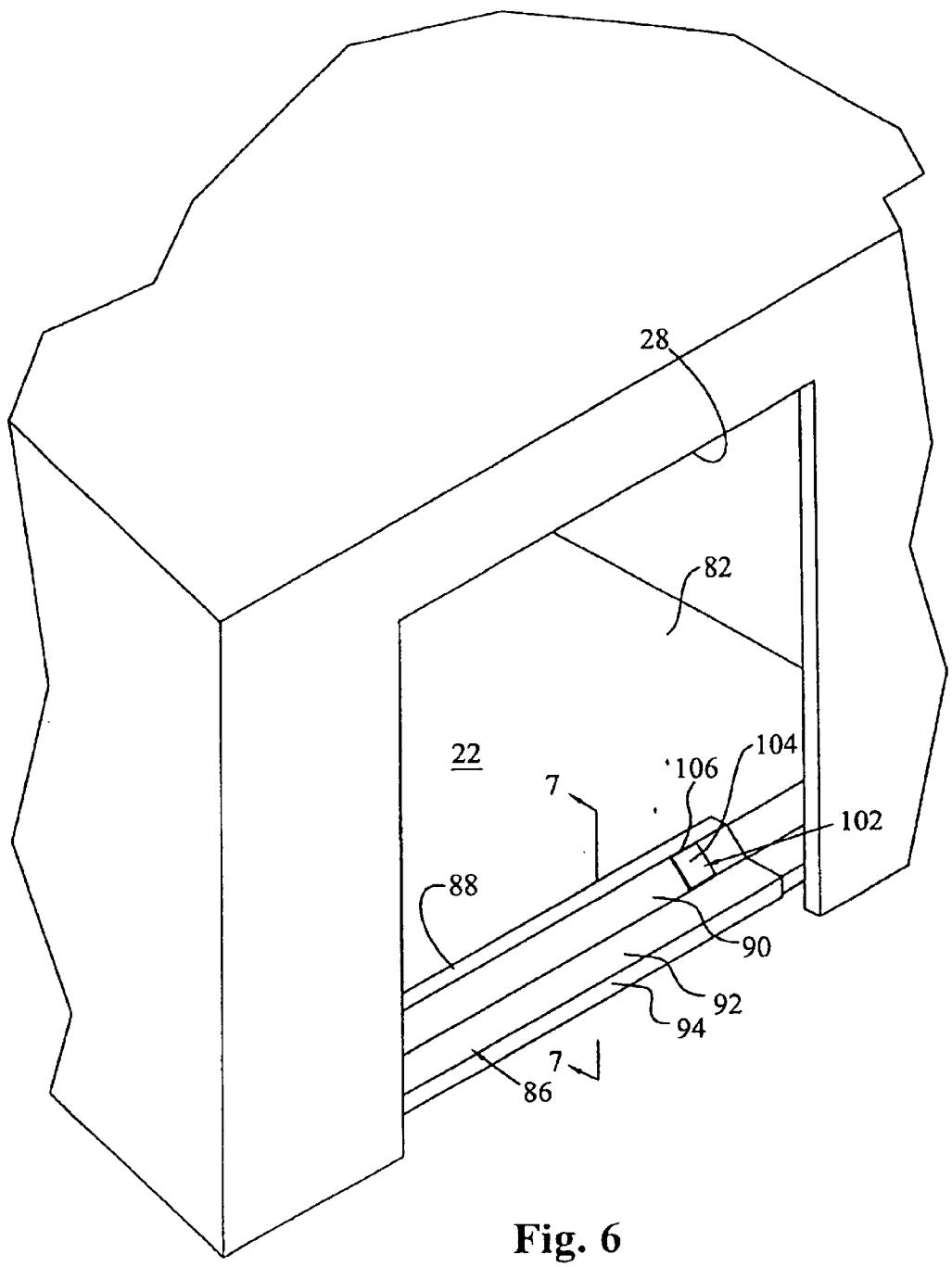
FIG. 6 is a perspective view of the recreational vehicle according to the present invention, with the slide-out room removed, and showing a ramp having one embodiment of wear segments.
Figure 7:
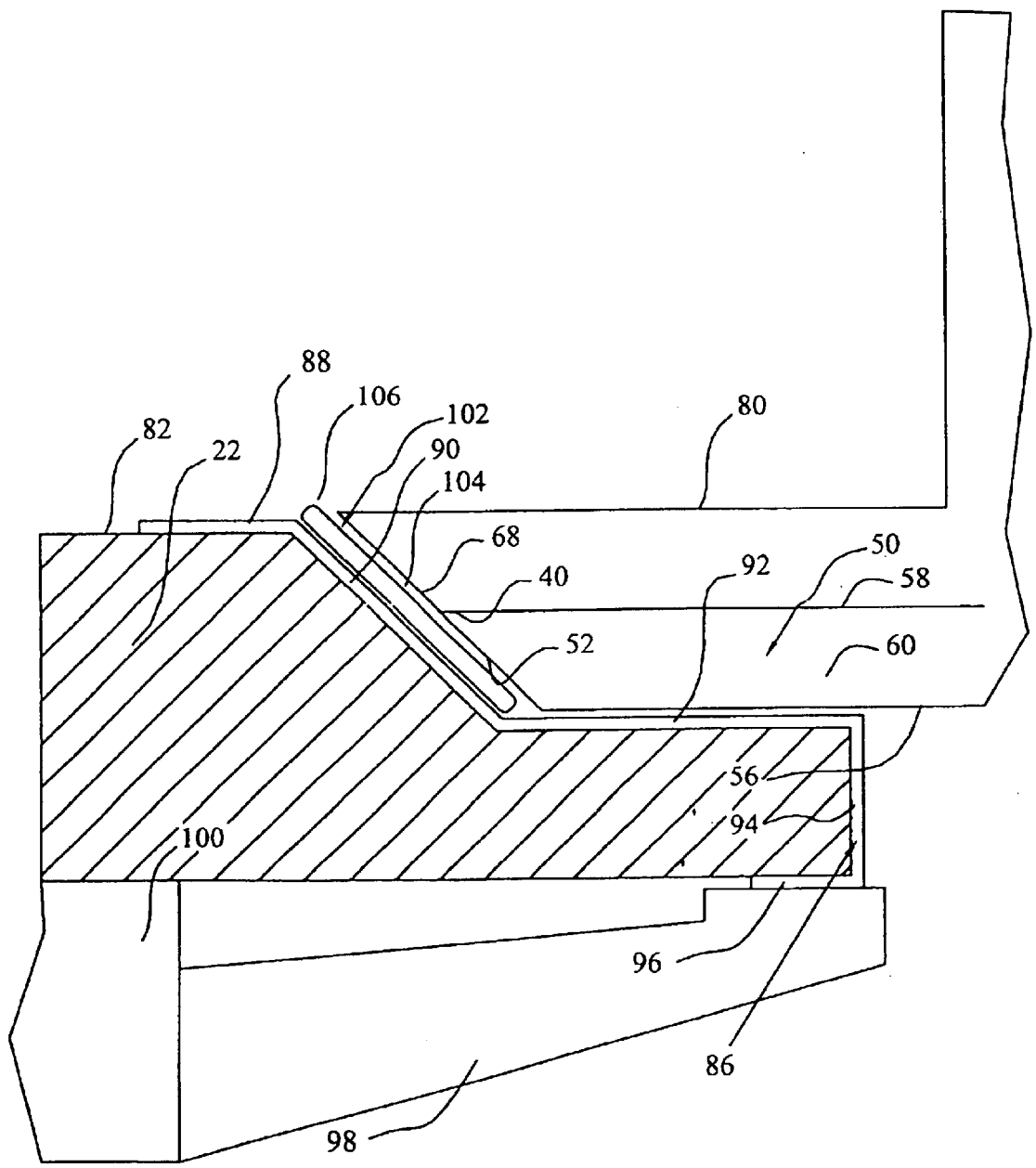
FIG. 7 is a fragmented, cross-sectional view taken substantially along lines 7—7 of FIG. 6.

Referring now to FIGS. 6 and 7, a conventional ramp, generally referred to by numeral 86, is attached to vehicle floor 22 and extends along the lower edge of opening 28 substantially the entire length (i.e., at least the distance between room side walls 34, 36) of room 30. Ramp 86 includes an upper portion 88, a sloping portion 90, a ledge 92, a front portion 94, and a lower lip 96 (FIG. 7). Lower lip 96 is supported by a strut 98, which is attached to a longitudinal frame member 100 in a conventional manner. A pair of wear segments 102 are attached in any acceptable manner to sloping portion 90 of ramp 86. Each wear segment 102 includes a wear surface 104 and a fulcrum surface or edge 106. As best shown in FIG. 7, fulcrum edge 106 is spaced vertically above finished top surface 82 of vehicle floor 22. It should be understood that the width of wear segments 102 may substantially correspond to the distance between side surfaces 60, 62 of rails 50. Wear segment 102 may be narrower or wider than rails 50 without deviating from the teachings of the present invention. In fact, a single wear segment 102 with a width substantially equal to the distance between side walls 34, 36 of room 30 could be used.

Figure 8:
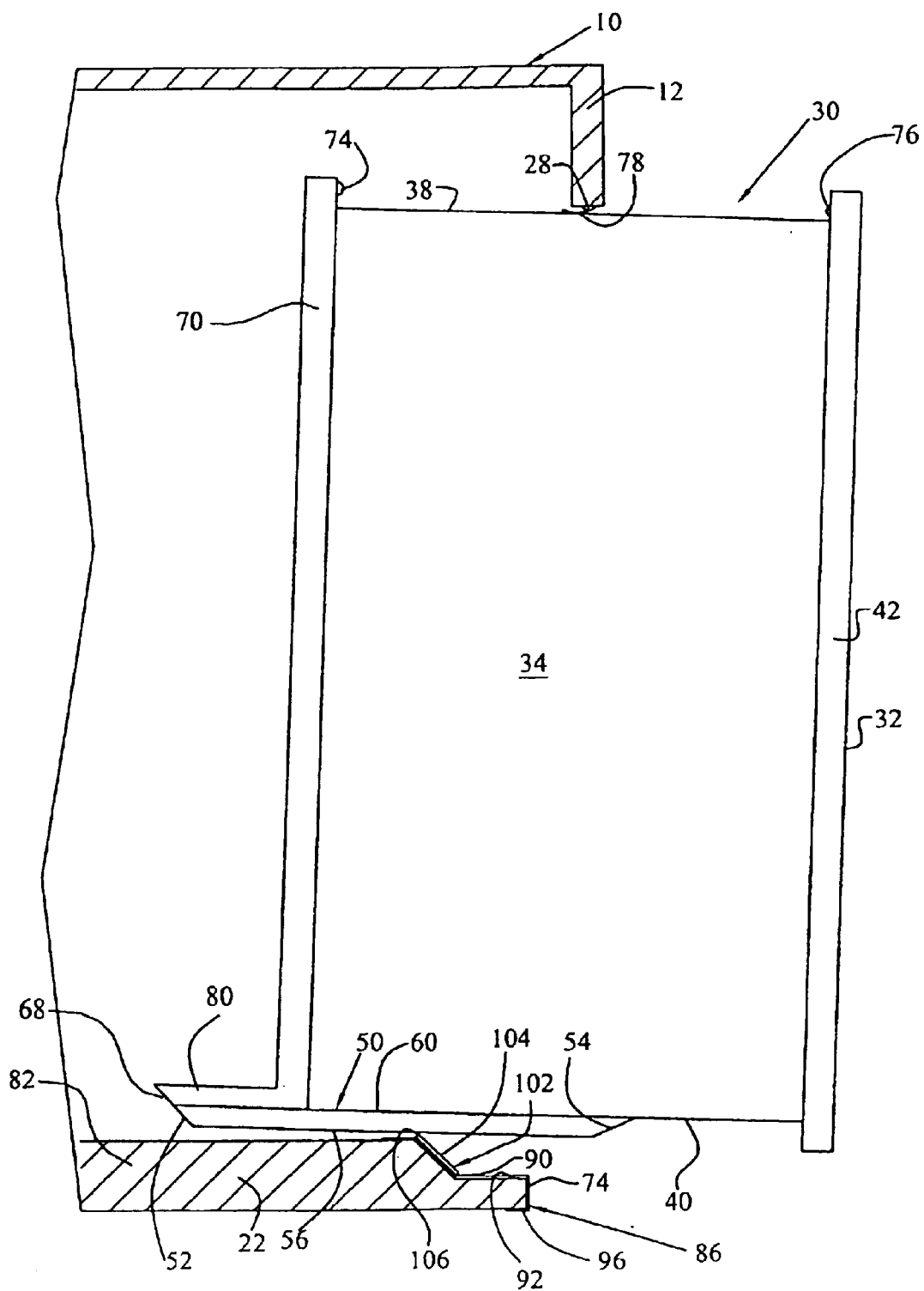
FIG. 8 is a fragmented, cross-sectional view similar to FIG. 3, showing a slide-out room intermediate the extended and retracted positions, shown in an exaggerated position.

Referring now to FIG. 8, room 30 is shown in an intermediate position, between the retracted and extended positions. As room 30 is retracted from the extended position as shown in FIG. 3, tapered portion 68 of floor 40 engages wear surfaces 104 of wear segments 102, and room 30 is thus tilted in a slightly clockwise sense (as shown in FIG. 8) as inner tapered portions 52 of rails 50 and lower surfaces 56 of rails 50 ride up wear surfaces 104 of wear segments 102 and over fulcrum edges 106. It should be understood that the extent of tilting is shown somewhat exaggerated in FIG. 8.

Referring now to FIGS. 8 and 9, as room 30 is further retracted, outer tapered portions 54 eventually move over fulcrum edges 106 of wear segments 102. As outer tapered portions 54 move over fulcrum edges 106, room 30 rocks slightly in a counterclockwise direction from the orientation of FIG. 8 to the orientation of FIG. 9. Additionally, room 30 is lowered such that surfaces 56 of rails 50 drop substantially vertically downwardly onto finished floor surface 52 of vehicle floor 22. It should be understood that wider rails 50 may be preferable for use with finished top surfaces 82, such as carpeting, that may be indented relatively easily. Outer tapered portions 54 are positioned such that when surfaces 56 of rails 50 contact finished top surface 82, room 30 is in the fully retracted position as shown in FIG. 9. Accordingly, bulb seal 76 is compressed between fascia 42 and vehicle side wall 12.

When room 30 is extended, outer tapered portions 54 of rails 50 ride up fulcrum edges 106 of wear segments 102 such that surfaces 56 of rails 50 become elevated above finished floor surface 102. As room 30 is further extended, the weight of room 30 on the driving mechanism causes room 30 to assume the slightly clockwise tilt shown in FIG. 8, thereby further ensuring that lower surfaces 56 of rails 50 are spaced apart from finished top surface 82 during travel of slide-out room 30. When room 30 approaches the extended position (as shown in FIG. 3), inner tapered portions 52 of rails 50 ride across fulcrum edges 106 of wear segments 102 and down front portion 94. Tapered portion 68 of room floor 40 similarly travels down wear segments 102. Eventually, rails 50 rest on ledge 92 of ramp 86 such that upper surface 80 of room floor 40 is substantially flush with finished top surface 82 of vehicle 10.

Figure 10:
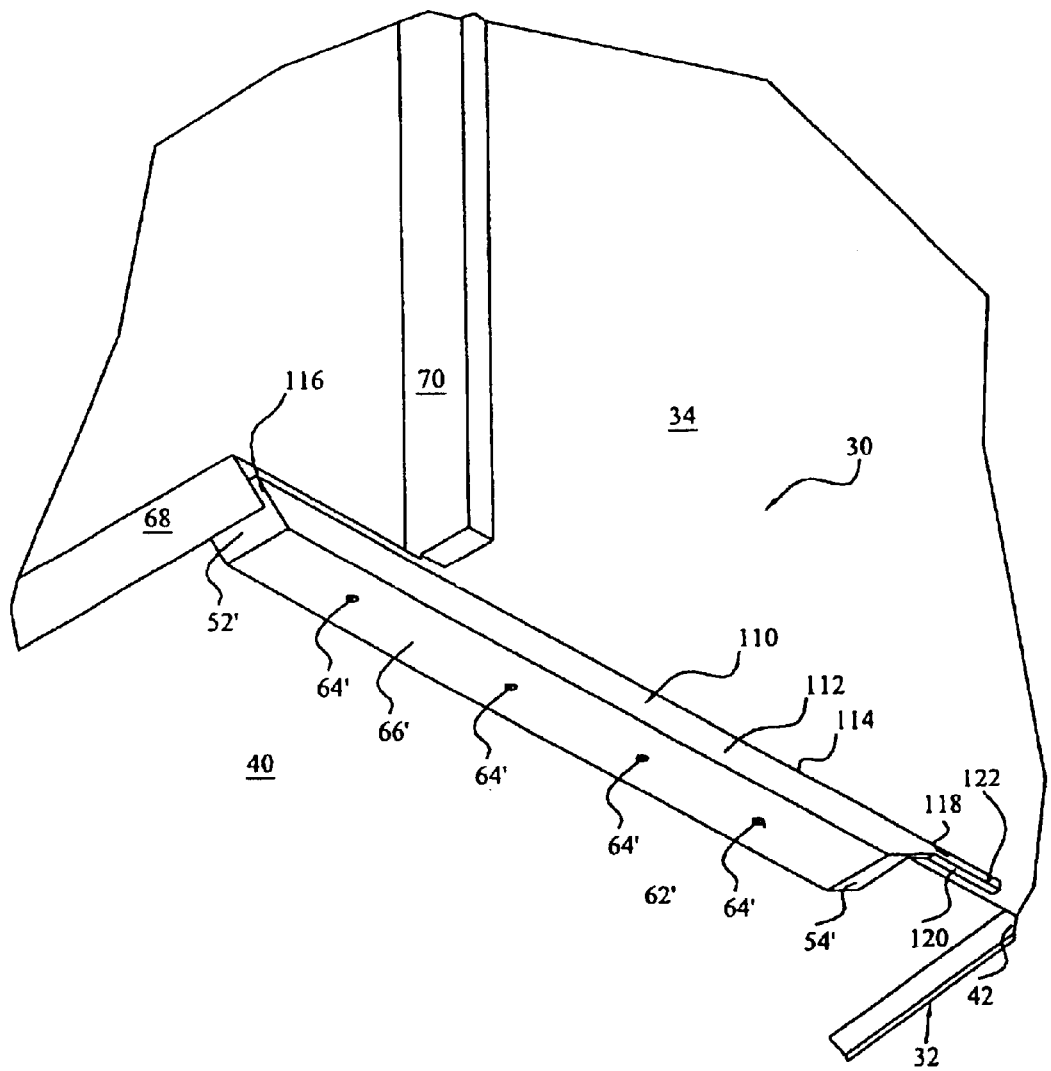
FIG. 10 is a fragmented, perspective view similar to FIG. 4, showing another embodiment of rail according to the present invention.
Figure 11:
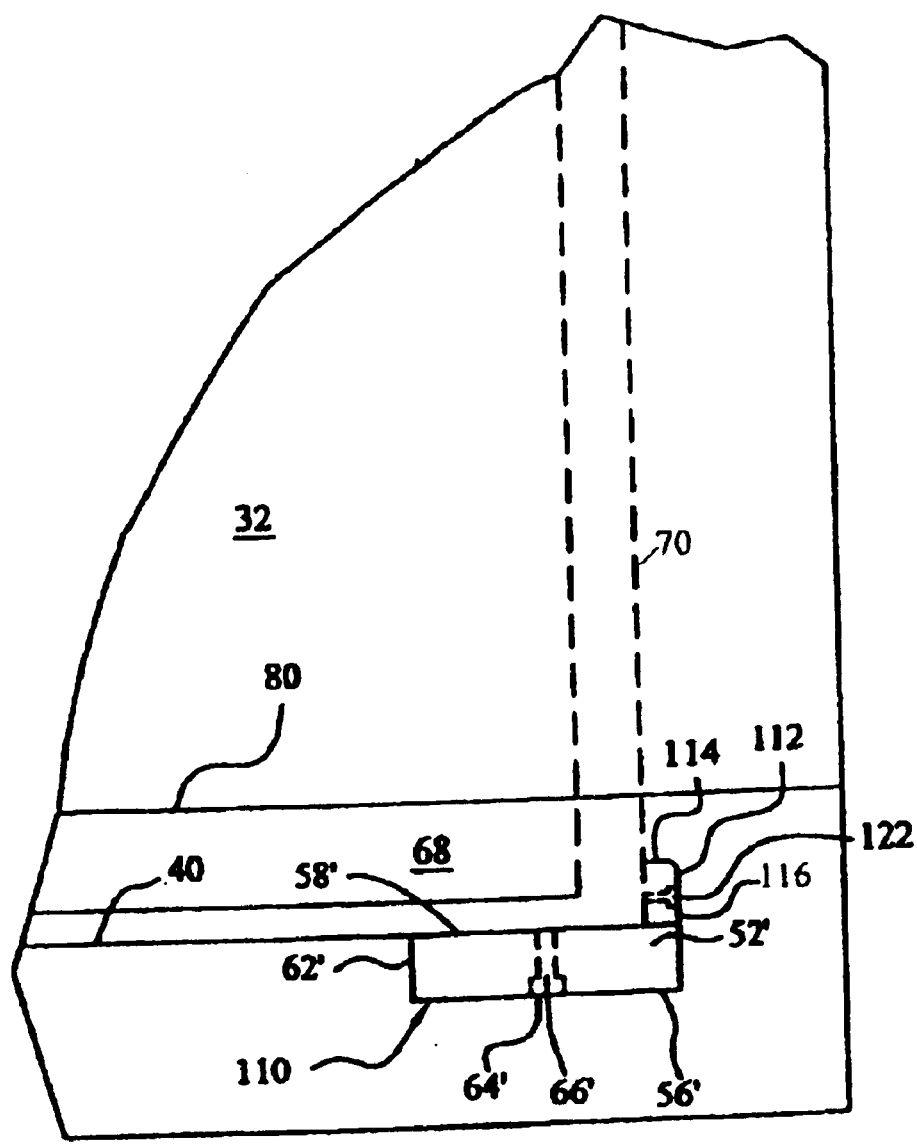
FIG. 11 is a fragmented, side elevational view similar to FIG. 5, showing the embodiment of FIG. 10.

FIGS. 10 and 11 show another embodiment of a rail according to the present invention. Rail 110 is similar to rails 50, and like components shall be designated with a prime number. Again, only one rail 110 is described for simplicity. Rail 110 differs from rails 50 in that side surface 112 extends upwardly along side wall 34 of room 30. Accordingly, rail 110 provides a decorative trim piece along the width of side wall 34. Rail 110 also includes an upper edge 114, which extends from tapered portion 68 of floor 40 to fascia 42 of back wall 32. Additionally, inner tapered portion 52' includes an extension 116, which follows the slope of tapered portion 68. Finally, side surface 112 of rail 110 extends rearwardly beyond outer tapered portion 54' to fascia 42 of back wall 32. Portion 118 of side surface 112 includes a lower edge 120 which is substantially flush with the lower surface of room floor 40 and an opening 122 for receiving a fastener such as a screw.

Figure 12:
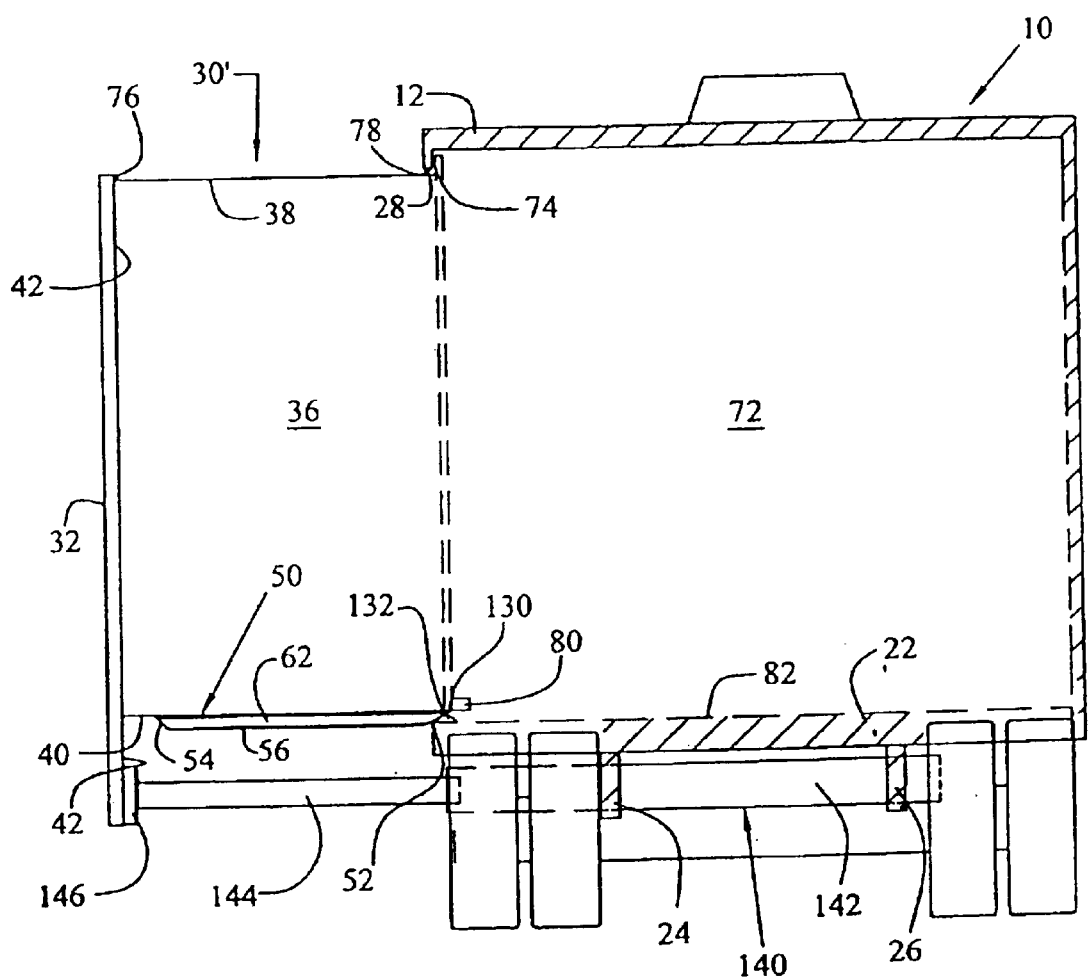
FIGS. 12–14 are cross-sectional views taken substantially along lines 12—12 of FIG. 1 showing an alternate embodiment of a slide-out room according to the present invention in a fully extended, intermediate, and fully retracted position, respectively.
Figure 13:
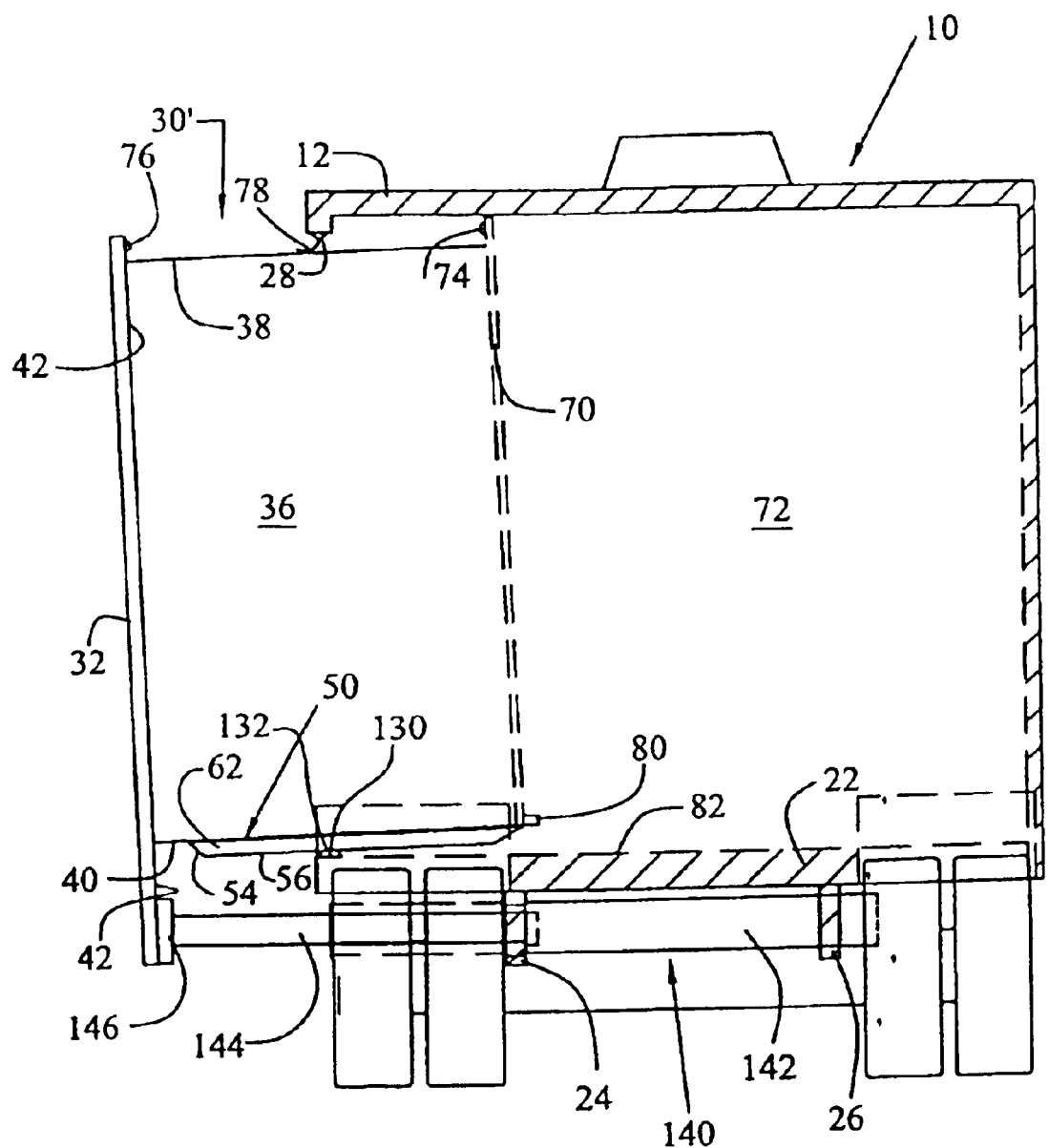
Figure 14:
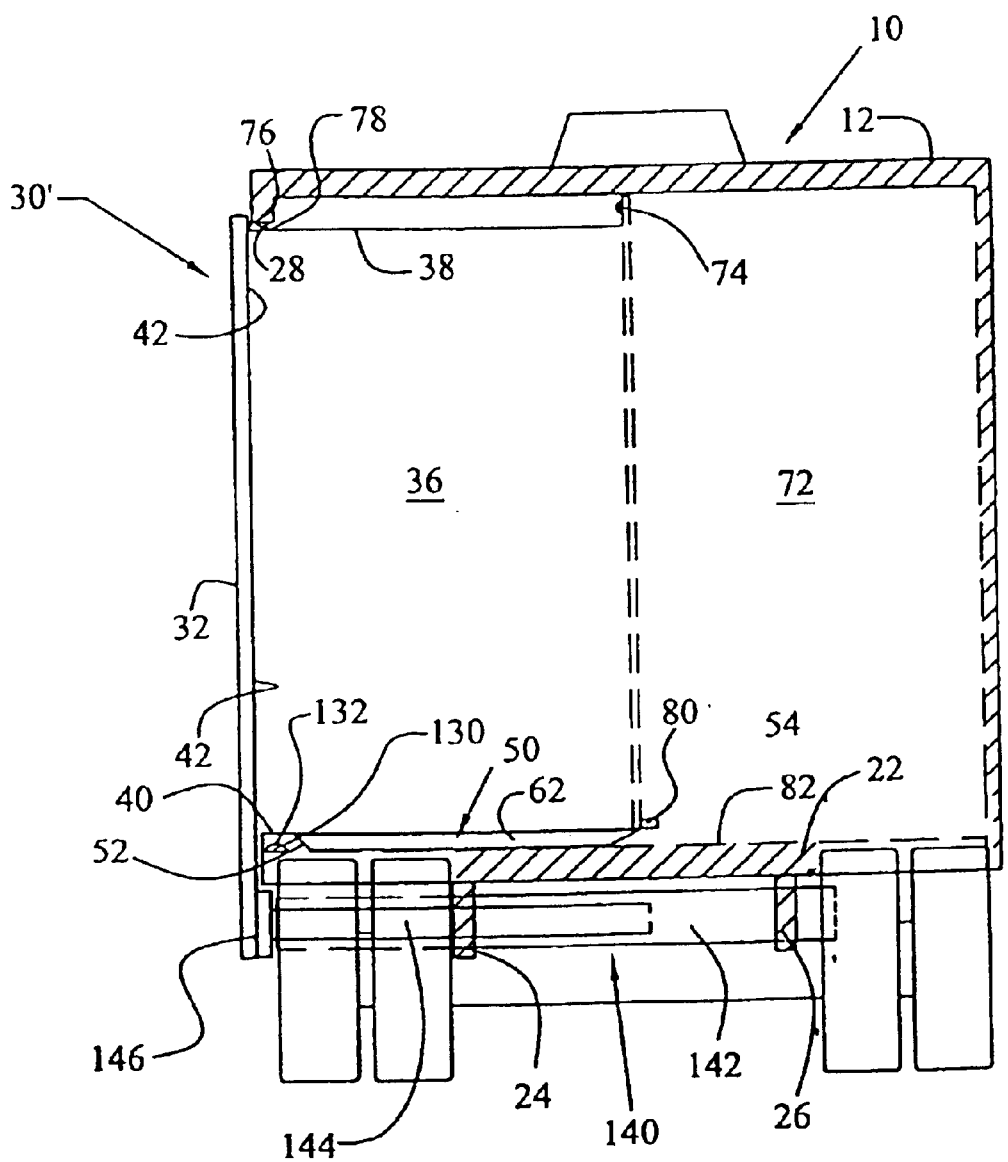

With reference now to FIGS. 12–14, another embodiment of a slide-out room according to the present invention is shown. Room 30' is substantially similar to room 30 described with reference to FIGS. 1–9. Accordingly, like components will retain their original reference designations. Room 30' differs from room 30 in that upper surface 80 of room floor 40 is not flush with finished surface 82 of vehicle floor 22 when room 30' is in the extended position as shown in FIG. 12. Accordingly, opening 28 of vehicle 10 does not include ramp 86 as described above. Nonetheless, room 30' operates in substantially the same manner as room 30 described above.

When room 30' is in the extended position (FIG. 12), floor 40 rests upon a wear bar 130 which may extend substantially the entire width of opening 28 along floor 22 of vehicle 10. Alternatively, wear bar 130 may consist of a pair of wear bars disposed on vehicle floor 22 in alignment with rails 50 as described above. Wear bar 130 includes a fulcrum surface or edge 132 which cooperates with rails 50 in a manner similar to that described above relative to members 102 to minimize contact between rails 50 and finished surface 82 of vehicle floor 22 as room 30' is moved between the extended and retracted positions. Specifically, as room 30' is retracted, inner tapered portions 52 of rails 50 engage wear bar 130 such that room 30' cams over fulcrum edge 132. As room 30' is further retracted (FIG. 13), lower surfaces 56 of rails 50 ride along fulcrum edge 132 of wear bar 130, thereby suspending rails 50 above finished surface 82. As room 30' enters the fully retracted position (FIG. 14), outer tapered portions 54 of rails 50 ride down wear bar 130, thereby lowering room 30' substantially vertically onto finished surface 82 of room floor 22. FIGS. 12–14 also depict a typical actuation mechanism, shown generally at 140 to include an outer tube 142 and an inner tube 144. The outer tube 142 is attached to both support rails 24, 26. The inner tube 144 telescopes within the outer tube and is connected to the slide-out room 30, 30' by way of a bracket 146.

Figure 15:
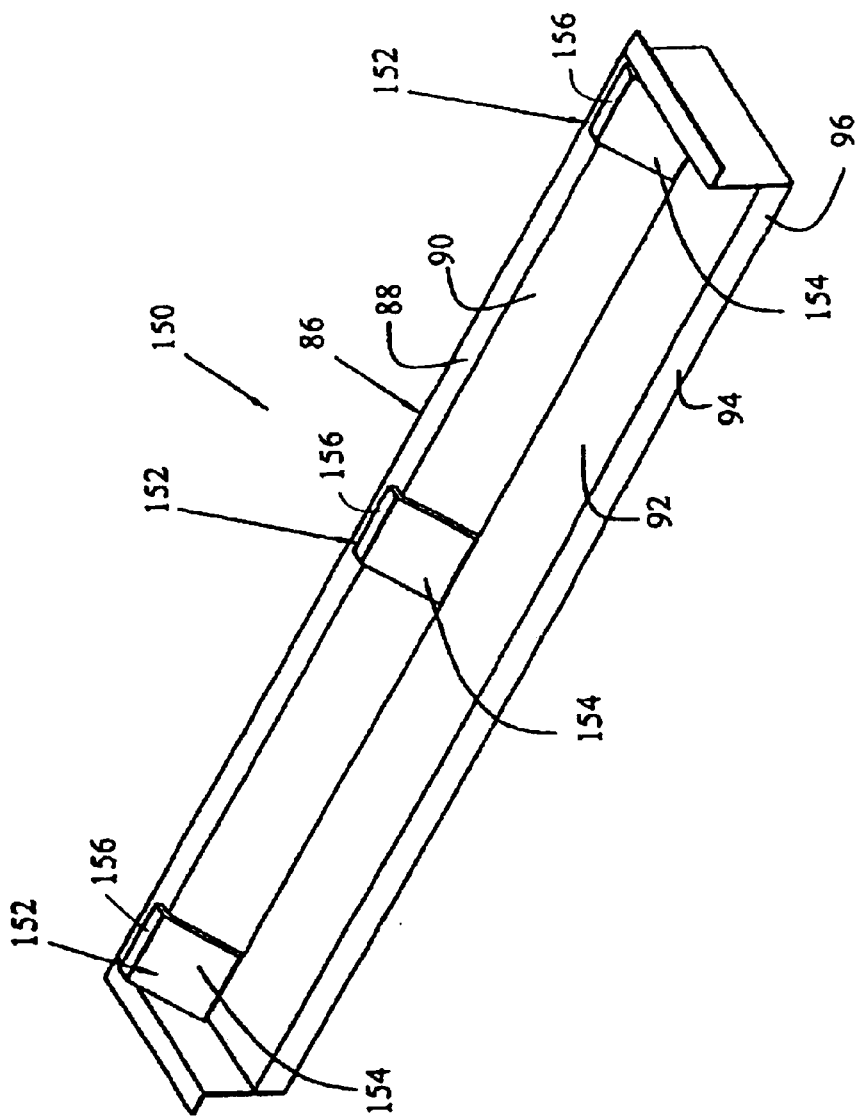
FIG. 15 is a perspective view of another embodiment of the present invention.
Figure 16:
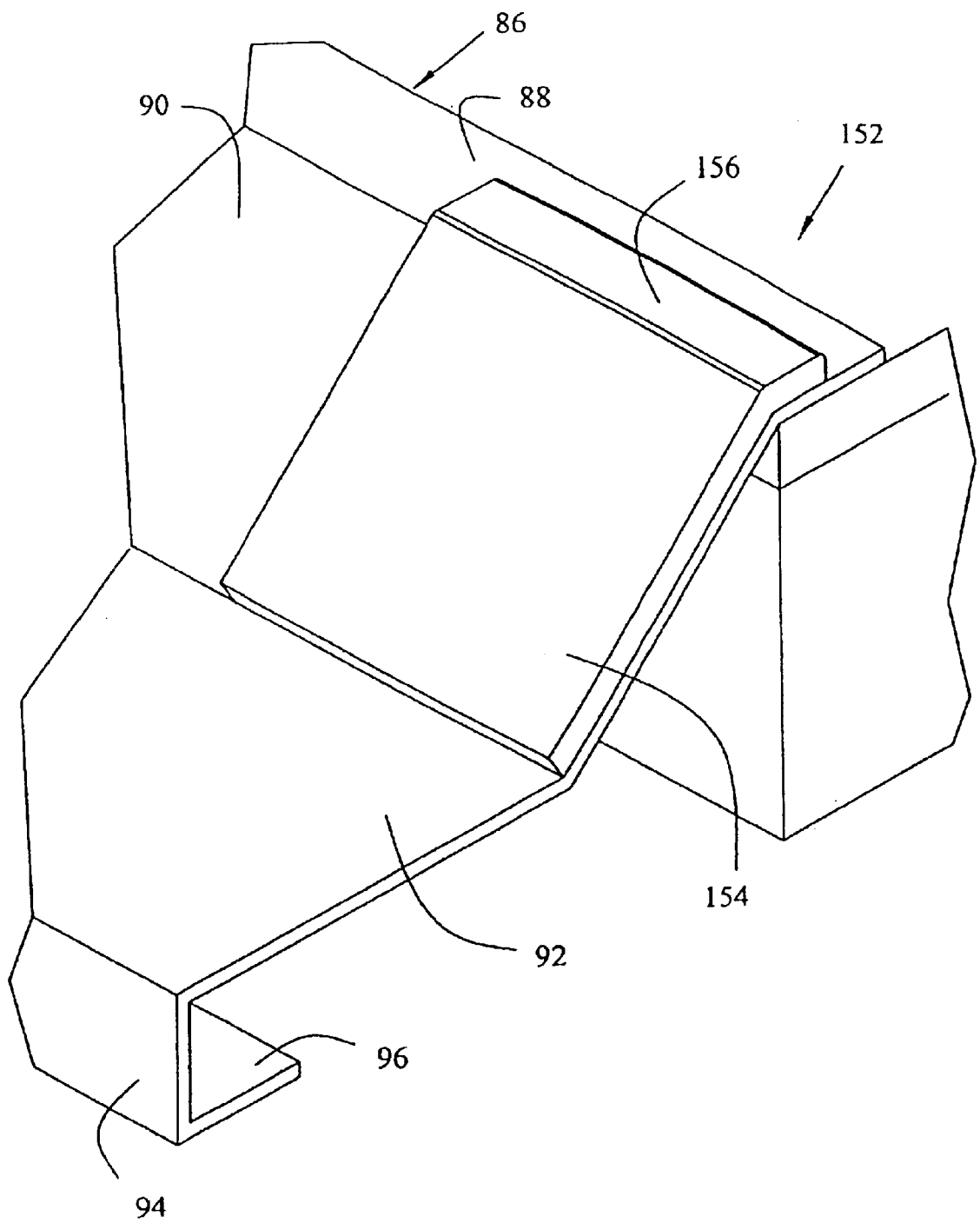
FIG. 16 is a partially fragmented, perspective view of the embodiment of FIG. 15.

With reference now to FIGS. 15 and 16, a further embodiment is shown as a non-adjustable lifting assembly or wear pad assembly 150. Any number of wear pads 152 may be utilized. Each wear pad 152 includes a ramp portion 154 and fulcrum portion 156. As shown, the angular relationship between ramp portion 154 and fulcrum portion 156 substantially corresponds to the angular relationship between sloping portion 90 and upper portion 88 of ramp 86, respectively. Wear pads 152 are not adjustable, but can be provided in various heights. As slide-out room 30 is retracted or extended, floor 40 is elevated above vehicle floor 22 by wear pads 152 in the manner described with reference to FIG. 8.

Figure 17:
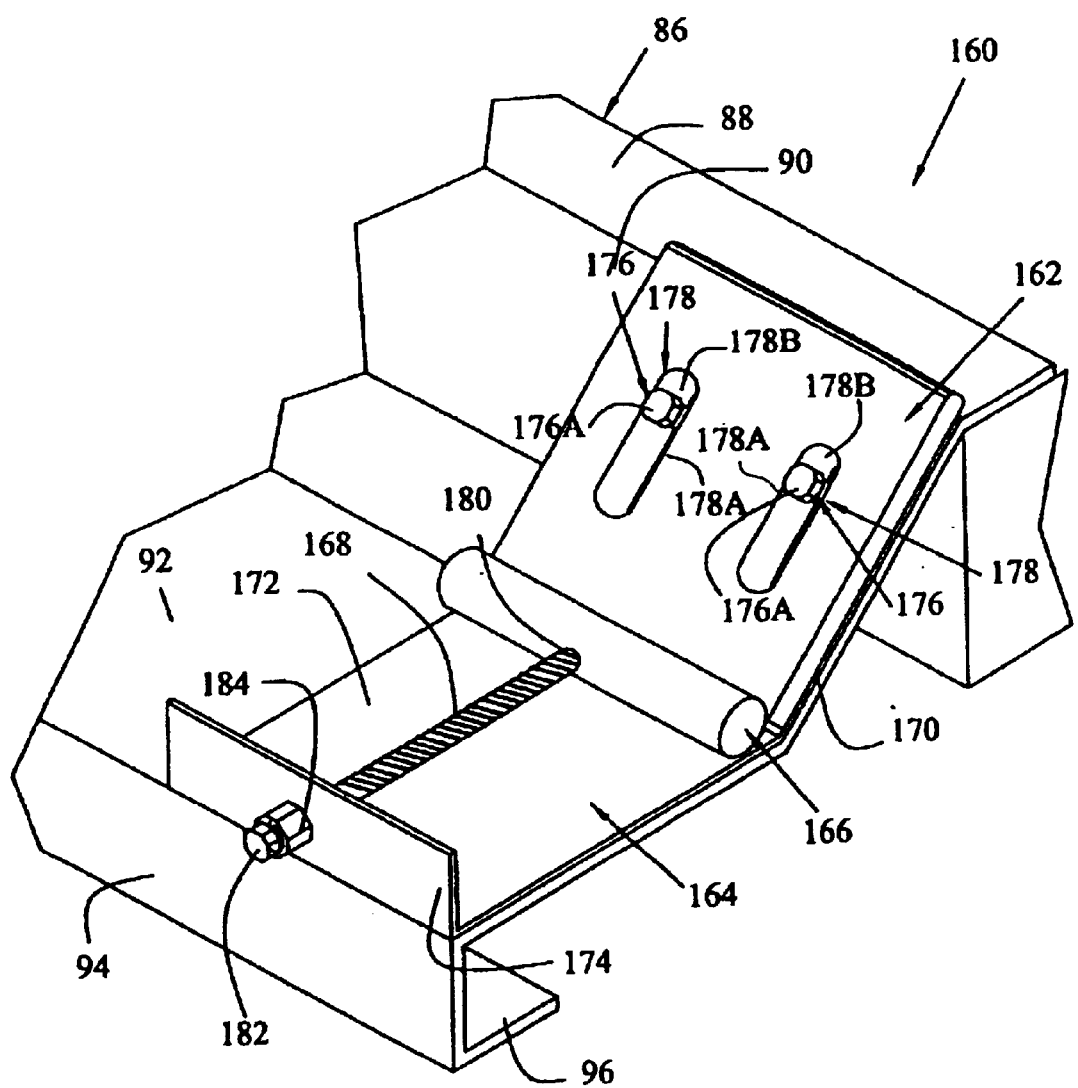
FIG. 17 is a perspective view of another embodiment of a lifting mechanism according to FIG. 16.

FIG. 17 depicts another embodiment, similar to that shown in FIGS. 15 and 16, where the mechanism is an adjustable lifting assembly 160, and generally includes a wear plate 162, a tray 164, a rod 166, and a bolt 168. Tray 164 is shaped to correspond to the shape of ramp 86 and is fixedly mounted on sloping portion 90 of ramp 86. Tray 164 includes a ramped wall 170, a lower wall 172, and a vertical wall 174. A pair of studs 176 extend from ramped wall 170 to retain wear plate 162 as further described below. Vertical wall 174 includes a threaded opening (not shown) which receives bolt 168. Wear plate 162 includes a pair or slots 178 spaced to align with studs 176. Each stud 176 extends up from tray 164 through a smaller width portion 178A of slot 178. Each stud 176 includes a head 176A with a diameter, which is larger than the width of smaller width portion 178A of its corresponding slot 178, but slightly smaller than the width of a larger width portion 178B of the slot. Accordingly, studs 178 retain wear plate 162, but stud heads 176A remain recessed within slots 178. Rod 166 is horizontally disposed along the lower edge of plate 162, such that it acts to support plate 162 on ramped wall 170 of tray 164. Rod 166 includes a threaded opening 180 to receive bolt 168. Bolt 168 extends through the threaded opening (not shown) in vertical wall 174 of tray 164. As bolt 168 is rotated by turning bolt head 182, rod 166 is moved toward or away from ramped wall 170, thereby causing wear plate 162 to slide up or down tray 164 into the desired position. The extent to which plate 162 is allowed to move upward or downward may be determined by the length of slots 178 in tray 164. This adjustment of bolt 168 determines the amount by which the upper edge of wear plate 162 extends above upper portion 88 of ramp 86, thereby determining the height of room floor 40 above vehicle floor 22 as room 30 moves between its extended and retracted positions. Lock nut 184 prevents bolt 168 from vibrating out of a desired position during travel.

Figure 18:
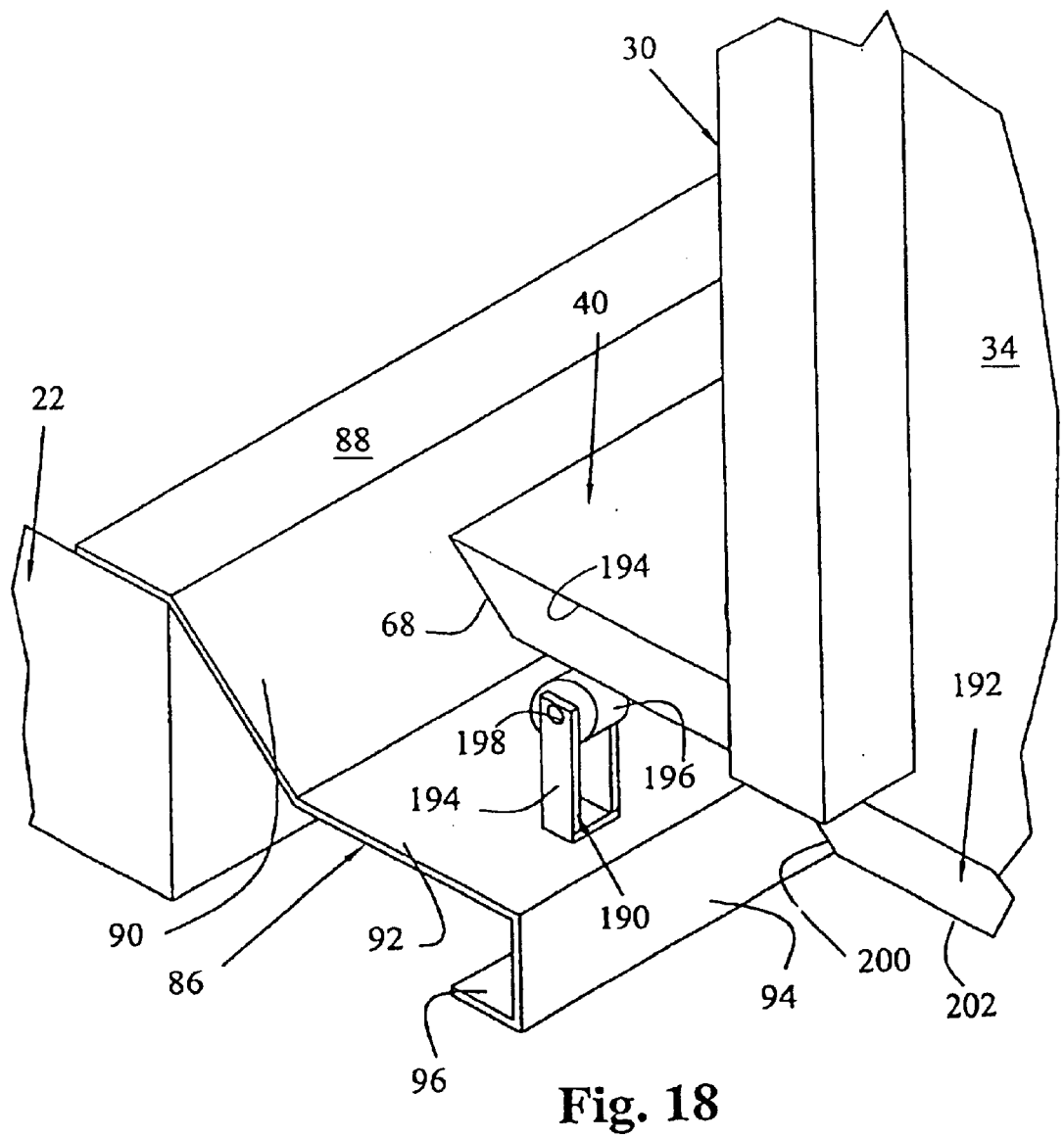
FIGS. 18–20A show other embodiments of a lifting mechanism comprised of rollers which lift the slide-out room.
Figure 19:
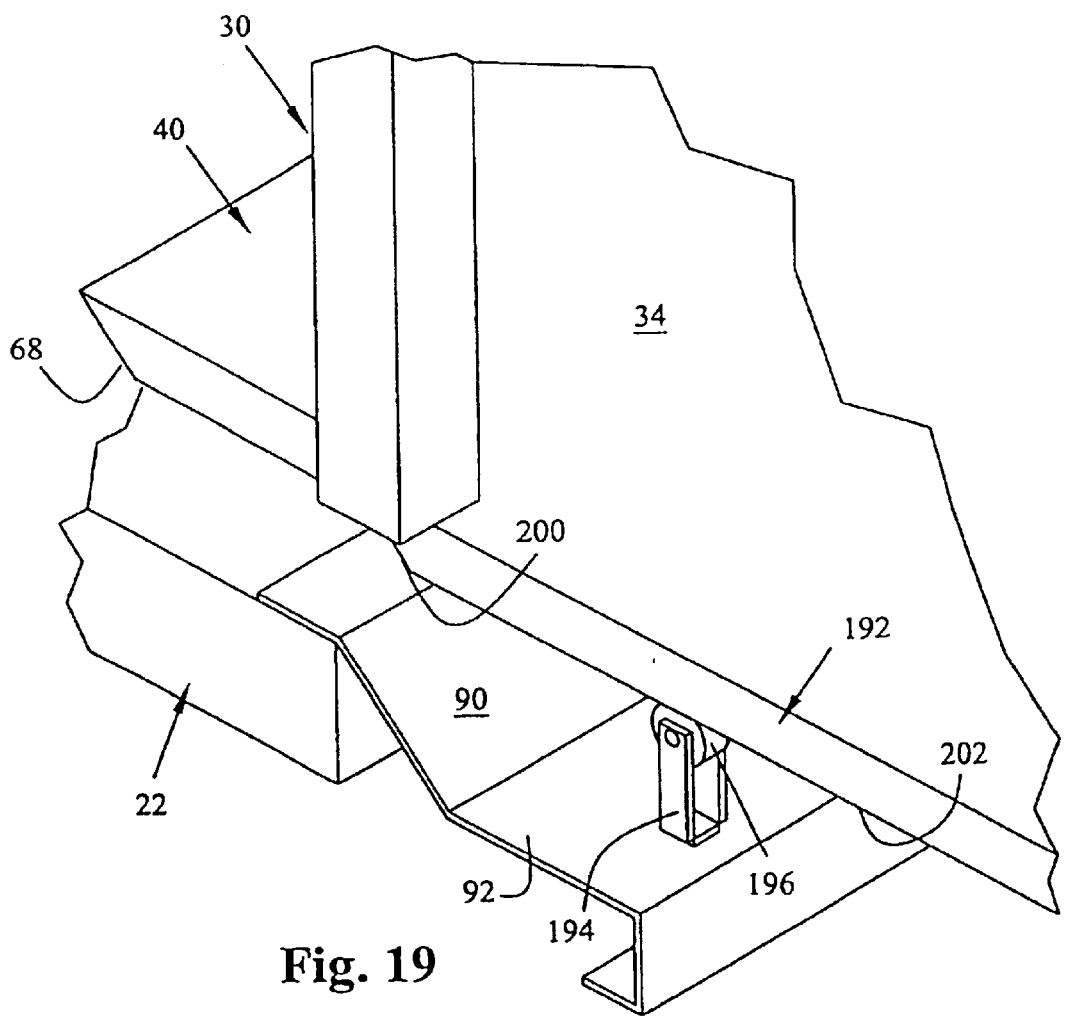
Figure 20A:
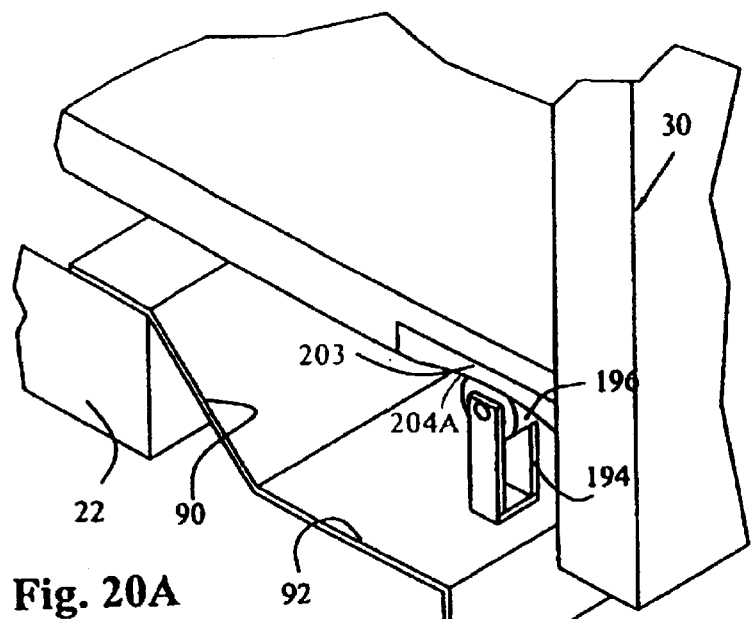
Figure 20:
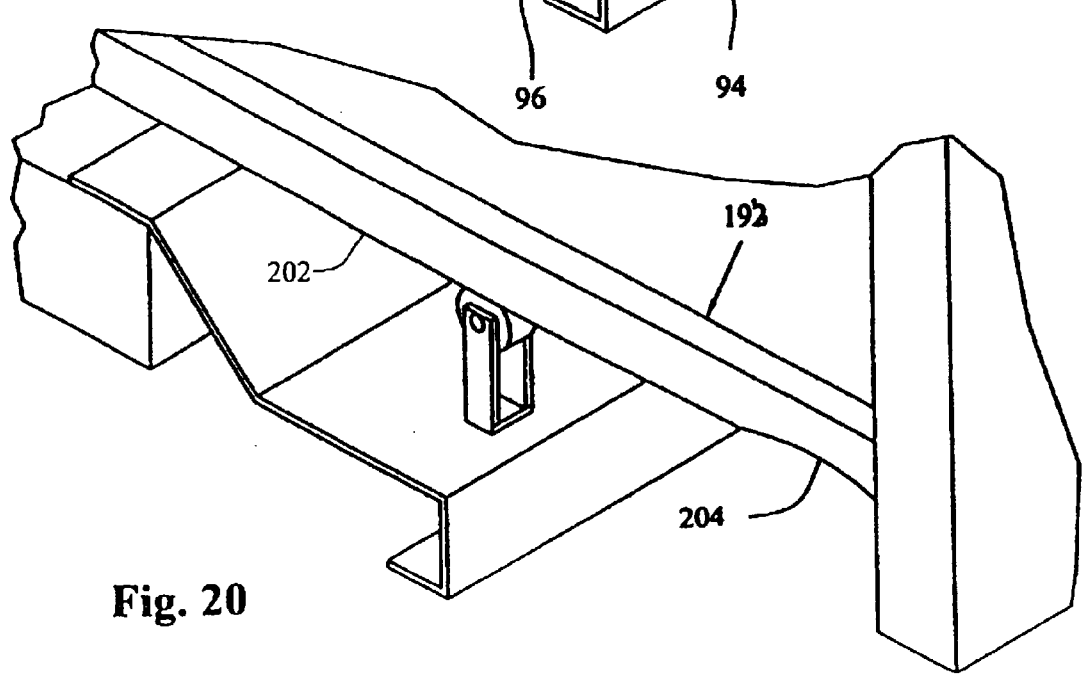

With respect now to FIGS. 18–20, another elevating mechanism is shown including a static roller mechanism 190 and including a side rail 192. As shown in FIG. 18, the roller mechanism 190 includes an upstanding yoke member 194 having a roller 196 pinned at 198 between its yoke arms. The roller mechanism 190 is positioned and fastened to horizontal ledge 92 of ramp 86 by any suitable means. Side rail 192 is attached to a side edge 194 of floor 40, and includes a leading edge 200 and a horizontal edge 202. As shown in FIG. 20, the horizontal edge 202 leads into a contoured surface at 204, as best shown in FIG. 20.

In this embodiment, as the slide-out room moves from the fully extended position shown in FIG. 18, the tapered portion 68 of the floor 40 of slide-out room 30 begins to progress upwardly along sloping portion 90. Continued retraction of slide-out room 30 causes the leading edge 200 of rail 192 to engage roller 196 and lift the slide-out room 30 to the position shown in FIG. 19. Finally, with respect to FIG. 20, further retraction of the slide-out room 30 causes the slide-out room to lower itself down, due to the influence of the contoured surface 204 in engagement with the roller 196.

An alternate embodiment is shown in FIG. 20A, where in place of rail 192 along the side edge, an insert 203 is positioned, transverse of the slide-out room 30, and has a contoured surface 204A.

Figure 21:
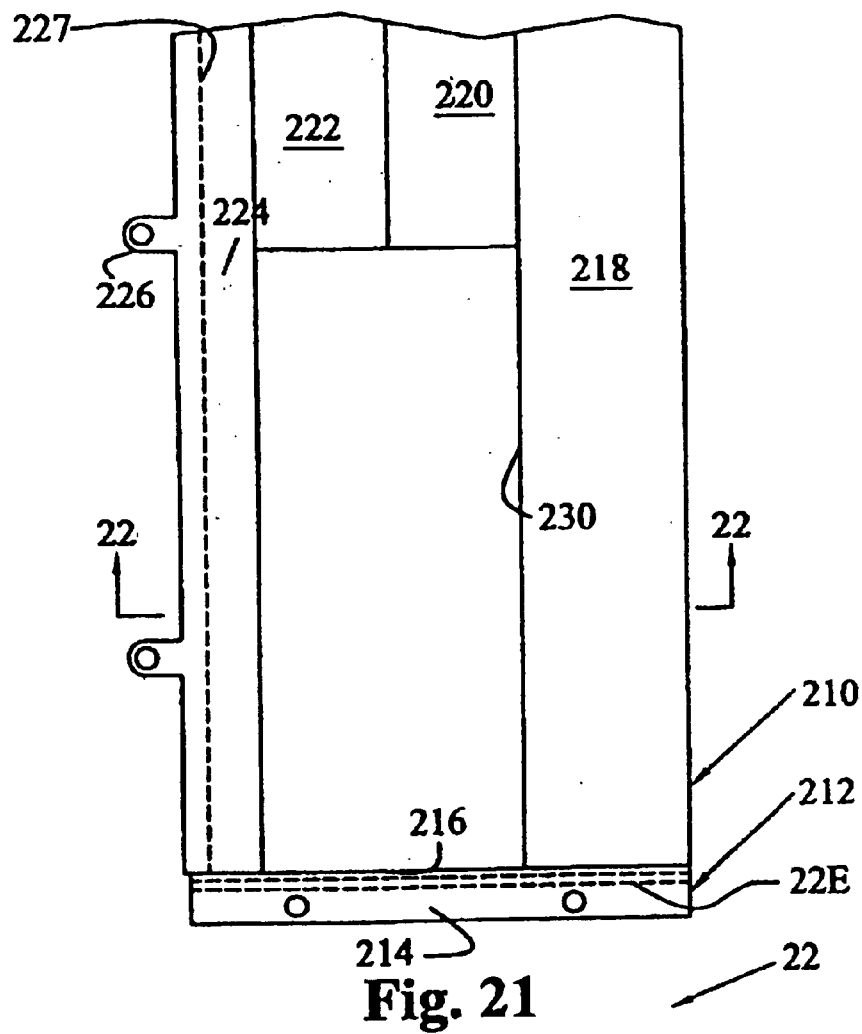
FIG. 21 shows a top plan view partially fragmented of a conventional ramp mechanism installed to the main room floor of a recreational vehicle, modified to provide an aperture through the ramp to receive a lifting mechanism.
Figure 22:
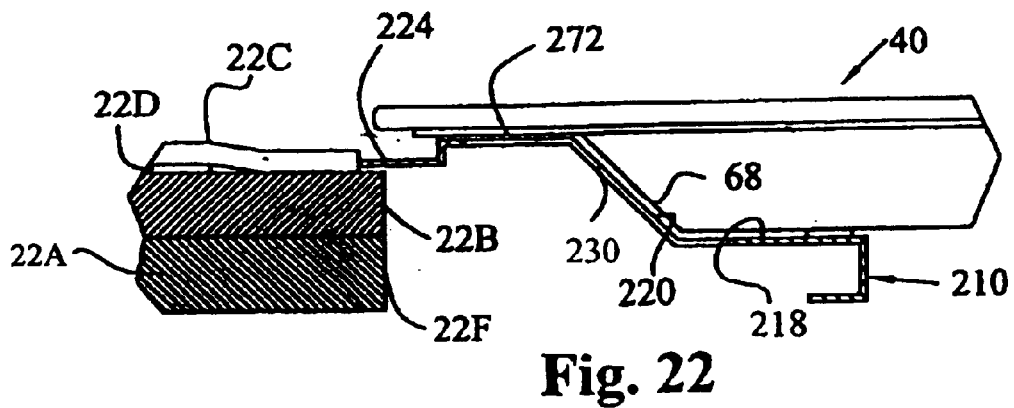
FIG. 22 is a cross-sectional view through lines 22—22 of FIG. 21.
Figure 98:
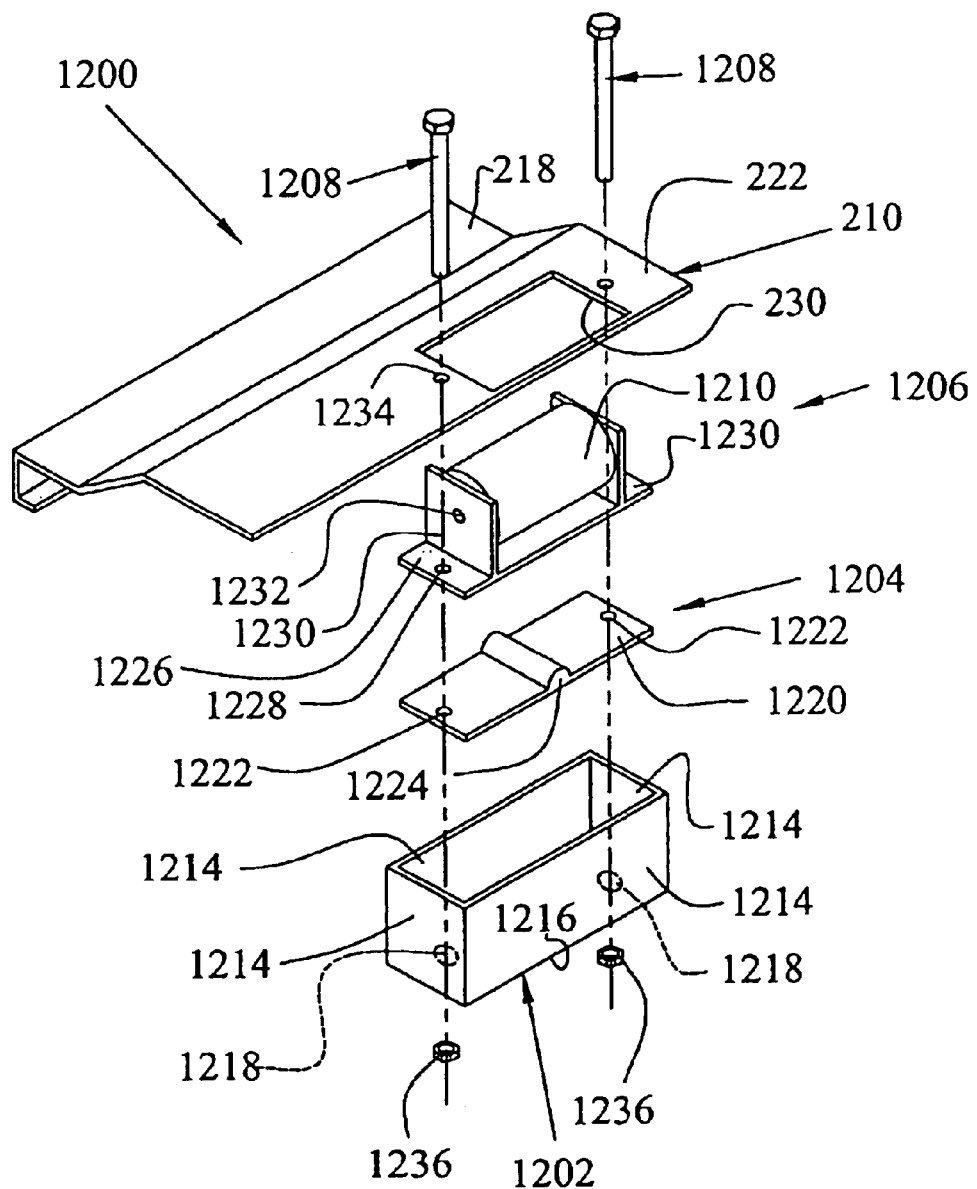
FIG. 98 is an exploded, perspective view of the embodiment of FIG. 97.

The remaining embodiments, that is, those shown in FIGS. 21 through 98, show a lifting mechanism which projects through the ramp mechanism and thus the ramp mechanism must be modified to include an aperture therethrough. As shown in FIGS. 21 and 22, the main room floor 22 is shown which generally comprises the subfloor 22A, a particle board 22B, on top of which finished flooring is typically applied, for example, in this case carpeting 22C with padding 22D. In order to accommodate the modified ramp mechanism 210, the main floor 22 is cut in a rectangular shape to include side edges 22E (only one of which is shown in FIG. 21) and a longitudinal cut edge at 22F. The ramp mechanism 210 is generally rectangular in shape to be positioned within the rectangular opening defined by edges 22E, 22F, and somewhat overlies the main room floor as shown in FIG. 22. The ramp mechanism 210 includes an angle bracket member 212, which includes a horizontal plate portion 214 and a vertical extension 216, which would extend into the opening formed by side edges 22E to lie adjacent thereto. The ramp mechanism 210 would further include a lower surface such as 218, a ramp section 220, and an upper surface 222. An extension 224 extends from the upper surface 222 to overlay particle board 22B and be attached thereto by way of fasteners (not shown) through eyelets 226. As described in relation to FIGS. 21 and 22, it should be clear that slide-out room 30 can slide up ramp 220 to a position to overlie the carpet 22C. Finally, as best shown in FIG. 21, the ramp mechanism 210 further includes an opening at 230 for receiving a variety of lifting mechanisms therethrough. It should also be appreciated that the opening 230 can take on any configuration given the geometry of the lifting mechanism, without departing from the scope of the invention.

Figure 23:
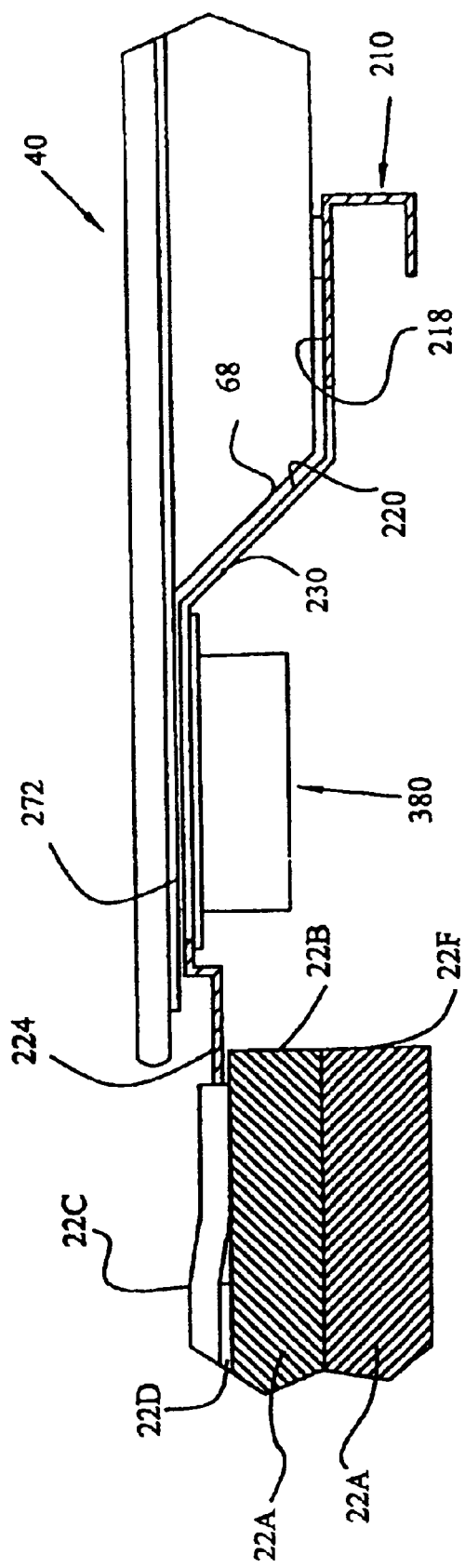
FIG. 23 is a view similar to that shown in FIG. 22, showing a lifting mechanism according to the present invention.
Figure 24:
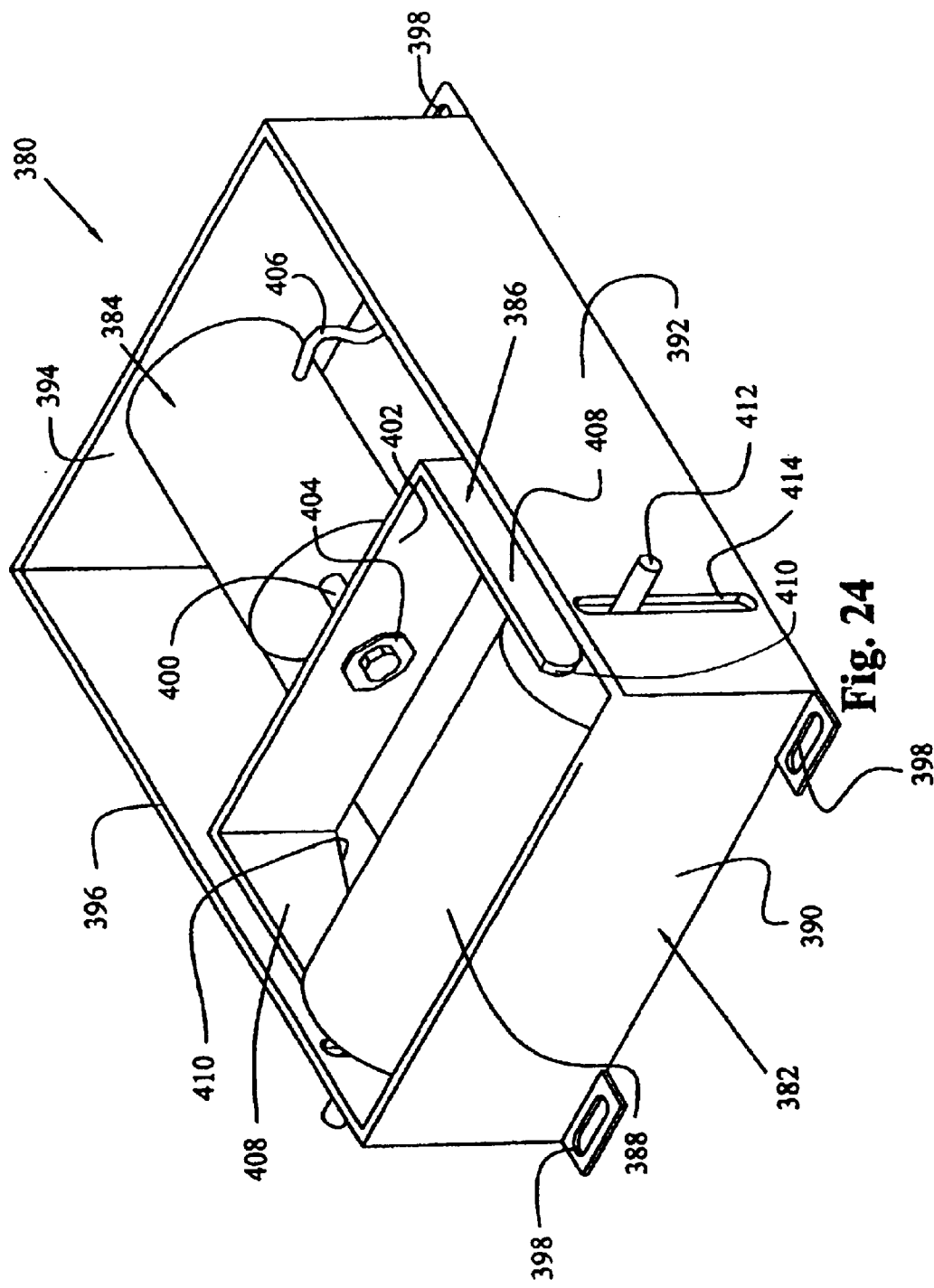
FIG. 24 shows a lower perspective view of the lifting mechanism according to FIG. 23.

FIGS. 23 and 24 depict a first lifting mechanism including a pair of hydraulically actuated lifting assemblies 380 (only one of which is shown). As shown best FIG. 24, each lifting assembly 380 generally includes a mounting bracket 382, a cylinder 384, a camming lever 386, and a roller 388. Lifting assemblies 380 are mounted to the lower side of ramp mechanism 210, as best shown in FIG. 23.

As can best be seen with reference to FIG. 24, mounting bracket 382 includes four walls 390, 392, 394, and 396. Walls 390 and 394 include mounting tabs 398 having openings to facilitate mounting of mounting bracket 382 to ramp 210. Cylinder 384 is mounted to wall 394 and houses a telescopic shaft 400, having one end interior to cylinder 384, and another end connected to camming lever 386. Telescopic shaft 400, which may be spring-biased rearwardly toward cylinder 384, extends through an opening (not shown) in wall 402 of camming lever 386 and is attached to wall 402 by nut 404. A piston (not shown) is connected to the interior end of shaft 400 and disposed within cylinder 384. Hydraulic fluid is pumped into and out of cylinder 384 through outlet 406 in the same manner as discussed with respect to previous lifting mechanism. Camming lever 386 also includes a pair of cams 408, which extend perpendicularly from the ends of wall 402, and has an angled, camming surface 410 along its lower edge.

Roller 388 houses axle 412, which is centrally disposed within roller 388. Axle 412 extends out of each end of roller 388 through a pair of aligned retaining slots 414 formed in walls 392, 396 of mounting bracket 382. The extent to which roller 388 is allowed to rise and fall is limited by the length of slots 414. As shaft 400 is driven out of cylinder 384, camming lever 386 is urged toward wall 390 of mounting bracket 382. Camming surfaces 410 of cams 408 engage axle 412 of roller 388, thereby urging axle 412 and roller 388 downwardly. The farther rollers 388 are extended upwardly through opening 230 of ramp mechanism 210, the farther room 30 is lifted or elevated relative to vehicle floor 22.

Figure 25:
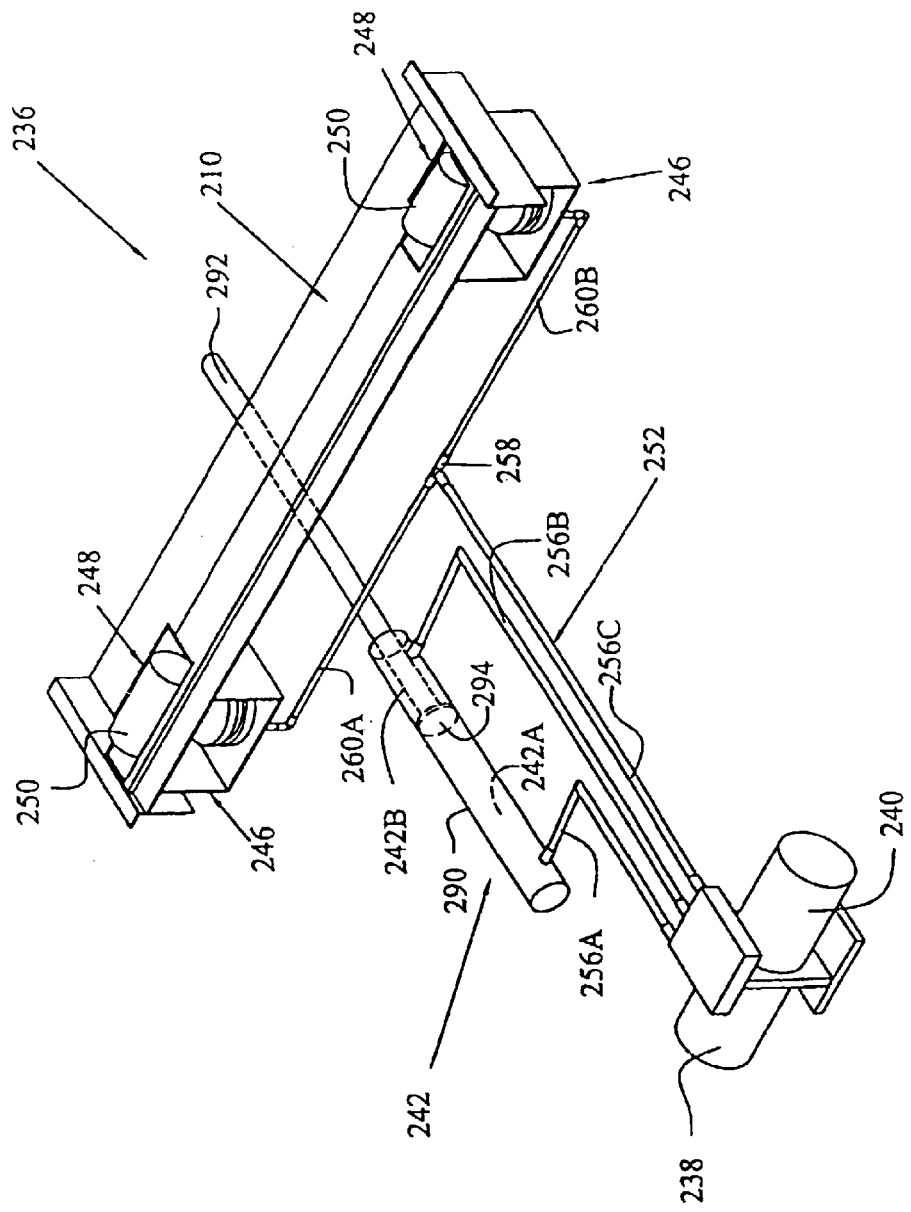
FIG. 25 is a perspective view of an alternate lifting mechanism according to the present invention.

With respect now to FIG. 25, a lifting mechanism is shown as hydraulic lifting mechanism 236. Although lifting mechanism 236 is described herein as being hydraulically powered, it is contemplated that lifting mechanism 36 could be pneumatically, electrically, or mechanically actuated. Also, while many of the components of the embodiments described below are shown or described as being mounted below floor 22 of vehicle 10, it should be appreciated that the present invention could readily be adapted for use either within floor 22 or above floor 22 of vehicle 10.

Lifting mechanism 236 generally includes a motor 238, a pump 240, a cylinder 242, and a pair of pancake cylinders 246 mounted within opening 230 of ramp mechanism 210 for actuating roller assemblies 248, having rollers 250. Any conventional motor may be used to drive pump 240, and motor 238 may be mounted below floor 22 of vehicle 10.

In FIG. 25, pump 240 is a unidirectional pump, and in this embodiment is only capable of lifting room 30. As shown in FIG. 25, pump 240 includes a network of tubing 252, including a first outlet 256A, a second outlet 256B, and a third outlet 256C, all connected to pump 240. First outlet 256A is also connected to the rear chamber 242A of cylinder 242 so that when hydraulic fluid is pumped from pump 240 through first outlet 256A, it fills rear chamber 242A of cylinder 242. Second outlet 256B is also connected to cylinder 242, but is connected so that hydraulic fluid pumped through outlet 256B fills the forward chamber 242B of cylinder 242. Third outlet 256C is connected through a T-connector 258 and tubing 260A, 260B to pancake cylinders 246, and is separately controlled such that hydraulic fluid will not be supplied to pancake cylinders 246 unless and until sufficient pressure has been reached in one of rear chamber 242A or forward chamber 242B of cylinder 242. The required pressure is determined by utilizing a sensor (not shown), which provides a signal to motor 238 to enable third outlet 256C.

Figure 26:
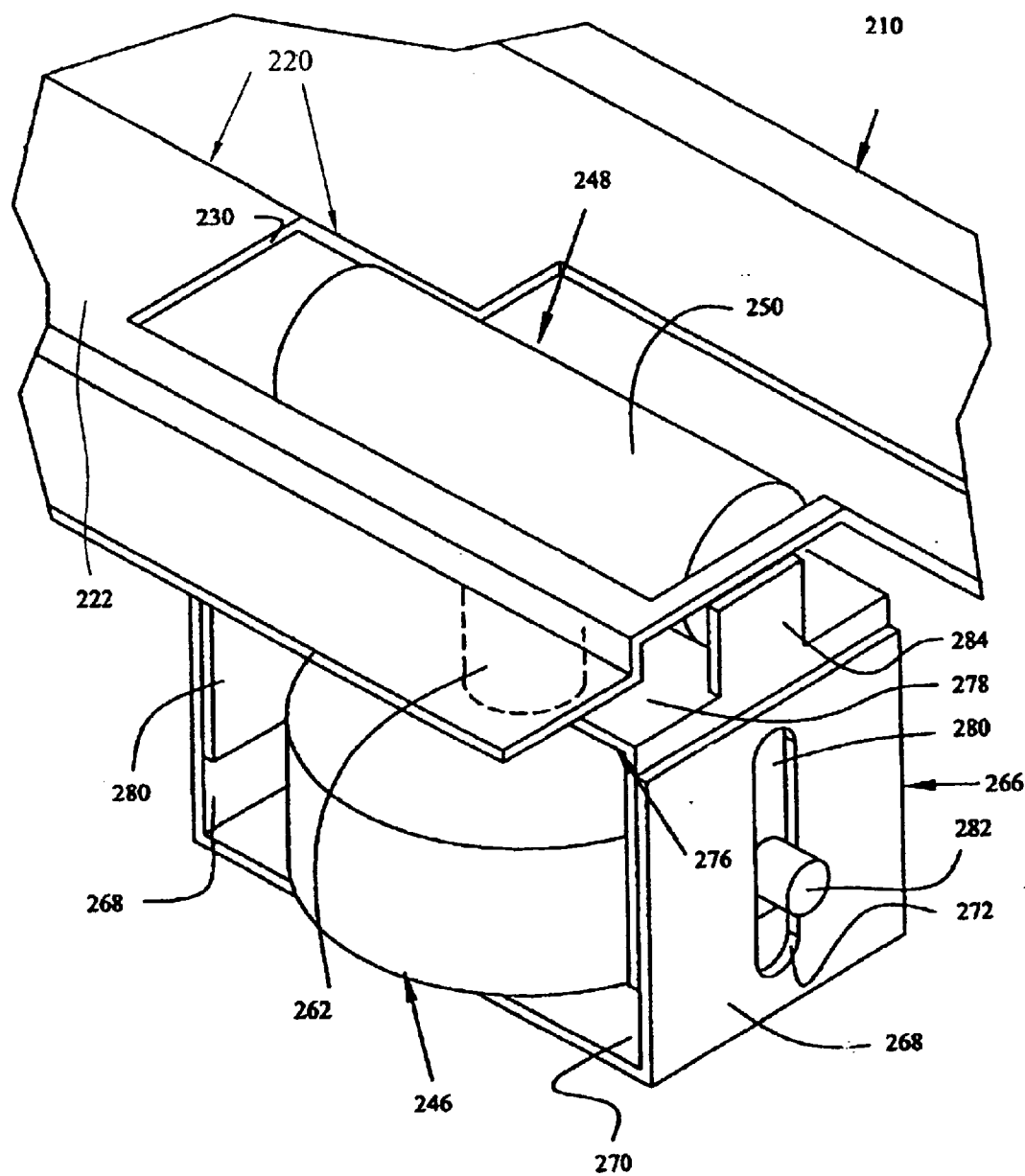
FIG. 26 is an enlarged, partially fragmented view which illustrates components for limiting the movement of the pancake cylinders shown in FIG. 25.

With respect to FIG. 26, a detailed view of a pancake cylinder 246 and roller assembly 248 is shown. Each pancake cylinder 246 houses a telescopic shaft 262 which has one end connected to roller assembly 248, and the other end connected to a piston (not shown) within pancake cylinder 246. The piston defines upper and lower chambers (not shown) within cylinder 246. Pancake cylinder 246 is disposed within and supported by a cylinder support bracket 266. Cylinder support bracket 266 is fixed relative to ramp mechanism 210, and mounted to the framework of vehicle 10. Cylinder support bracket 266 includes a pair of side walls 268 and a bottom wall 270. Each side wall 268 of cylinder support bracket 266 includes a slot 272.

Roller assembly 248 generally includes a roller support bracket 276 supporting roller 250. Roller support bracket 276 includes a top wall 278 and a pair of downwardly extending side walls 280. Each downwardly extending side wall 280 includes a rod 282 which extends outwardly through a corresponding slot 272 of side wall 268 of cylinder support bracket 266. Roller support bracket 276 further includes a pair of supports 284 which extend upwardly from top wall 278. Roller 250 is connected to supports 284 via an axle (not shown) which runs through a centrally disposed opening in roller 250 and is supported by supports 284.

As should be apparent from the foregoing, when fluid is pumped into the lower chamber of pancake cylinder 246, telescopic shaft 262 is urged upwardly, thereby driving top wall 278 of roller support bracket 276 upwardly. Upward and downward movement of roller support bracket 276 is limited by the length of slots 272 of cylinder support brackets 266 which are engaged by rods 282. As roller support bracket 276 is driven, roller 250 moves upwardly through opening 230 in sloping portion 220 and upper surface 222 of ramp mechanism 210.

With reference again to FIG. 25, cylinder 242 includes a cylindrical outer housing 290, and a telescopic shaft 292. One end of shaft 292 is connected to back wall 32 of room 30, and the other end extends into cylinder 242 and is connected to a piston 294. Piston 294 divides cylinder 242 into rear chamber 242A and forward chamber 242B. As indicated above, when pump 240 pumps hydraulic fluid through first outlet 256A into rear chamber 242A of cylinder 242, piston 294 drives shaft 292 outward. Because shaft 292 is connected to back wall 32 of room 30, as shaft 292 is driven out of cylinder 242, room 30 is moved out toward its extended position. Similarly, when hydraulic fluid is pumped through second outlet 256B, it enters forward chamber 242B of cylinder 242, and piston 294 drives shaft 292 farther into cylinder 242, moving room 30 towards its retracted position. Once a sufficient pressure is reached within cylinder 242, outlet 256C, which connects to pancake cylinders 246, is enabled, and hydraulic fluid is allowed to flow into pancake cylinder 246.

A delay in lifting pancake cylinders 246 results from separately controlling the flow of fluid through third outlet 256C. This delay is advantageous because it prevents cylinders 246, and roller assemblies 248, to which pancake cylinders 246 are connected, from rising too quickly. If pancake cylinders 246 and roller assemblies 248 are allowed to rise too quickly, ceiling 38 of room 30 may come into contact with the top edge of opening 28 while room 30 is being moved through opening 28.

As pump 240 pumps hydraulic fluid through third outlet 256C into the lower chamber of cylinders 246, shaft 262 moves upward, and as shaft 262 is connected to roller assembly 248, as shaft 262 is driven out of cylinders 246, room 30 raises, thereby minimizing contact between the floor of room 30 with the finished floor surface or carpeting 22C of vehicle 10. Because pump 240 is unidirectional and thus only able to supply fluid to the lower chamber of pancake cylinders 246, shafts 262 (and therefore roller assemblies 248) are not lowered hydraulically. Therefore, pancake cylinders 246 may be gravity or spring return. Thus, when room 30 is moved either to its extended or retracted position, the weight of room 30 pushes roller assembly 248 and shafts 262 downward.

Figure 27:
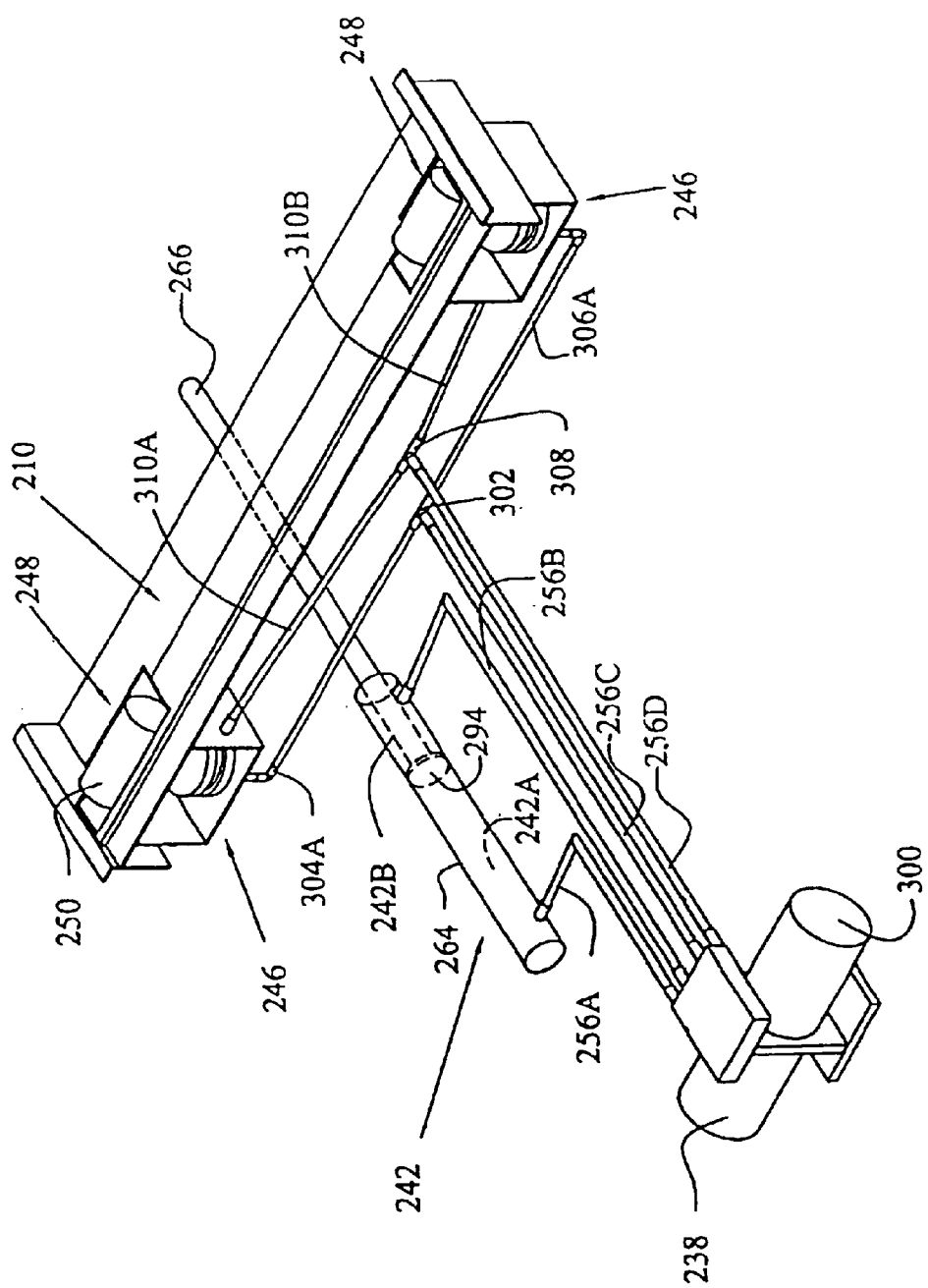
FIG. 27 illustrates a variation of the lifting mechanism of FIG. 25.

FIG. 27 is substantially similar to FIG. 25, but depicts pump 300, which is a bi-directional pump. As a result, shafts 262 of pancake cylinders 246 may be raised lowered hydraulically. The third outlet 256C connects through T-connector 302 and tubing 304a, 306a to the lower chamber of pancake cylinders 246. A fourth outlet 256D is included which connects through T-connector 308 and tubing 310A, 310B to the upper chamber of pancake cylinders 246. This arrangement makes it possible to both raise and lower pancake cylinders 246 hydraulically. As discussed above regarding pump 240, when a sufficient pressure is reached within cylinder 242, pump 300 pumps hydraulic fluid through either one of third outlet 256C or fourth outlet 256D, thus driving shafts 262 of pancake cylinders 246 either out of or into pancake cylinders 246. Specifically, when fluid is pumped into the lower chambers of pancake cylinders 246, via outlet 256C, shafts 262 are driven upwardly to lift rollers 250 of roller assemblies 248, thereby raising room 30. When hydraulic fluid is pumped into the upper chambers of cylinders 246, via outlet 256D, shafts 262 are cylinders 246, thus lowering rollers 250 and room 30.

Figure 28:
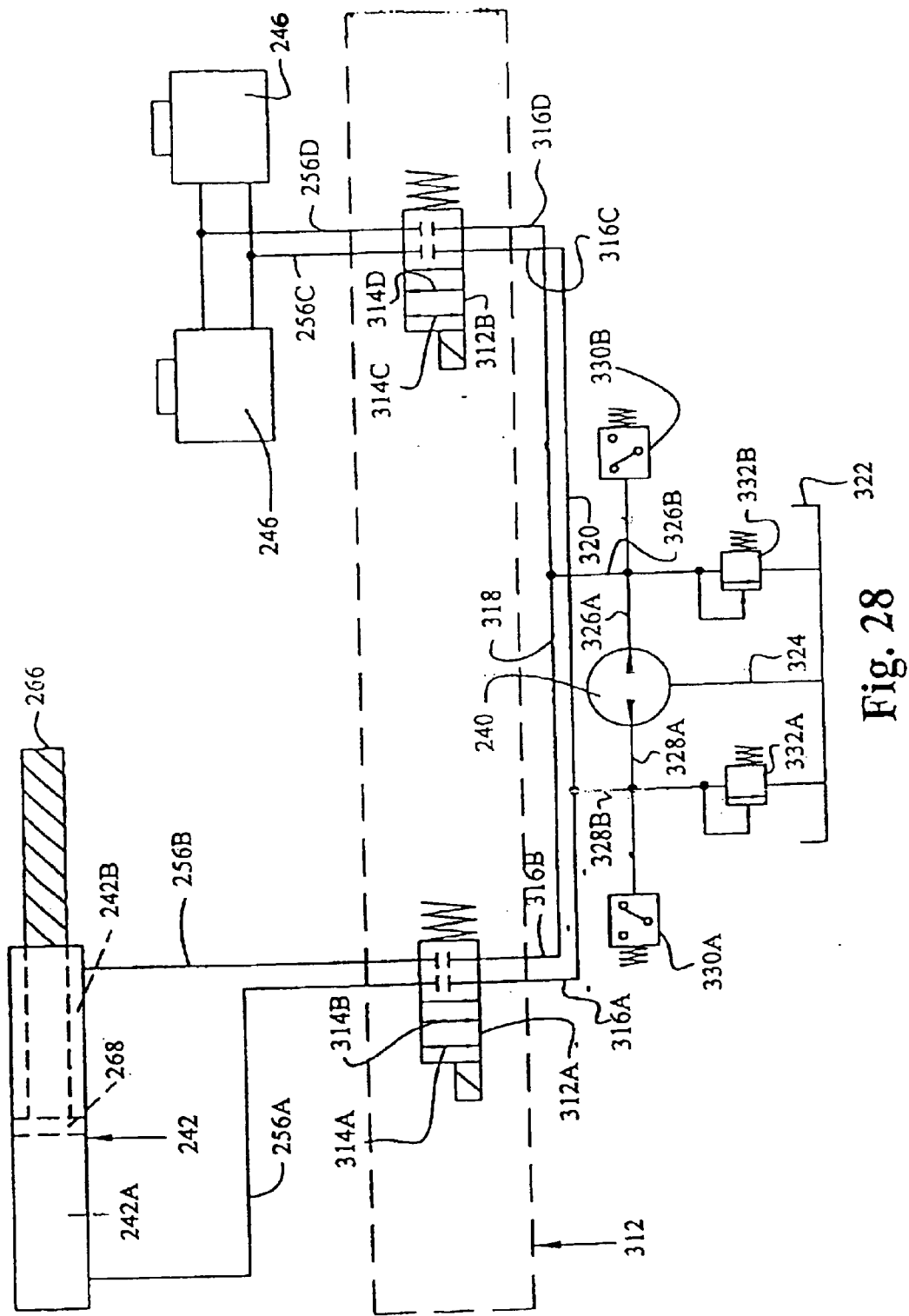
FIG. 28 illustrates a hydraulic schematic for use with the lifting mechanism of FIG. 27.

FIG. 28 shows a hydraulic schematic for the hydraulic circuit of FIG. 27. Valve 312 is connected to cylinder 242 by way of lines 256A, 256B, and is also interconnected to pancake cylinders 246 via interconnections 256C and 256D. Valve 312 further includes internal slides 312A, 312B, including ports 314A, 314B, 314C, and 314D. Meanwhile valve 312 further input connections at 316A, 316B, 316C, and 316D. It should also be noted that connections 316B and 316D share a common intersection at 318, while connections 316A and 316C share a common intersection at 320. Bi-directional pump 240 is interconnected to reservoir 322 through line 324, and is interconnected to interconnection 318 via portions 326A and 326B. Meanwhile bi-directional pump 240 is interconnected to interconnection 320 via interconnections 328A and 328B. Switches 330A and 330B are spliced into lines 328B and 326B, respectively, to sense the pressure at those points, and relief valves 332a and 332b are connected to the same points and return to the reservoir 322.

The device will now be described, first with the understanding that the slide-out room is in the fully retracted position. It is also with the understanding that a controller would be included and possibly with a microprocessor to run several of the following controls and/or sequences. However, to run the slide-out room 30 from the fully retracted to the fully extended position, the following actuations would be made. First a main switch would be initiated, which would first cause slide 312B to move to the right as viewed in FIG. 28, to interconnect lines 256C, 314C and 316C; and lines 256D, 314D and 316D, respectively. Bi-directional pump 240 would then operate to supply fluid to lines 328A and thereafter into lines 328B to fill interconnection 320. The fluid can only operate into line 316C, as slide 312A continues to have ports 256A and 316A, and 256B and 316 blocked. Thus, fluid travels through line 316C to line 256C to raise both pancake cylinders as described above. Meanwhile the fluid on the opposite side of piston and pancake cylinders 246D is moved through line 256, 314D, 316D, and back to reservoir through lines 326B, 332B. It is anticipated that the controller would be timed to a certain time limit such that the pancake cylinders would be fully raised, for example, to a time of three seconds, whereby the controller would move slide 312B back to the position blocking ports 256C, 316C, 356D, and 316D. Controller would then operate slide 312A to the right interconnecting lines 256A, 314A, 316A; and 256B, 314B and 316B. The continued pressure from pump 240 causes fluid flow from interconnection 320 into lines 316A and into cylinder chamber 242A causing piston 268 to be moved to the right as viewed in FIG. 28, causing piston rod 266 to cause slide-out room 30 to move to the fully extended position. The volume of fluid in chamber 242B of cylinder 242 is caused to move back to the reservoir 322 through lines 256B, 316B, as in the previous discussion.

It should be clear that the opposite or retraction of piston rod 266 operates in identically the opposite manner, that is, where controller first operates bi-directional pump 240 to cause fluid to operate first through cylinder slide 312A to move fluid into chamber 242B of cylinder 242. After the cylinder is fully retracted, controller moves slide 312A back to the blocked position and operates slide 312B to now cause a retraction of the pancake cylinders to drop slide-out room floor 40.

Switches 330A and 330B can either be placed in the FIG. 28 embodiment for safety purposes, or can be used as an alternative to the automatic control version as described above. In this case, for example, for moving from a fully retracted to a fully extended position, bi-directional pump 240 and slide 312B are activated causing fluid through line 256C as previously discussed. However, when pancake cylinders reach their top position, pressure builds up in line 256C, 316C and 328B, which is picked up by switch 330A. Switch 330A closes valve slide 312B and opens valve slide 312A. This causes a filling of cylinder chamber 242A and causes piston rod 266 to move to the fully extended position. When the piston rod is in the fully extended position, pressure is built up in line 256A, 316A and 328B, and switch 330A is again activated closing valve slide 312A. At the same time, slide 312B is now moved to the open position causing pancake cylinders to retract to lower the room floor.

While not fully described herein, it should be obvious from the above that the hydraulic circuit could also include a single direction pump, as opposed to the bi-directional pump 240 disclosed herein, but would include pilot-operated check valves between the analogous lines 326B, 328B for protection of the system.

Figure 29:
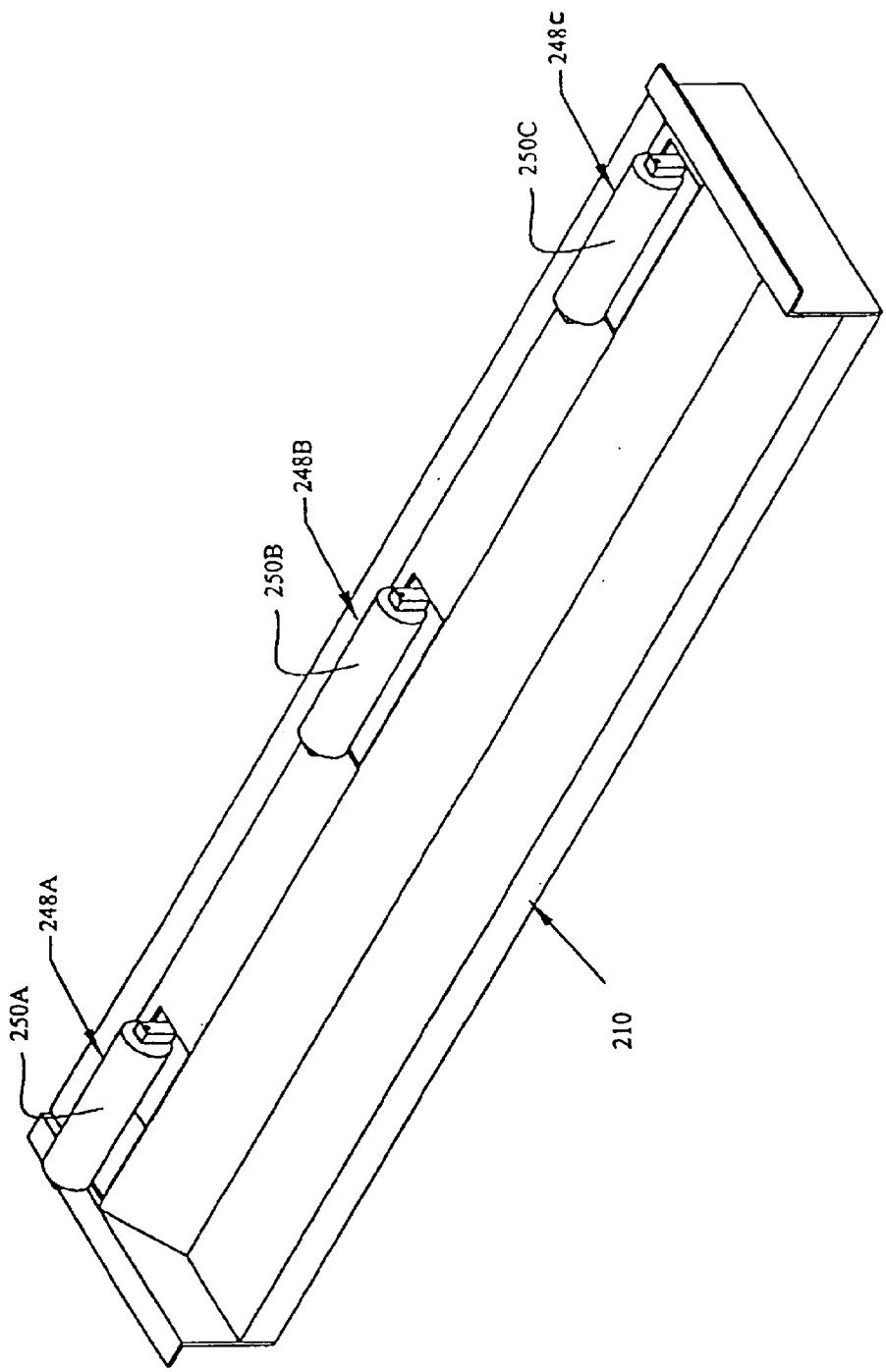
FIG. 29 is a perspective view of a lifting mechanism according to the present invention, including a plurality of rollers.

FIG. 29 depicts another embodiment of the invention, wherein ramp mechanism 210 includes a plurality of roller assemblies 248A, 248B, 248C, with each roller assembly including a corresponding roller as shown in the figure. By providing an additional intermediate roller assembly 248B, the center of room 30 is supported, thus preventing sagging of floor 40 of room 30.

Figure 30:
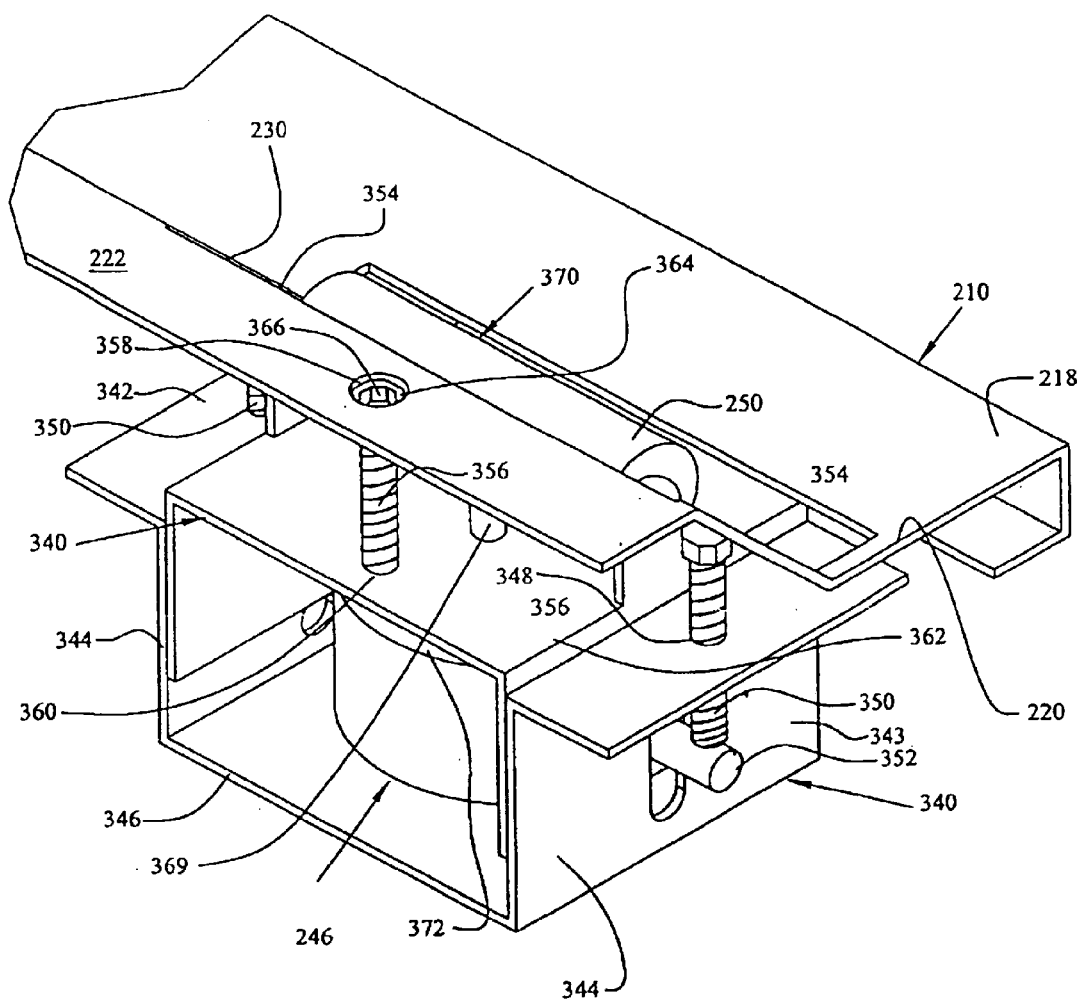
FIG. 30 is a partially fragmented, perspective view showing the components of an alternate embodiment to that of FIG. 26.

FIG. 30 is similar to FIG. 26, where cylinder support bracket 340 includes a flange 342 which extends outwardly from side wall 344 in substantially parallel relationship to bottom wall 346. Each flange 342 includes a threaded opening 348. Up-stop bolts 350 extend through openings 348 in flanges 342 such that up-stop bolts 350 are in a position to come into engagement with rods 352 of roller support bracket 340. The heads 354 of up-stop bolts 350 are accessible through opening 230 in ramp mechanism 210 to allow manual adjustment of the position of up-stop bolts 350 to limit the travel of rods 352 (and therefore, roller 250). Up-stop bolts 350 are independent of one another, such that one up-stop bolt 350 may be adjusted in a different manner or to a different degree than the other up-stop bolt 350.

Also depicted in FIG. 30 is a down-stop bolt 356, which extends through an opening 358 in upper portion 222 of ramp mechanism 210, and through a threaded opening 360 in top wall 362 of roller support bracket 340. The head 364 of down-stop bolt 356 includes a hex opening 366 which is accessible through opening 358 to allow for the manual adjustment of the position of down-stop bolt 356 relative to pancake cylinder 368. As roller assembly 370 drops downwardly when hydraulic pressure is removed from the lower chamber of pancake cylinder 368, via shaft 369 (or when fluid is pumped into the upper chamber of cylinder 368), down-stop bolt 356 drops downwardly and engages an upper surface 372 of cylinder 246, preventing further downward travel of roller support bracket 340 and roller 250. Accordingly, the length of bolt 356 which extends below top wall 362 determines how far down roller 250 can drop through opening 230.

Figure 31:
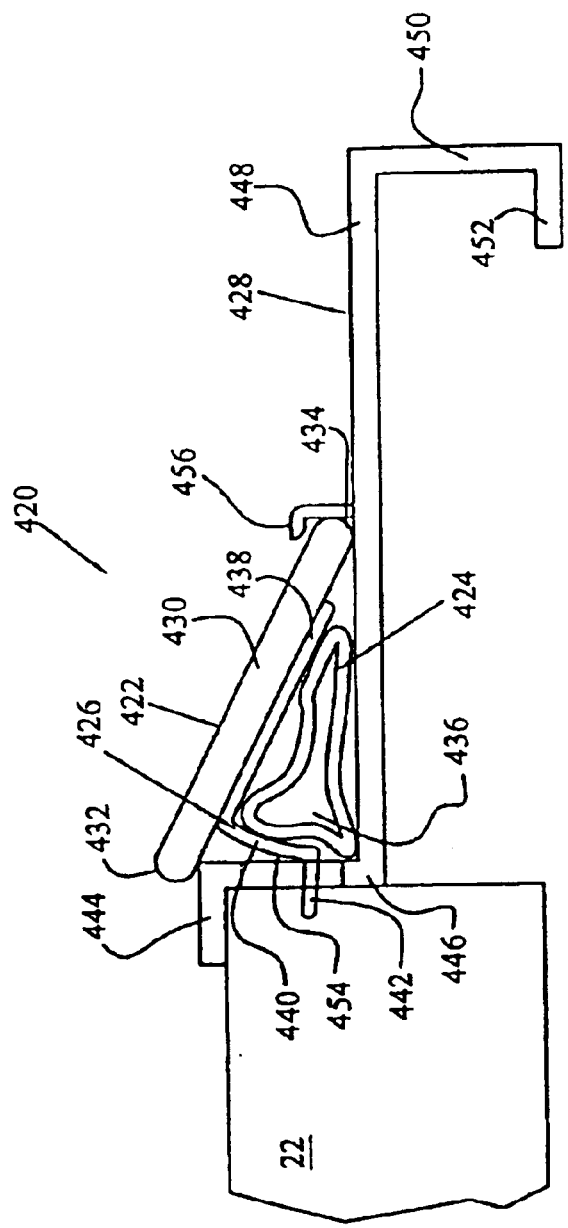
FIG. 31 is a side elevational view of another embodiment of a lifting mechanism according to the present invention.
Figure 32:
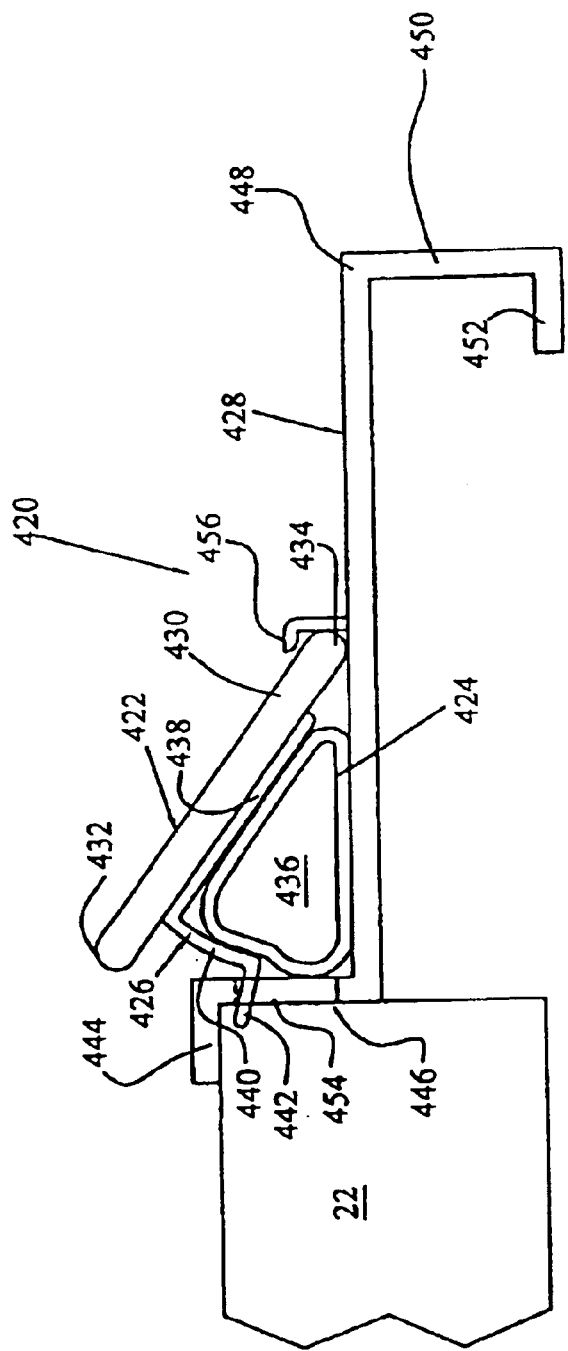
FIG. 32 is a side elevational view of the embodiment of FIG. 31 in the fully actuated position.

FIGS. 31 and 32 illustrate another embodiment of a lifting assembly 420 according to the present invention. Lifting assembly 420 generally includes a wear plate 422, an inflatable tube 424, and a bracket 426, and which is used in conjunction with a modified ramp 428. It should be noted that this device could also project upwardly through opening 230 of ramp mechanism 210. Wear plate 422 may extend substantially the length of ramp 428, and includes a body 430, an upper edge 432, and a lower edge 434. Inflatable tube 424 (shown in cross section) may be formed of a durable, flexible material which is impermeable to the material used to inflate tube 424 (e.g., air, water, oil, etc.) such as fire hose material or reinforced rubber. Tube 424 includes an opening (not shown) which is connected to a pump (not shown) for providing the inflating material, and defines an internal chamber 436. Bracket 426 includes a support wall 438 which is connected to the lower surface of wear plate 422, an arcuate wall 440 which extends away from wear plate 422, and a stop 442 which may be removable and is substantially perpendicular to arcuate wall 440. Ramp 428 includes an upper portion 444, a vertical portion 446, a front portion 448, a lower portion 450, and a ledge portion 452. Vertical portion 446 includes a slot 454, and front portion 448 includes a retainer 456.

Upon assembly, tube 424 may be positioned along ramp 428 adjacent vertical portion 446. Lower edge 434 of wear plate 430 may then be positioned under retainer 456. When wear plate 422 and bracket 426 are lowered into the position shown in FIG. 21, stop 442 may be inserted through slot 454 and attached (such as by threading) to arcuate wall 440.

In operation, when room 30 is to be lifted, material is pumped into inflatable tube 424 such that tube 424 expands as shown in FIG. 32. This expansion of tube 424 urges bracket 426 and wear plate 422 upwardly, from the position shown in FIG. 31 to the position shown in FIG. 32. Since lower edge 434 of wear plate 430 is retained by retainer 456, wear plate 422 pivots upwardly into the position shown in FIG. 34. The travel of wear plate 422 is limited by the mechanical interference between slot 454 and stop 442. A plurality of openings may be provided along arcuate wall 440 to receive stop 442, thereby permitting adjustment of the height of upper edge 432 of wear plate 422 above vehicle floor 22 when in the raised position as shown in FIG. 34.

Figure 33:
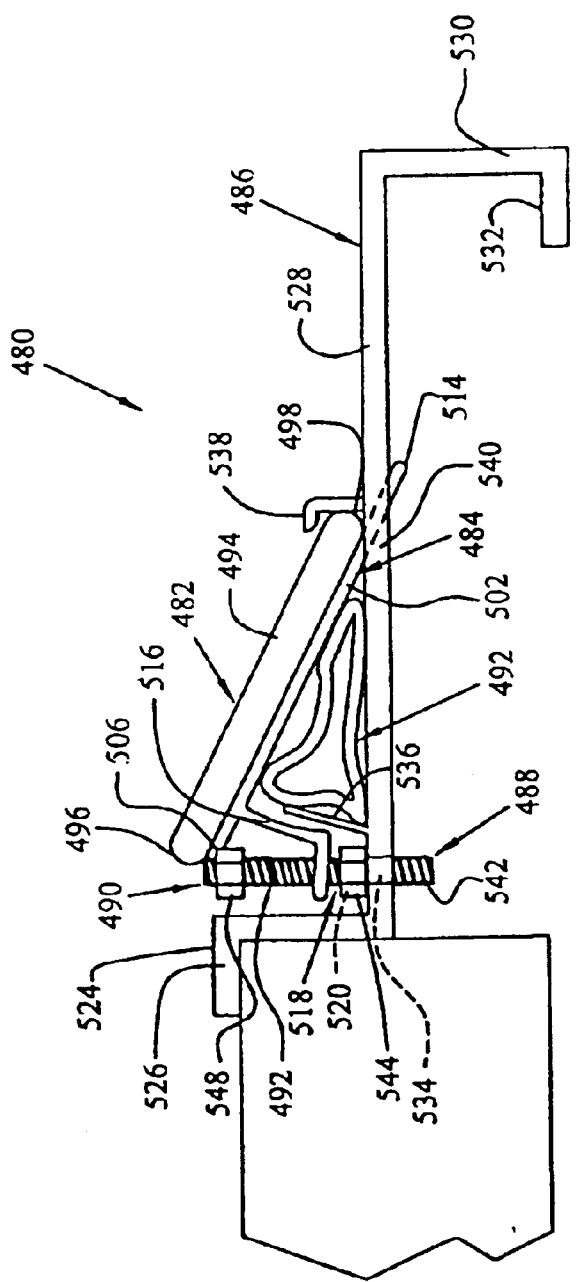
FIGS. 33 and 34 are side elevational views of another variation of the embodiment of FIG. 31.
Figure 34:
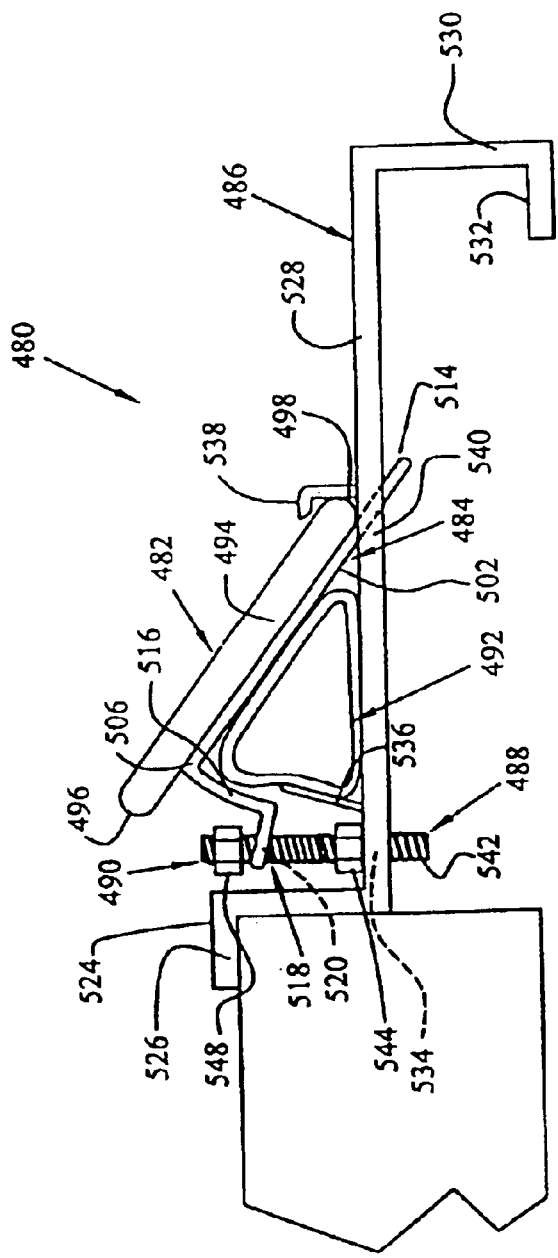
Figure 35:
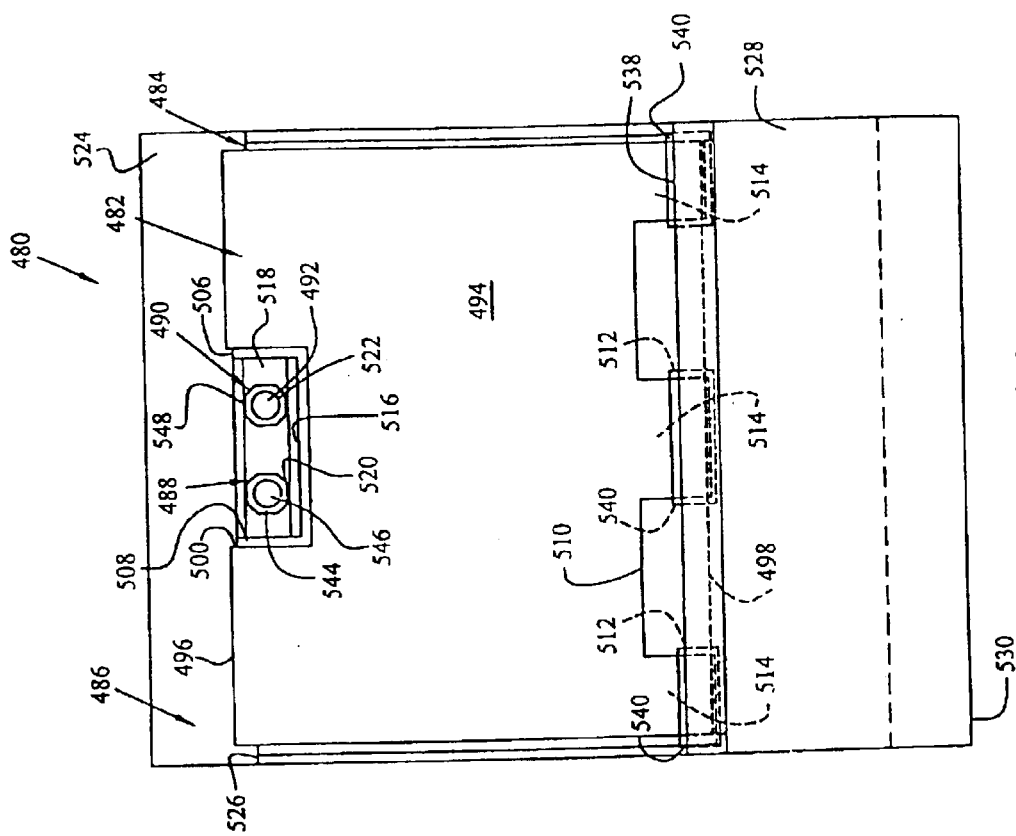
FIG. 35 is a top plan view of the embodiment of FIGS. 33 and 34.

FIGS. 33–35 depict a further embodiment 480, which is a variation of lifting assembly 420, which includes adjustable up and down stop positions. Lifting assembly 480 generally includes a wear plate 482, a bracket 484, a modified ramp 486, a down stop 488, an up stop 490, and an inflatable tube 492. Wear plate 482 includes a body 494 having an upper edge 496 and a lower edge 498. As best shown in FIG. 35, wear plate 482 further includes a notch 500 along upper edge 496. Bracket 484 includes a support wall 502 fixedly attached to wear plate 482 and an arcuate retention wall 504. Support wall 502 includes an upper edge 506 having a notch 508 aligned with notch 500 of wear plate 482, and a lower edge 510 having a pair of notches 512 which form tabs 514. Arcuate wall 516 extends along an arc from the lower surface of support wall 502, and includes a substantially perpendicular flange 518 along its free edge. As will be further described below, flange 518 includes a first opening 520 to facilitate adjustment of down stop 488, and a second opening 522 for receiving a portion of up stop 490. Ramp 486 includes an upper portion 524, a vertical portion 526, a front portion 528, a lower portion 530, and a ledge portion 532. Front portion 528 includes a threaded opening 534 for receiving down stop 488, a retention wall 536 which extends upwardly from front portion 528 along an arc corresponding to the arc of arcuate wall 516, a retainer 538, and three slots 540 (FIG. 35) for receiving tabs 514 of support wall 502. Down stop 488 is a hex bolt having a threaded portion 542 and a head 544 with a drive opening 546 (FIG. 35) for receiving an adjustment tool such as an Allen wrench. Up stop 490 includes a threaded shaft 492 which is fixedly attached at one end (such as by welding) to front portion 528 of ramp 486, and a nut 548 which is threaded onto shaft 492.

Upon assembly, down stop 488 is first threaded into opening 534. After connection to a pump (not shown), tube 492 is placed onto ramp 486 adjacent retention wall 536. Tabs 514 of bracket 484 are then inserted into openings 540 of ramp front portion 528, and the bracket 484/wear plate 482 assembly are lowered onto down stop 488. It should be understood that the configuration of tabs 514, openings 540, and retainer 538 function like a hinge to permit wear plate 482 to pivot between a down position (shown in FIG. 33) and an up position (shown in FIG. 34). Finally, nut 526 of up stop 490 is threaded onto shaft 492.

As should be apparent from the foregoing, the down position of wear plate 482 is determined by the position of down stop 488, and the up position is determined by the position of up stop 490. When tube 492 is deflated (as in FIG. 33), flange 518 rests on head 544 of down stop 488 because the diameter of head 544 is larger than the diameter of opening 520 of flange 518 (FIG. 35). The down position may be adjusted by placing an adjustment tool through opening 520 into drive opening 546, and rotating down stop 488 further into or out of threaded opening 534 of ramp 486. When tube 492 is inflated (as in FIG. 34), the upward movement of wear plate 482 is limited by nut 548 because the inside dimension of opening 522 of flange 518 is smaller than the outside dimension of nut 548. The up position of wear plate 482 may be adjusted by rotating nut 548 into a different vertical position on threaded shaft 492.

Figure 36:
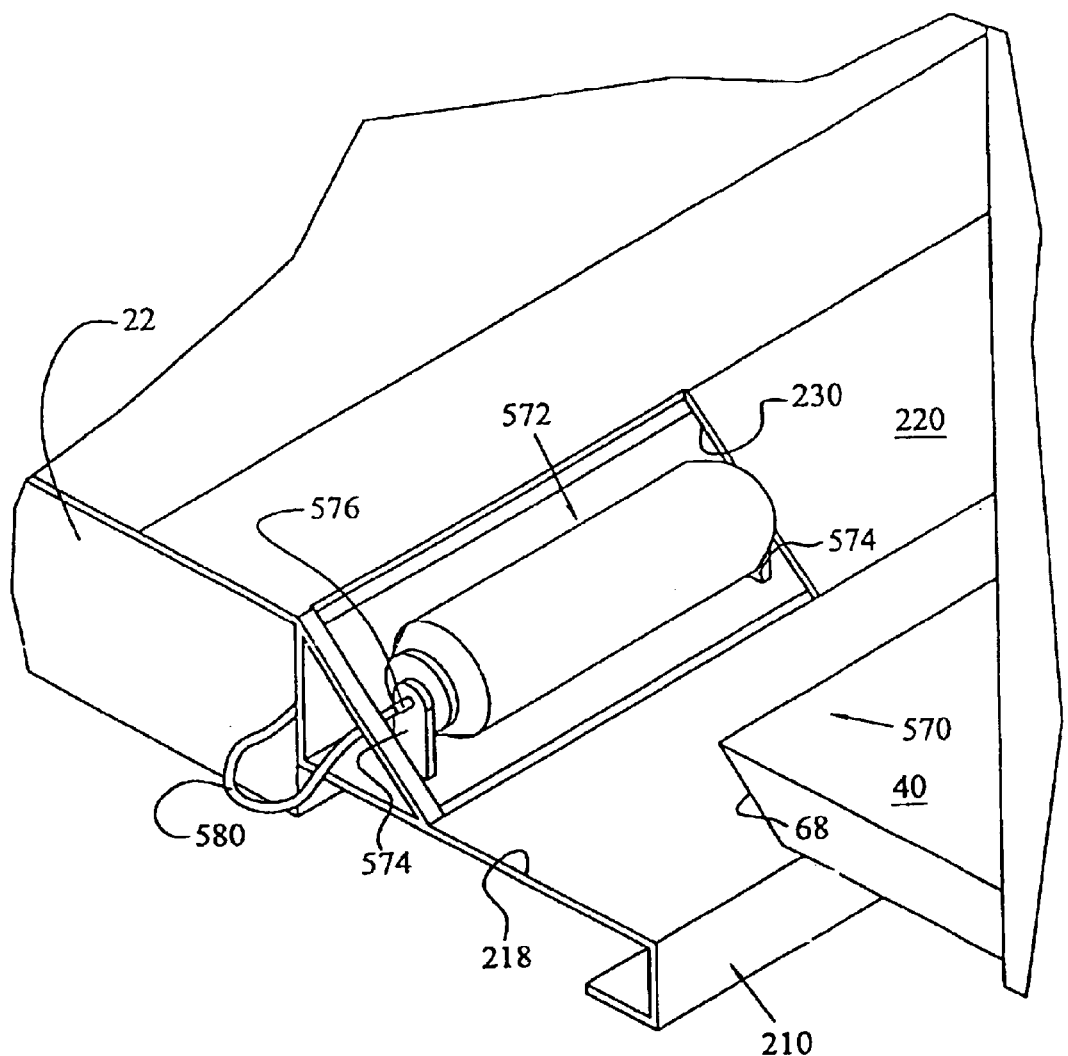
FIGS. 36 and 37 show an alternate embodiment of the invention with an inflatable roller to lift the slide-out room.
Figure 37:
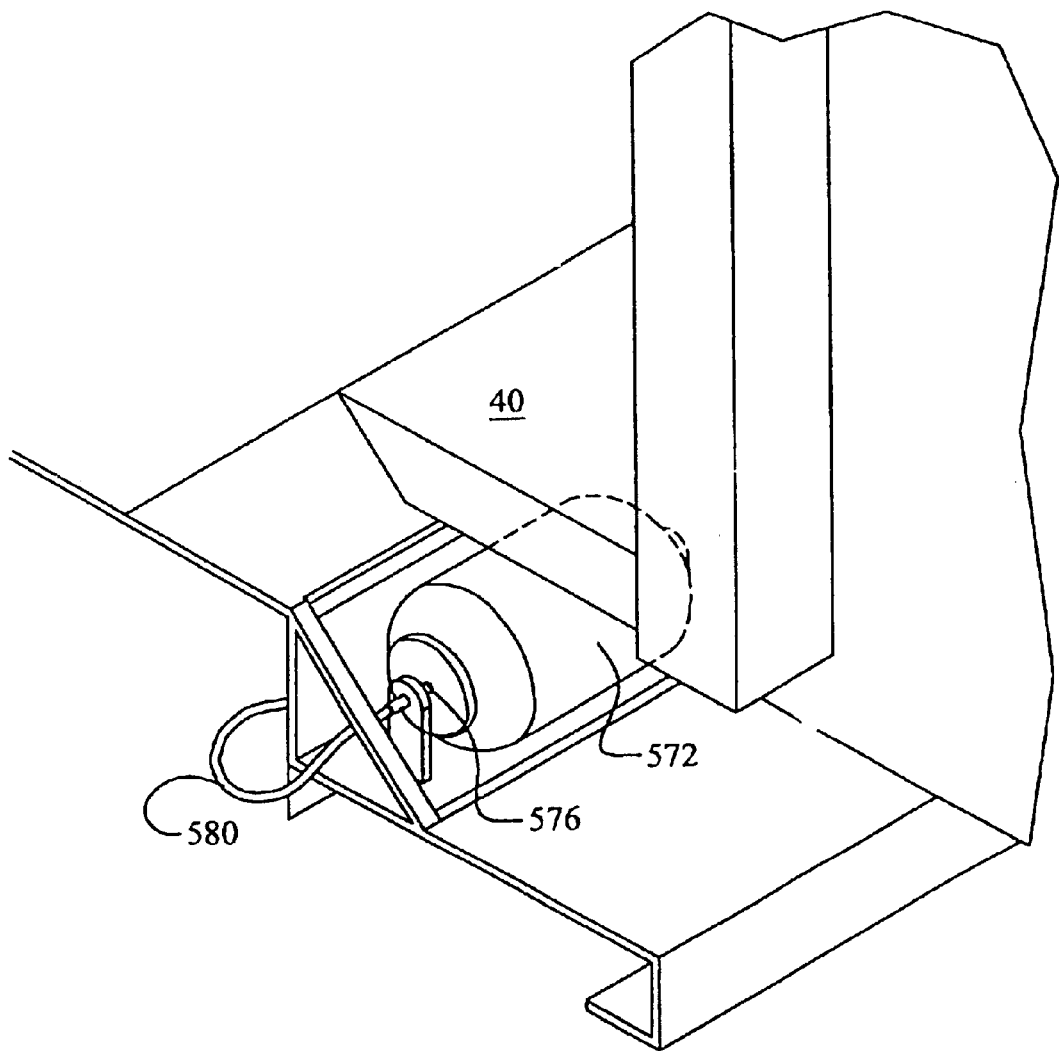

With respect now to FIGS. 36 and 37, another alternate embodiment of the invention is shown as a lifting mechanism 570, which too provides a lifting force through aperture 230 of ramp mechanism 210. Lifting mechanism 570 includes an inflatable and expandable roller mechanism 572, which is, supported by upstanding yoke arms 574 and axle 576. A fluid line 580 is attached to axle member, for carrying some means of fluid power, such as air or hydraulics into axle member 576, which would include a communication within roller mechanism 572. Upon pressurizing line 580, roller 572 expands diametrically from the position shown in FIG. 36, to the position shown in FIG. 37, and lifts the slide-out room floor 40 above main room floor 22. It should be appreciated that the inflation of the roller 572 could be timed with a control unit (not shown) for moving the slide-out room between the extended and retracted positions. This timing could include inflation of the roller 572 upon initial retraction to the point of full retraction, whereby the rollers 572 could deflate and the floor could be lowered to its resting position. Also, when the slide-out room starts into extension, the roller could be inflated to lift the slide-out room floor above the main floor and again be deflated once it is in its fully extended position to lower the floor to a flush floor position.

Figure 38:
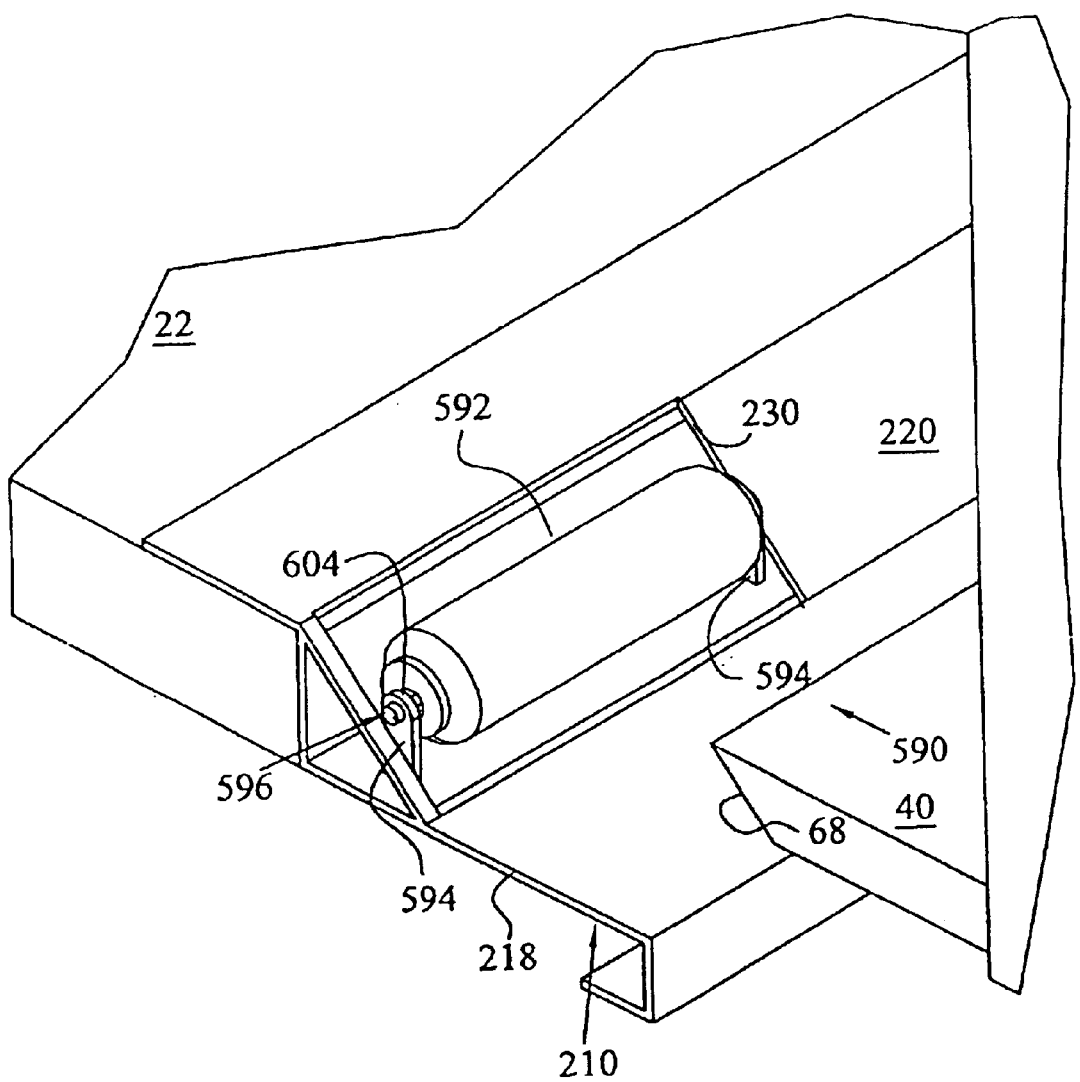
FIGS. 38 and 39 are views similar to that of FIGS. 36 and 37, but show a roller which can be contracted upon contact with the slide-out room.
Figure 39:
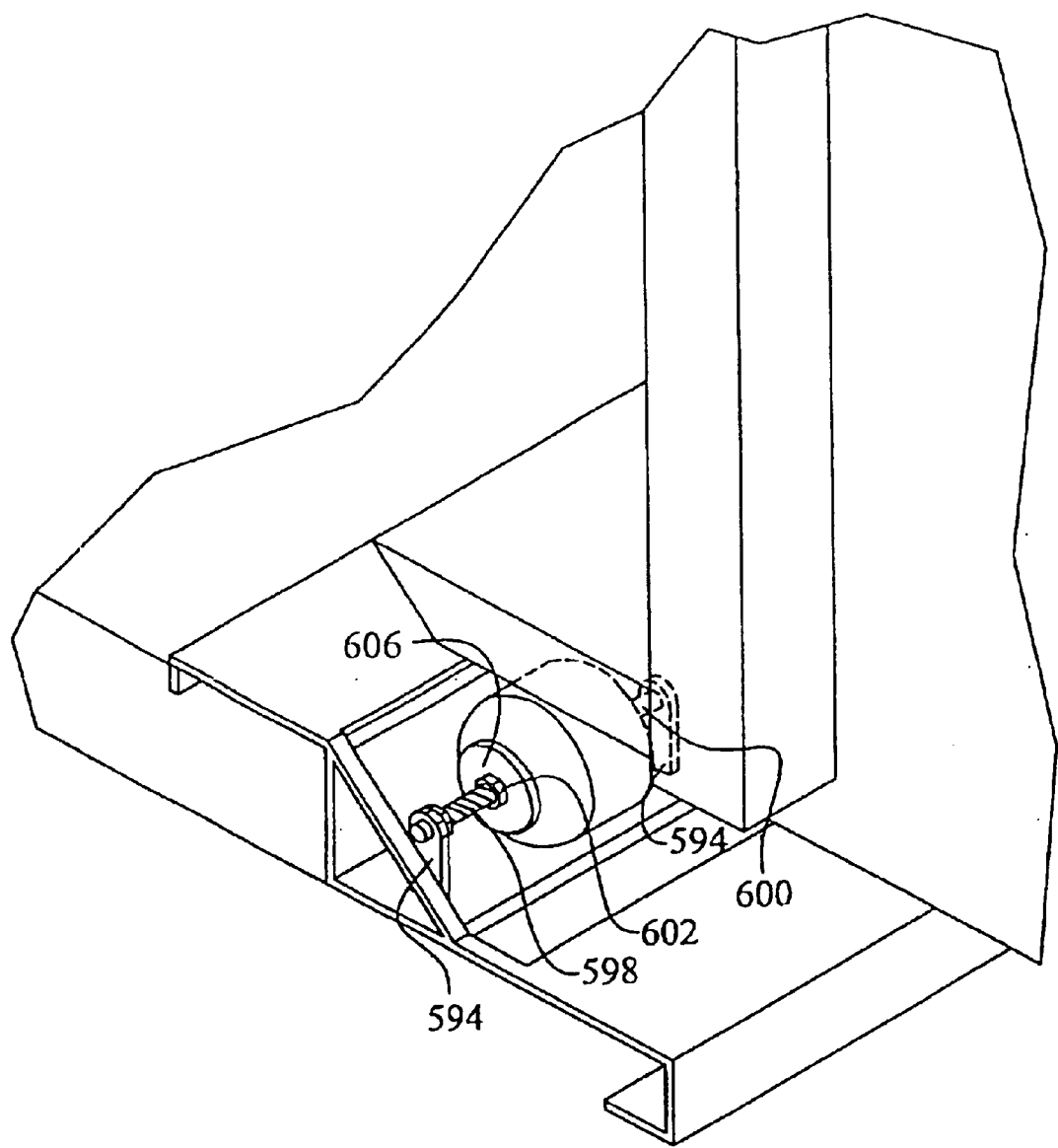

With respect to FIGS. 38 and 39, a manually adjustable roller mechanism 590 is shown, which is similarly configured as that of FIGS. 36 and 37, yet includes a mechanism for manually expanding and contracting roller mechanism 592. Mechanism 590 also includes a pair of upstanding yoke arms 594 and axle 596 extending therethrough. Axle member 596 includes two separate threaded portions, that is, threaded portion 598 having a right-hand thread, and portion 600 having a left-hand thread. Member 590 further includes a right-hand nut 602 and a left-hand nut 604 threadable onto shaft portions 598, 600, respectively. Backup washers 606 are positioned intermediate the roller mechanism 592 and the nuts 602, 604. Axle portions 598 and 600 are not threaded to their associated yoke members 594, but rather simply spin relative to them and are laterally fixed therebetween. Rather, nuts 602, 604 and washers 606 are fixed to roller 592 and spin therewith.

Upon movement from the position shown in FIG. 38 to the position shown in FIG. 39, that is, during the retraction sequence, slide-out room floor 40 slides across associated surface 218 of ramp mechanism 210 to a position, where lead-in section 68 of floor 40 contacts roller member 592. Roller member 592, due to the friction between the slide-out room floor and the rubbery-like exterior surface of roller 592, begins to spin together with its associated nuts 602, 604 and backup washers 606. Due to the opposite thread direction of axle portions 598, 600, as the slide-out room retracts, nuts 602 and 604 both move inwardly towards the center of roller 592 and cause the contraction as shown in FIG. 39.

Figure 40:
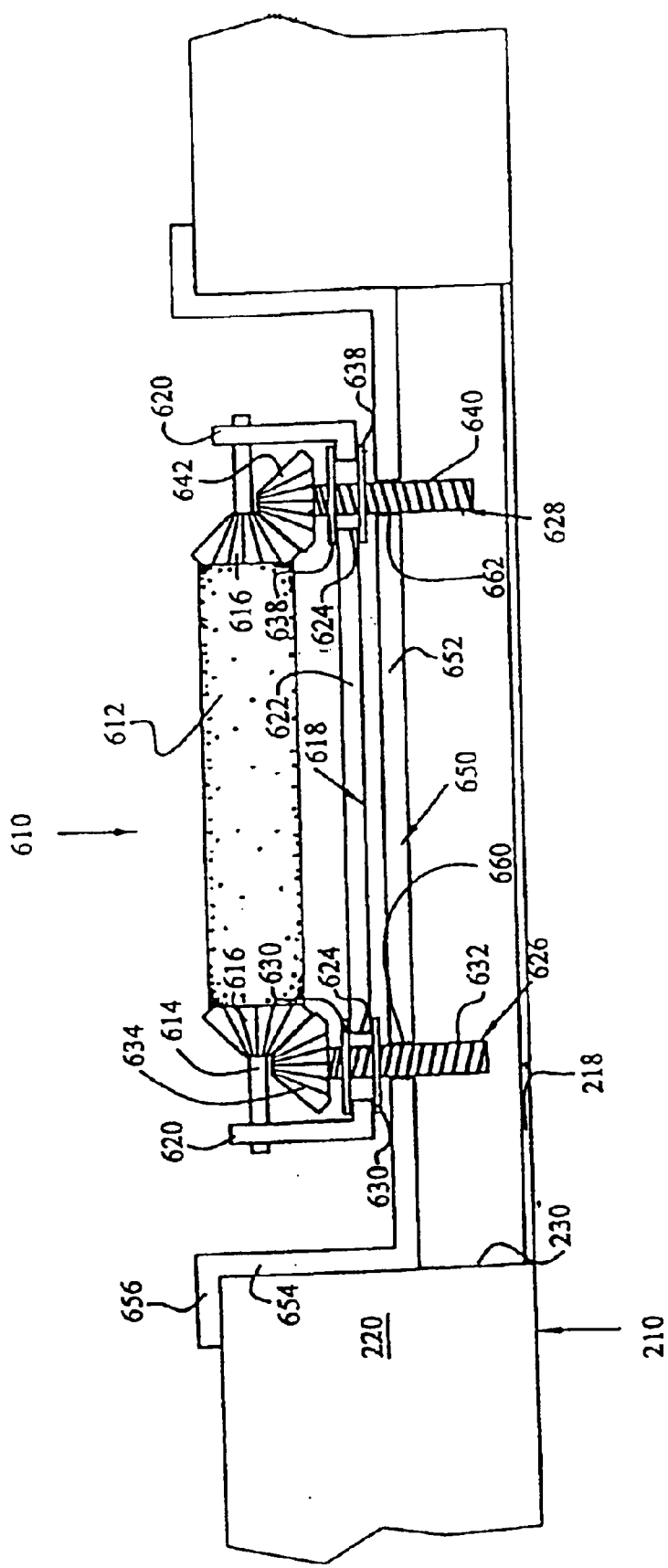
FIG. 40 shows a roller which lifts itself due to movement of the room over the roller.

With respect now to FIG. 40, another embodiment of lifting mechanism is shown at 610 including roller 612 having an axle 614 fixed to roller 612 and having pinion gears 616 fixed to its ends. Roller 612 and axle 614 are mounted within a tray member 618 having upstanding yoke arms 620 overlapping the ends of the axle and holding the roller 612 in place. Tray member 618 includes a lower plate portion 622 having two apertures 624 extending therethrough for receipt of threaded studs 626 and 628. Stud 626 has a right-hand thread, with two spaced-apart washers 630 fixed to the stud, for example, by welding, and includes a free end at 632 and a pinion 634 at the opposite end. It should be understood that pinions 634 and 614 are profiled for meshing engagement. Stud 628 includes two washer portions 638 fixed thereto in a spaced-apart manner, in a similar way as washers 630, and has a free end portion 640 and a pinion 642 at the opposite end. Stud 620 has a left-hand thread and pinions 616 and 642 are profiled for meshing engagement.

A lower tray member 650 includes a base portion 652 and upstanding arm portions at 654 with overlapping portions 656 for overlying aperture 230 of ramp mechanism 210. Portion 652 of tray member 650 also includes threaded apertures at 660 and 662, where threaded aperture 660 is profiled for meshing engagement with the threads of stud 626, whereas the threads of aperture 662 are profiled for meshing engagement with stud 628. Thus, in a similar manner as the FIGS. 38–39 embodiment, as the slide-out room floor 40 moves from the fully extended position towards a retracted position, leading portion 68 of slide-out room floor engages roller member 612, thereby causing meshing engagement between pinion pairs 616, 634; and 616, 642. This causes studs 626, 628 to rotate in opposite directions and jack themselves up within associated threaded openings 660, 662. This lifts the entire roller assembly to lift the slide-out room to a position above the main room floor. The same holds true during the extension, whereupon the engagement of the slide-out room floor on roller 612 causes an opposite sense rotation of studs 626 and 628, thereby lowering tray member 618 relative to tray member 650, thereby lowering roller member 612.

Figure 41:
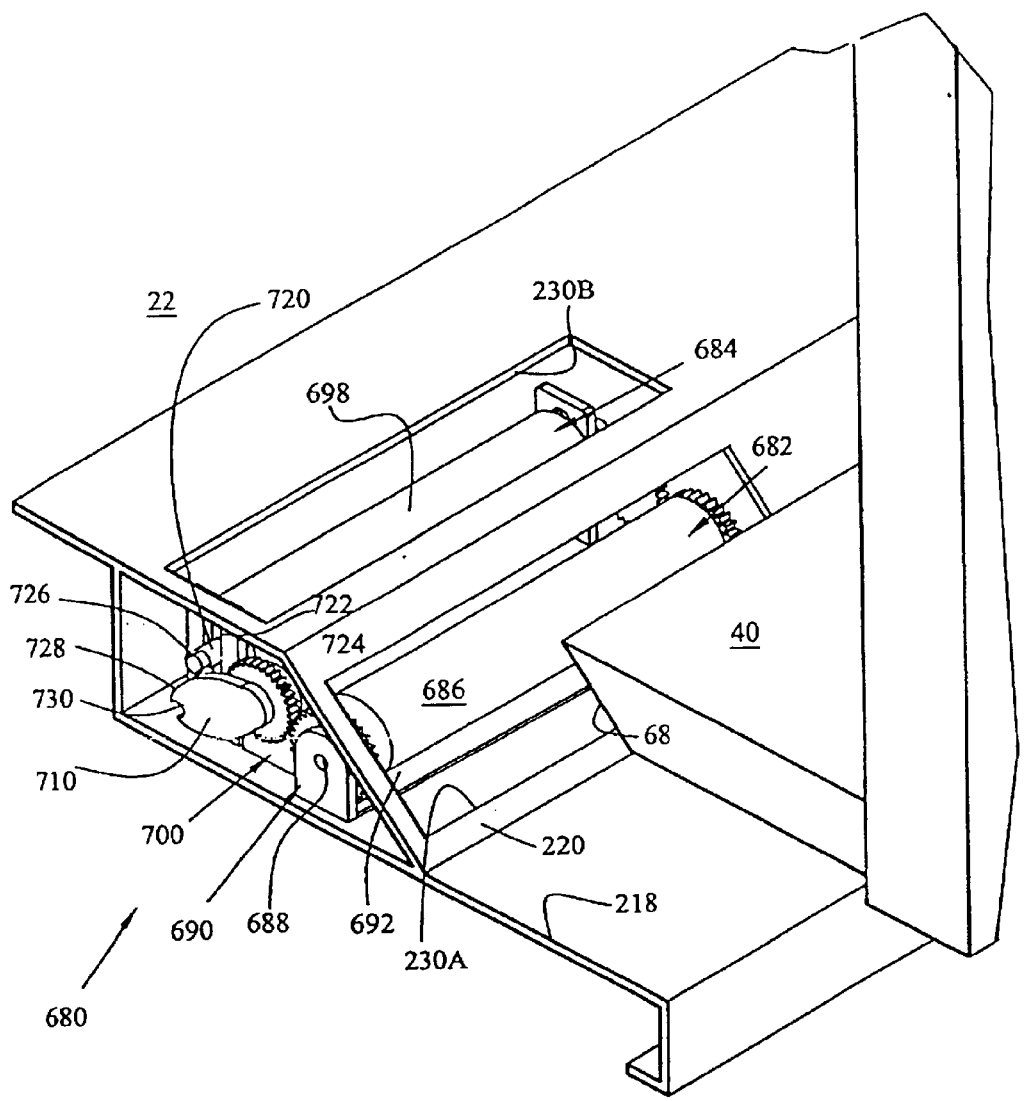
FIGS. 41 and 42 show a further embodiment showing a cam-actuated lifting mechanism.
Figure 42:
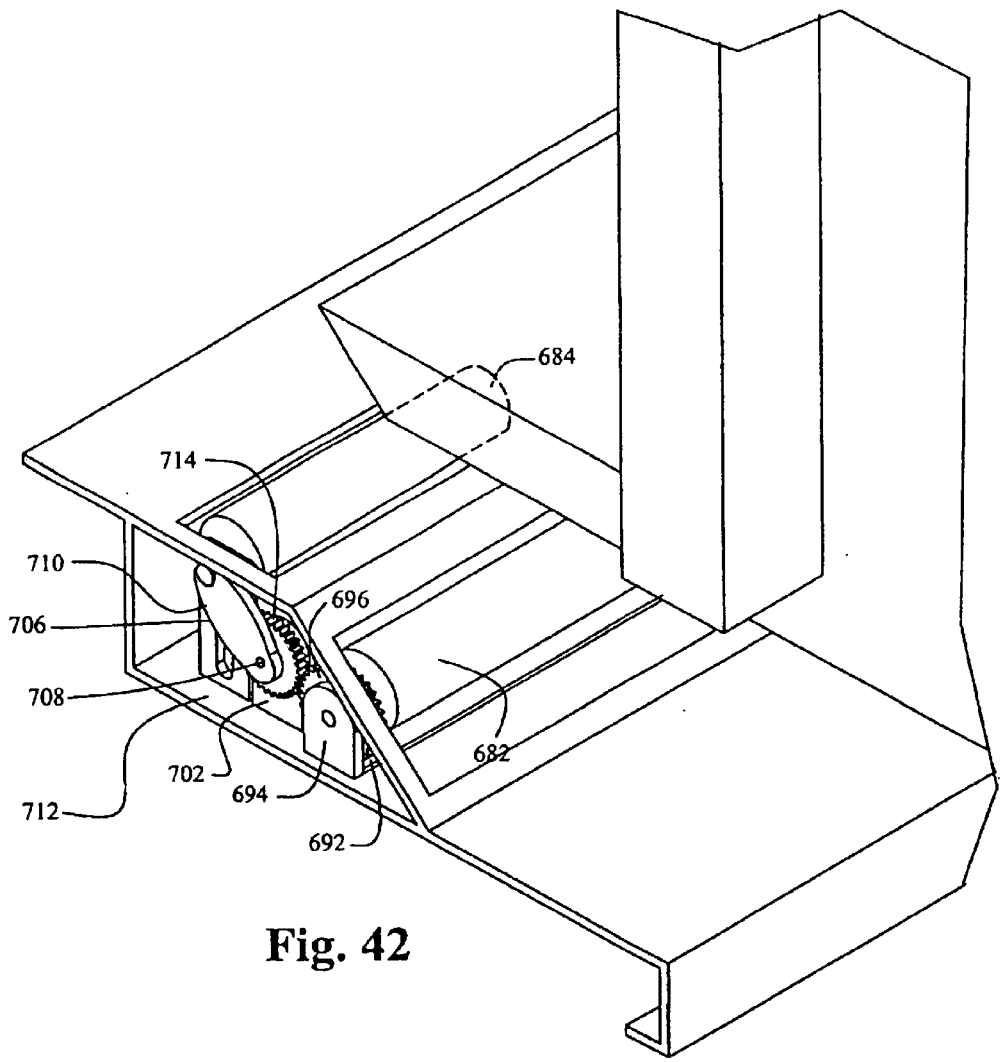

With respect now to FIGS. 41 and 42, another embodiment of lifting mechanism is shown at 680 including a first roller mechanism at 682, and a second roller mechanism at 684. Roller mechanism 682 generally comprises an outer rubber-like layer 686 having an inner core, such as a plastic or steel mechanism, having an elongate aperture therethrough (not shown) to receive an axle such as 688 therethrough. Axle 688 is held by a retainer 690 having a base portion 692 and upstanding arms 694. Roller mechanism 682 further comprises a gear member 696 fixed to the roller such that it spins with the turning of the roller.

Roller mechanism 684 is comprised of a roller 698 and a lifting mechanism shown generally at 700. Lifting mechanism 700 includes a retainer 702 similar in nature to retainer 694 and retains a rotatable cam mechanism 706, such as by pinning at 708. Cam mechanism 706 includes an elliptical cam member 710 fixed to shaft 712 and fixed to gear member 714. Roller member 698 includes a shaft member 720 extending therethrough and which is vertically movable within a slot 722 of retaining arm 724. Shaft 720 includes an enlarged end portion 726, which acts as a follower and rides upon contoured cam surface 728. Cam member 710 also includes a notched portion at 730 for receipt of shaft member 720 as described herein.

Thus, as slide-out room 40 begins its retraction from the fully extended position of FIG. 41, leading section 68 of slide-out room 40 begins to engage surface 220 of ramp member 210, whereupon roller 686 begins to spin under the influence of friction with surface 68. The spinning of roller 686 in turn causes rotation of gear 696, which has the effect of opposite rotation of gear 714. Gear 714 in turn rotates cam member 710 from the position shown in FIG. 41 to the position shown in FIG. 42 until the follower member 726 is positioned within the corresponding notch 730. The slide-out room 40 continues into the fully retracted stage under the guidance of roller 684 only, which is raised from the main room floor.

It should be appreciated in this design that two roller assemblies are involved, and that, advantageously, roller 682 rolls only during the initial stage, to rotate roller 684 into position. Continued movement of the slide-out room 40 against roller 684 does not change the height of lifting of roller 684, but rather, is maintained at this level. It should be understood that during the extension sequence, the opposite occurs, that is, the slide-out room moves to the position of FIG. 42 but in the retracted state, whereupon slide-out floor room 40 will begin to engage onto surface 220 and again engage roller 620 and rotate roller 682 in the opposite sense, that is, clockwise as viewed in FIG. 42. The clockwise rotation of roller 682 causes the counter-clockwise rotation of gear 714, and therefore the disengagement of follower member 726 with its associated notch 730 and the resultant lowering of roller member 684, and back into its associated recess 230B.

Figure 43:
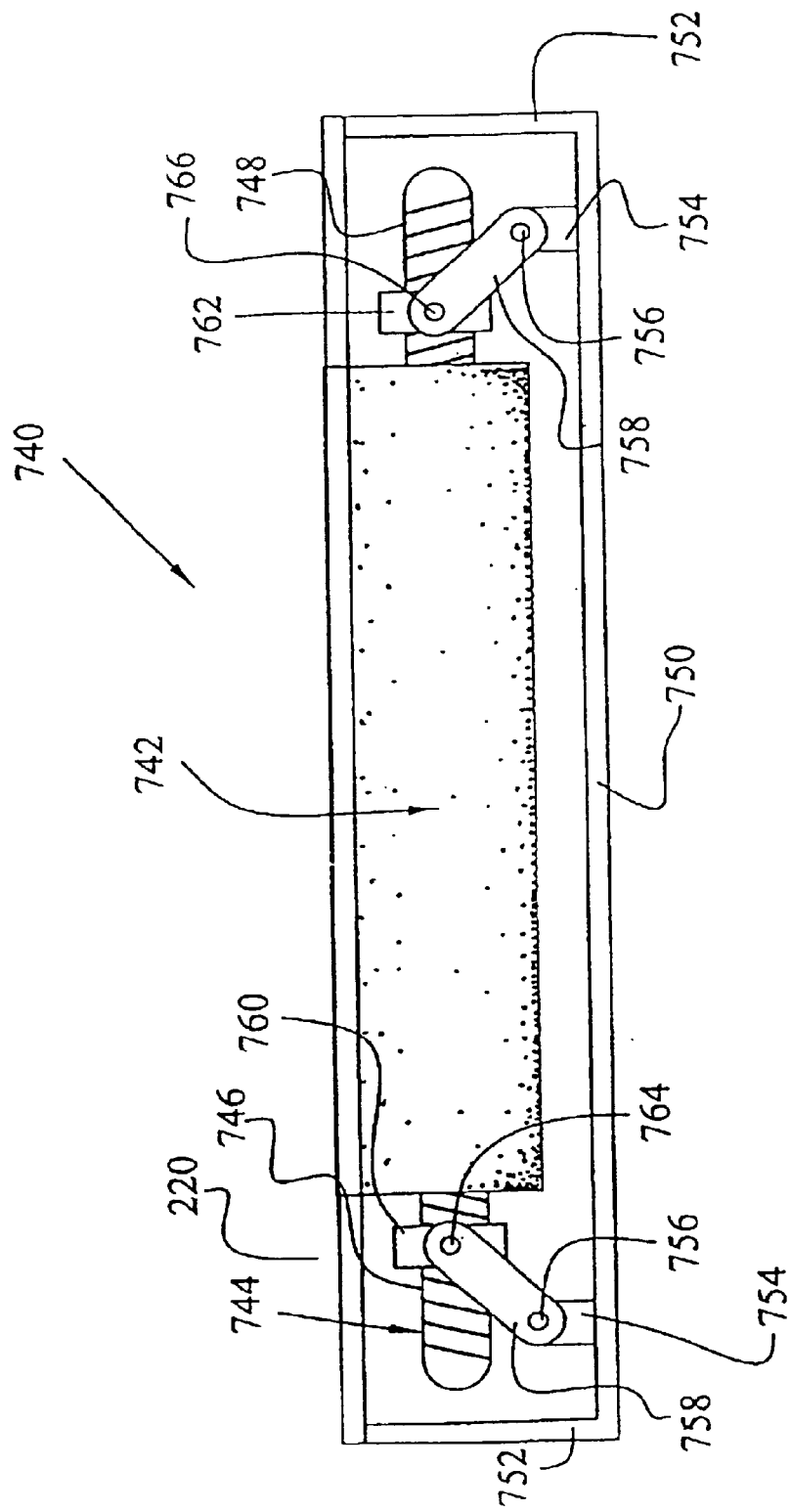
FIGS. 43 and 44 show an embodiment of the invention, where the roller can jack itself to a position to raise the floor.
Figure 44:
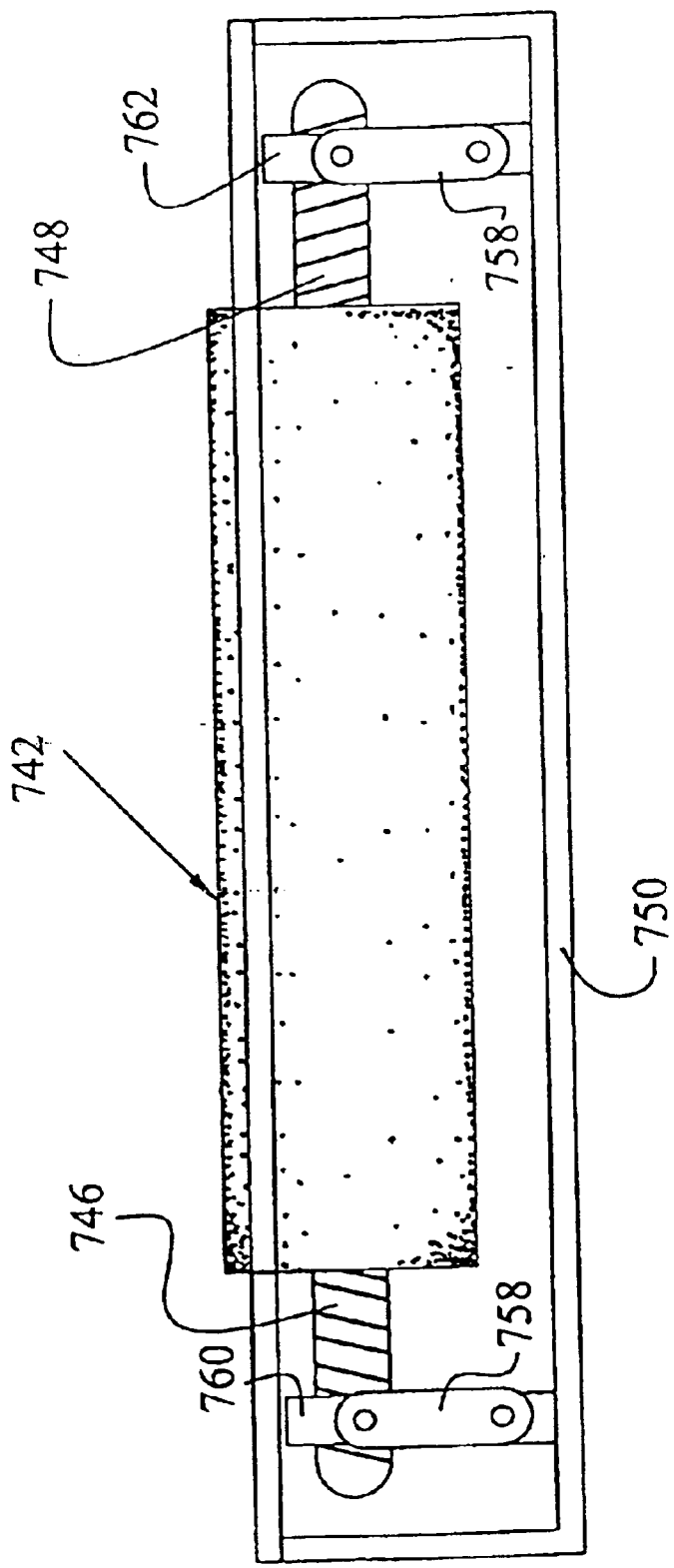

Another embodiment of lifting mechanism is shown in FIGS. 43 and 44 as 740, positionable within the opening 230 of ramp member 210 and is comprised of a roller mechanism 742 having a stud member 744 fixedly attached thereto having threaded sections 746 and 748 of opposite thread directions. The assembly 740 further includes a base plate portion 750 with upstanding arms 752 which can be fixed to ramp portion 220 or to opening 230. Base plate portion 750 includes linkage members 754 having pins at 756 rotatably connecting link members 758 thereto. Threaded nuts 760 and 762 are provided and threadably received on associated threaded portions 746 and 748, with associated thread sections, and include pin sections 764, 766 linked to associated apertures through link members 758.

It should be appreciated then that, as slide-out room floor transgresses ramp portion 218, leading edge 68 of slide-out room 40 begins to engage roller mechanism 742 which begins to rotate in the direction of movement of the slide-out room. It should also be appreciated that due to the pins 764 and 766, nuts 760 and 762 remain fixed in a rotational sense, and therefore move from the position shown in FIG. 43 outwardly to the position shown in FIG. 44. Naturally, when in the position of FIG. 44, roller mechanism 742 raises slide-out room floor 40 above the level of main room floor 22 and maintains it in that position throughout its travel.

Figure 45:
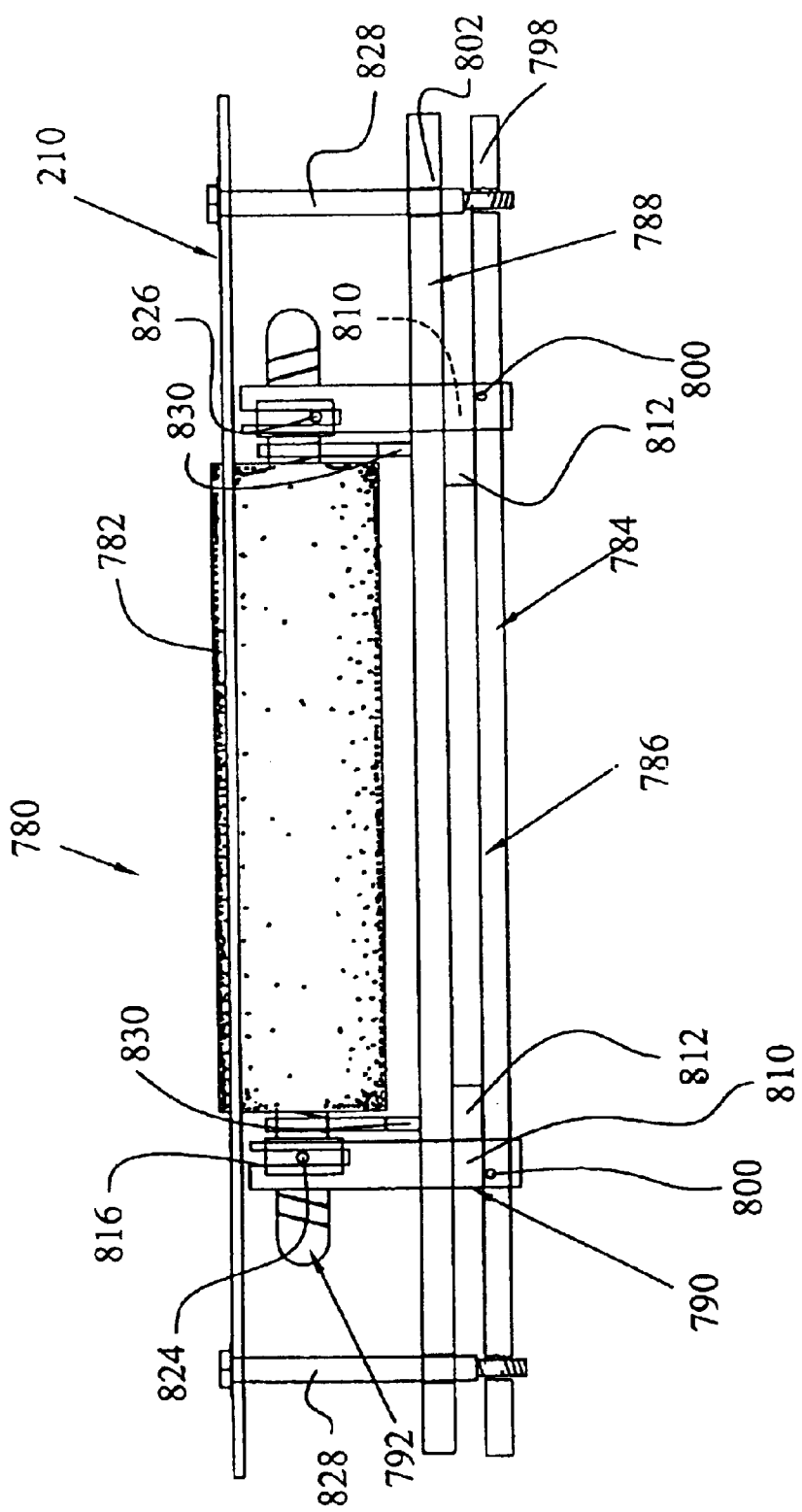
FIGS. 45 and 46 show an alternate embodiment of the invention shown in FIGS. 43 and 44.
Figure 46:
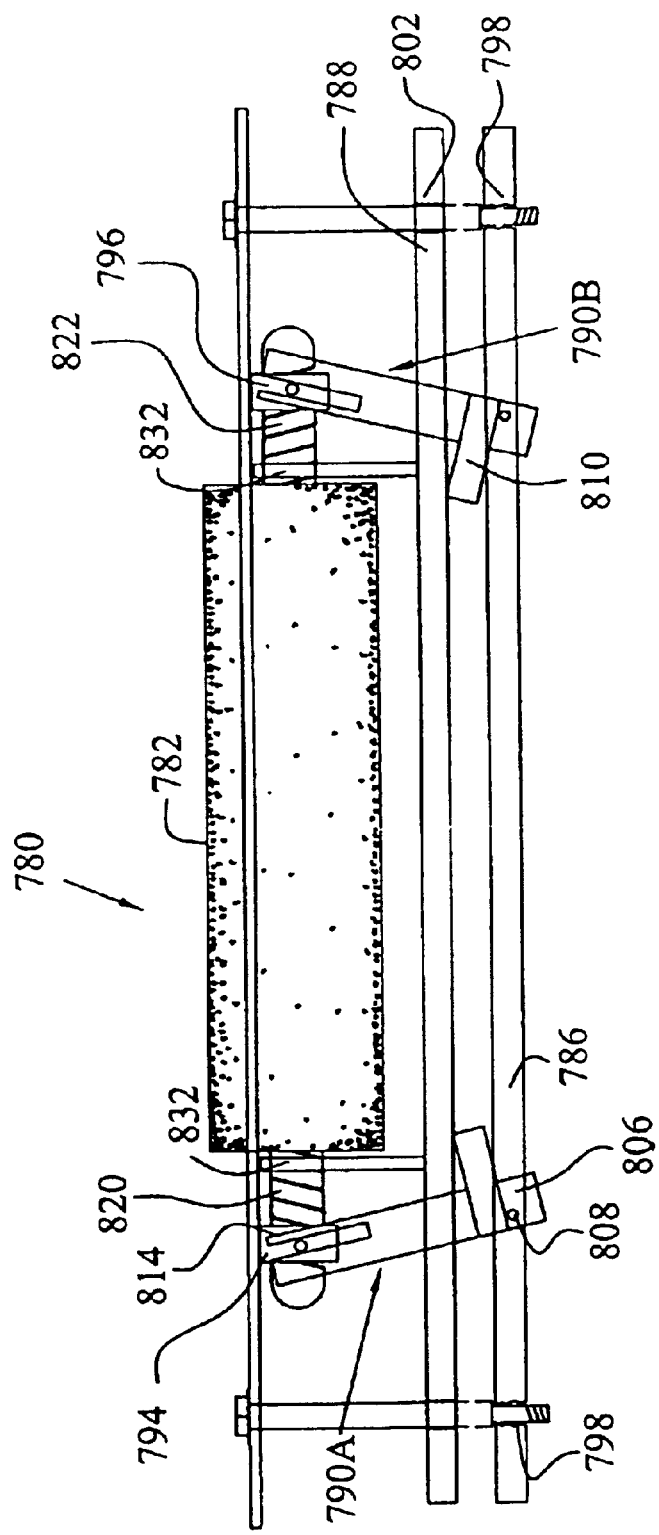

With respect now to FIGS. 45 and 46, another embodiment of lifting mechanism is shown at 780, which is similar to the device shown in FIGS. 43 and 44, having an improved mechanical advantage design. Lifting mechanism 780 includes a roller mechanism 782 attached to a frame 784. Frame 784 includes a lower plate portion 786, and an intermediate plate at 788. Lifting mechanism 780 further includes rotatable link arms 790A, 790B, a threaded axle 792, and follower nuts 794, 796.

Lower plate 786 includes threaded apertures at 798 and apertures at 800. Plates 788 include clearance holes at 802, where apertures 802 are aligned with threaded aperture 798. Link arms 790A, 790B are somewhat H-shaped and include lower ends 806, which are profiled to flank lower plate 786 and are pinned at 808, through aperture 800 through plate 786, and an aperture provided through lower end 806. Link arms 790A, 790B further include lever arms 810 including cantilevered sections 812, see FIG. 45. Lever arms 810 extend between the plates 786, 788. Upper end 814 of link arms 790A, 790B are slotted at 816 as further described herein.

Roller 782 is similar to previous rollers including an outer engaging surface, such as a rubbery gripping surface, surrounding an internal core and then fixed to its axle 792. As in previous embodiments, axle 792 includes opposite thread sections 820, 822, while nuts 794, 796 are similarly threaded as their associated threaded shaft portion 820, 822, respectively, and include pin portions 824, 826 for receipt within slots 816. Finally, roller mechanism 780 includes trunions 830 attached to plate 788, which are fixed to bearing portions 832 over the roller to allow free spinning of roller 782.

As described above, the assembly and application of lifting mechanism 780 is described as follows. Lower plate 786 can be assembled together with the link arms 790A, 790B by positioning lower portions 806 over lower plate 786. The link arms 790A, 790B are then pinned to lower plate 786, such that the lever arms 812 face inwardly and towards each other as shown best in FIG. 45. Plate 788 is now placed between the upper ends 814 of each link 790A, 790B, again to approximately the position shown in FIG. 45. The roller assembly is completed by threading nuts 794, 796 onto the associated threaded shaft portions 820, 822, such that the pins are in lateral alignment with their associated slots 816. This assembly may now be placed beneath ramp mechanism 210, such that roller 782 is aligned with aperture 230, and bolts 828 are positioned through clearance holes 802 and threaded into threaded apertures 798. It should be appreciated that the free-standing position of the roller mechanism is shown in FIG. 45, and bolts 828 define jack bolts for raising and/or lowering roller 782 with respect to the ramp. It should also be appreciated that instead of placing the assembly directly through the ramp, another plate could alternatively be used in place of the ramp such that the entire assembly could be preassembled, whereupon the entire upper plate defines a flange for positioning over opening 230 in ramp mechanism 210.

FIG. 45 shows the position of the roller mechanism 780 when the slide-out room is in the fully retracted position, and as in previous embodiments, as the slide-out room floor 40 transgresses ramp floor 218, leading edge 68 of floor 40 begins to engage roller 782, whereupon roller 782 rotates and threads associated nuts 794, 796 outwardly as shown in FIG. 46, whereupon link arms 790A, 790B rotate outwardly. The rotation of link arms 790A, 790B causes lever portions 812 of link arms 790A, 790B to pivot upwardly, lifting plate 788 together with roller 782. As in previous embodiments, the opposite movement of the slide-out room, that is, when the slide-out room 30 is moving from a fully retracted position to a fully extended position, the mechanism 780 begins in the position shown in FIG. 46, and as the slide-out room is retracted, nuts 794, 796 are driven inwardly, thereby lowering plate 788 together with roller member 782.

With respect now to FIGS. 47 and 48, lifting mechanism 840 is shown as generally comprising roller 842, lower plate 844, upper plate 846, a linkage mechanism shown generally at 848, and a roller support mechanism 850. Lower plate 844 is defined as an elongated plate having threaded apertures at 852 and openings 854A, 854B, and 854C, which extend between side edges 856 of plate member 844. Plate 846 is substantially the same width as plate 844 and includes clearance openings at 858 and openings at 860, which extends through the plate between side edges 862 thereof.

Linkage mechanism 848 includes two rotatable link mechanisms 866, which includes an opening 868 about which link 866 may rotate, and opening 870, and a slotted opening at 872, see FIG. 47A. Linkage mechanism 848 is further comprised of a toggle mechanism shown generally at 876 comprised of links 878 (FIG. 47C) and toggle links 880 (FIG. 47B). Link 878 includes openings at opposite ends of the linkage at 882, 884, whereas toggle link 880 includes openings 886, 888.

Roller 842 is substantially identical to that described with respect to FIG. 45, with the exception that roller 842 includes a threaded shaft 890 having threaded portions 892, 894 having threads in opposite direction to that described with reference to FIG. 45. It should be understood then that the nuts 896 and 898 are appropriately threaded to accept threaded sections 892, 894, respectively. Nuts 896 and 898 also include pin portions 900 for receipt within slots 872. Finally, support mechanism 850 includes an angle bracket member having a portion 850A for attachment to plate 846 and an upright portion 850B for supporting bearings 904 on roller 842.

The assembly of the device 840 is also substantially similar to that described with respect to FIGS. 45 and 46, and includes pinning link members 866 to opposite side edges 856 of plate portion 844. Links 878 are also fixed to openings 870 of link 866 and then connecting toggle links 880 to appropriate ends of links 878 and also to plates 844, 846 as shown in FIG. 48. Roller mechanism is positioned on support member 840 with pin portions 900 suitably positioned to be accepted within associated slots 872. The entire assembly may now be installed by placing roller 842 through opening 230 of ramp mechanism 210 and positioning fasteners 906 through ramp mechanism 210 through clearance holes 858 and into threaded engagement of threaded apertures 852. Once again, it should be appreciated that fasteners 906 act as jack bolts to raise and lower the entire assembly of the resting position shown in FIG. 47.

It should also be appreciated that the roller mechanism works in somewhat the opposite sense as that shown in FIGS. 45 and 46 in that, as the slide-out room moves from the fully extended position to the fully retracted position, engagement of the slide-out room with roller 842 causes the nuts 896, 898 to move from their outward position shown in FIG. 47 inward to the position shown in FIG. 48. This causes rotation of link members 866 inward causing actuation of toggle links 880 and raising of plate 846 from the position shown in FIG. 47 to the position shown in FIG. 48 and thereby raising roller 842. It should be understood that extension of the slide-out room 30 from the fully retracted position to the fully extended position causes the opposite reaction, that is, movement of the roller mechanism from the FIG. 48 position to the FIG. 47 position.

Figure 49:
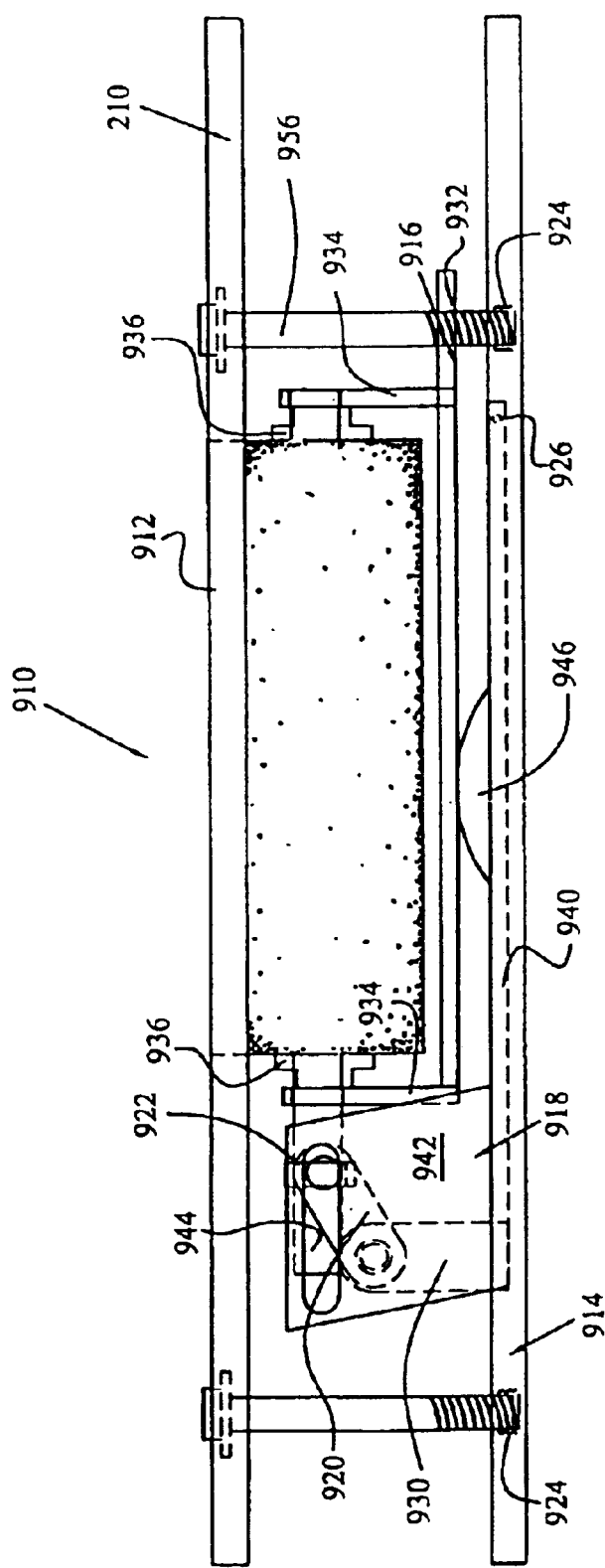
FIGS. 49 and 50 show a mechanism similar to that of FIGS. 43 through 48, where the roller is self-lifting on one side only of the roller.
Figure 50:
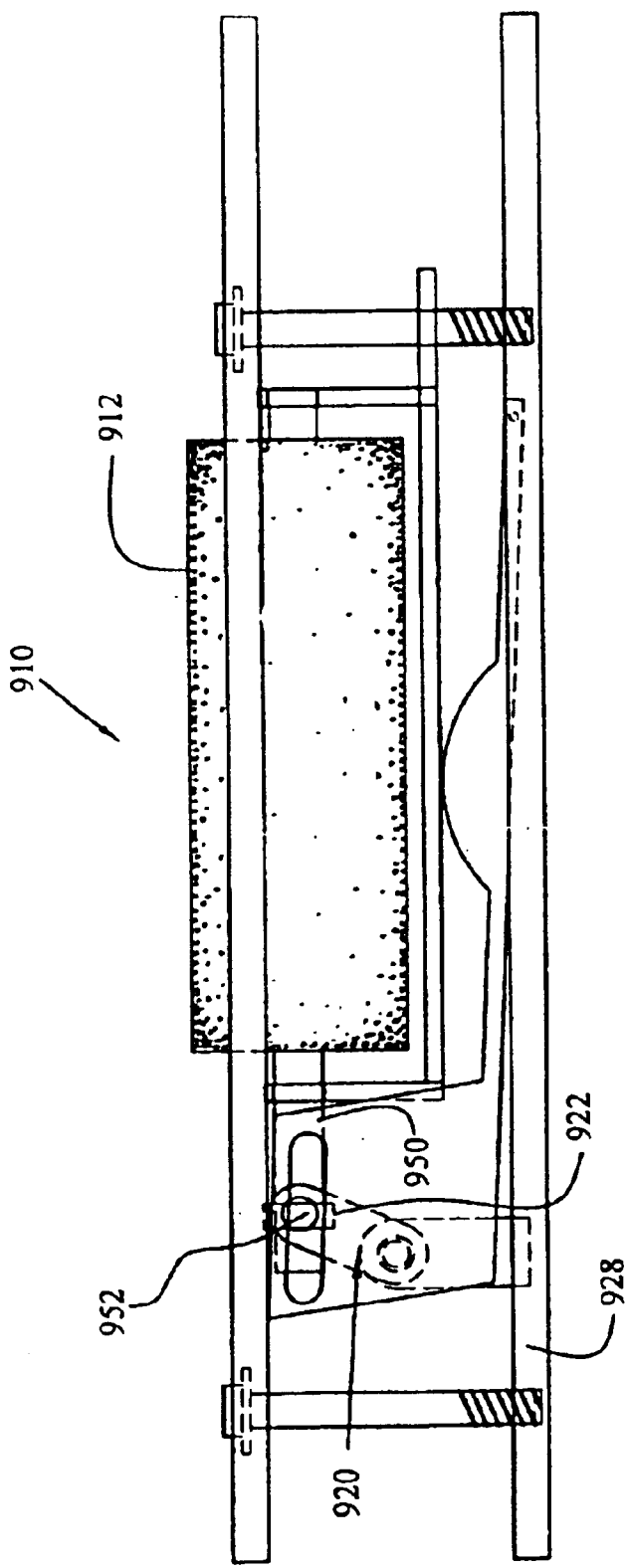

With respect now to FIGS. 49 and 50, a further lifting mechanism is shown at 910 generally comprised of a roller mechanism 912, a lower plate 914, an upper plate 916, a lever arm 918, a link arm 920, and a single driving nut 922. As shown in FIG. 49, plate 914 includes threaded apertures 924 at both ends and includes an aperture 926 extending through side edges 928 of plate member 914. Plate 914 further includes a fixed link 930 having an aperture for linkage with link 920. Upper plate 916 includes a clearance hole at 932 and further includes upstanding arms 934 for supporting bearings 936 of roller 912.

Lever member 918 generally includes an elongate link arm 940 having an upstanding portion at 942 including a slot 944. It should be appreciated that two such linkages are provided, one on either side of plate 914. Lever mechanism 918 could also be a channel section defined by an inverted U-shape such that elongate arms 940 are the leg portions of the U and extend downwardly. In either event, a cam lobe or half round 946 is provided and attached to arms 940 for movement therewith. Finally roller mechanism 912 further includes a threaded shaft portion 950 on only one end thereof, which receives threaded nut 922. Nut 922 includes pin 952 as described herein.

The lever mechanism 918 is positioned over plate member 914 and pinning the aperture 926 as shown in FIG. 49. This allows pivotal movement of the lever mechanism relative to plate 914 about pinned section 926. Link members 920 are also linked to link arms 930 such that pins 952 on drive nut 922 extends through both the pinned opening of link 920 as well as extends through slot 944. It should be appreciated that link arms 920 provide a lateral stability for elongate lever member 918. The mechanism 910 is installable to ramp member 210 in a manner similar to that described above, where the assembled unit is positioned with roller 912 extending through opening 230 of ramp member, and fasteners 956 are threaded through threaded openings 924 of plate 914.

It should be appreciated that the FIG. 49 position is when the slide-out room 30 is in the fully extended position, and that during retraction, the leading edge 68 of slide-out room floor 40 engages roller 912 causing rotation thereof, and the lateral outward movement of threaded drive nut 922 from the position shown in FIG. 49 to the position shown in FIG. 50. The outward movement of drive nut 922 causes pin 952 to rotate link 920 in the clockwise direction, thereby raising link member 918 which in turn causes cam member 956 to thrust plate 916 upwardly to the position shown in FIG. 50. It should also be appreciated that the movement from the fully retracted position to the fully extended position corresponds to movement between the position shown in FIG. 50 to the position shown in FIG. 49.

With reference to FIGS. 51–66, yet another embodiment of the invention will be described in greater detail. It should be appreciated that the embodiment depicted in FIGS. 51 through 66 shows a roller/lifter assembly mechanism which can either be independently sold, or can be sold in combination with a modified ramp assembly for application to the main room of a recreational vehicle. For this purpose, the ramp as described relative to FIGS. 23 and 24 is still applicable.

Figure 51:
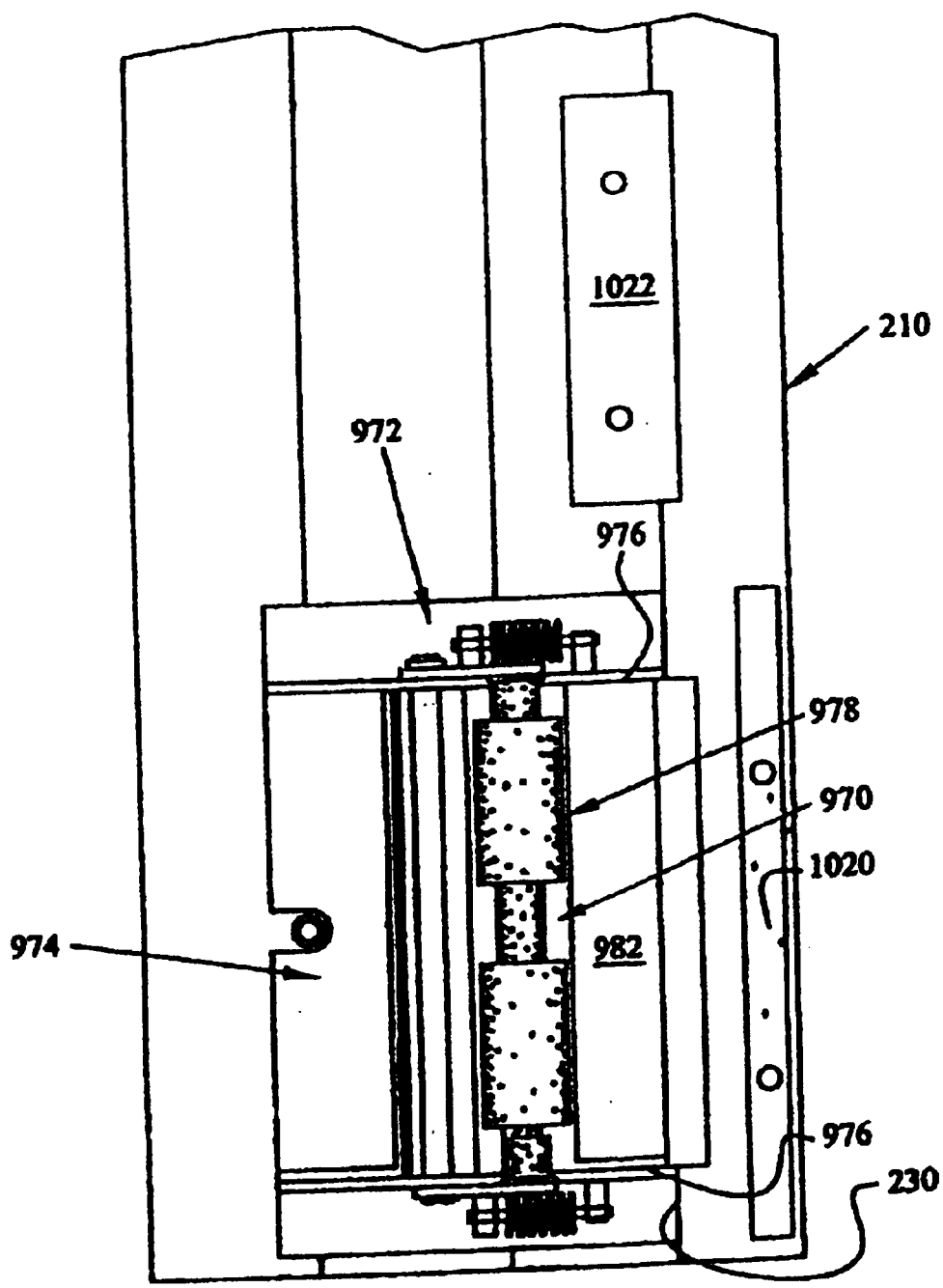
FIG. 51 is a top plan view of another embodiment of the roller lifter mechanism of the present invention.
Figure 52:
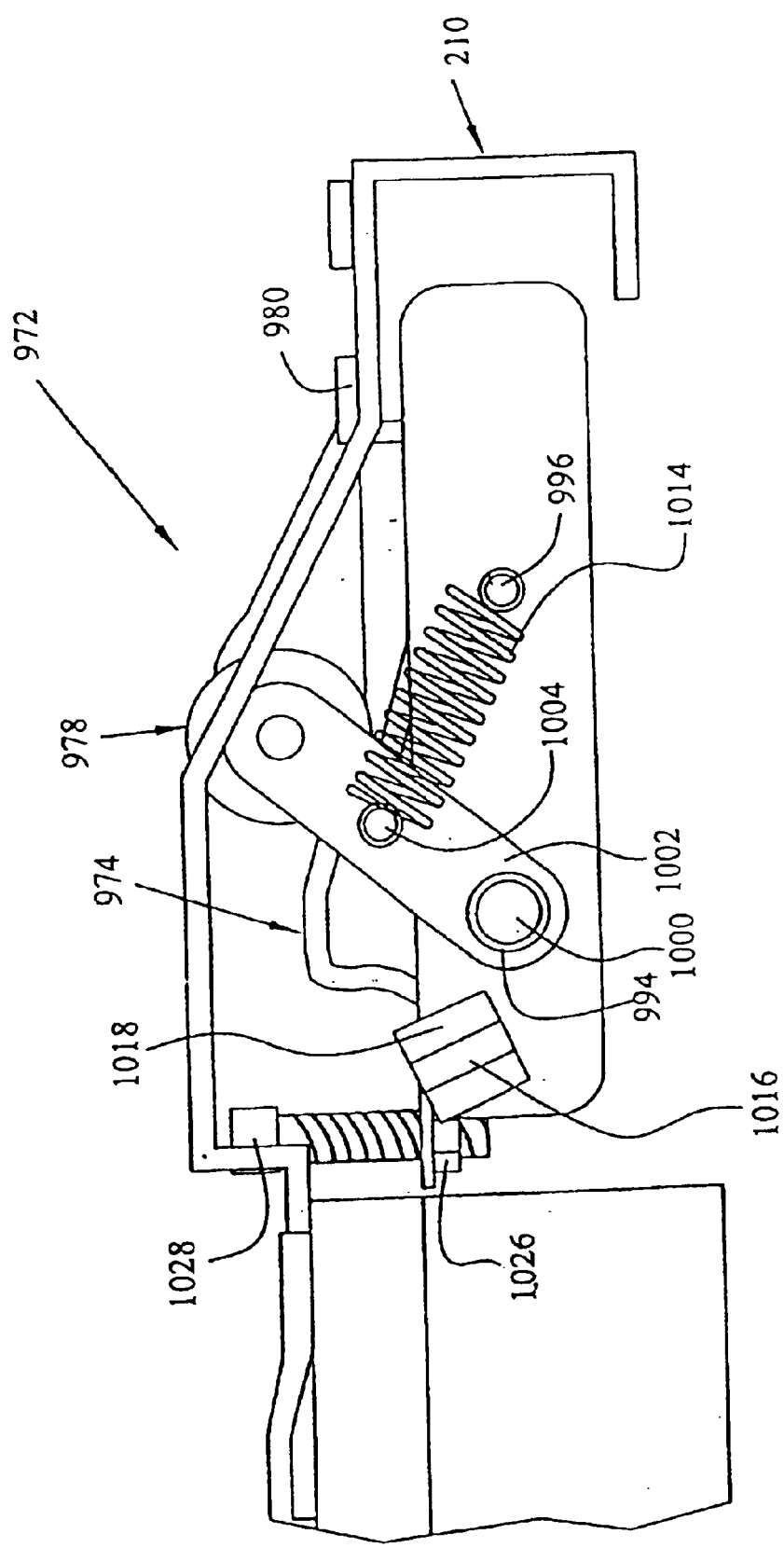
FIG. 52 is an end view of the embodiment of FIG. 51.

With reference first to FIGS. 51 and 52, another embodiment of lifter assembly is shown at 972, generally comprising a contoured ramp mechanism 974 including end plates 976 and a roller assembly 978 which also rotates to a lifting position as will be described herein.

As shown in FIGS. 53 and 54, ramp mechanism 974 includes a lip 980, which transitions into a support surface 982 which then leads into the ramp curved surface 984. At the end of the ramped surface 984, is a vertical wall 986, thereby forming an apex point at 988. The vertical wall 986 then transitions into horizontal surface 990. With reference now to FIGS. 55 and 56, the end plates 976 include a plate section at 992 having an aperture at 994 and an extension pin at 996.

With reference now to FIGS. 57 and 58, the roller assembly 978 will be described in greater detail. This assembly generally comprises a rod 1000 having pivot arms 1002 attached at opposite ends of the rod 1000. The pivot arms 1002 include pins 1004 attached approximately midway of their length and include a further rod 1006, which generally retain rollers 1008 thereto. The rod 1006 is held to the pivot arms 1002 by way of brass bushings 1010, while a spacer 1012 retains the rollers 1008 in proper position.

With reference again to FIGS. 51 and 52, the assembly of the roller lifter assembly 972 will be described. The end plates 976 are positioned adjacent to the ramp mechanism 974 and are held in place, for example, by welding them together in the position shown in FIG. 52. Rod 1000 is then positioned between apertures 994 and the end plates 976, whereupon the lever arms 1002 can be placed over the rod 1000 and again held in place by, for example, welding. The assembly of the rod 1006, bushings 1010, rollers 1008, and spacer 1012 are also positioned in place within apertures of the pivot arms 1002 and can be held in place, for example, by spring clips at the rod ends. Finally, a tension spring 1014 is positioned with a first end encircling pin 996 and a second end encircling pin 1004. As should be appreciated, this spring loads pivot arm 1002, clockwise, such that roller 1008 is positioned against the support surface 982. Finally, a stop mechanism is included, such as an angle bracket shown at 1016 having a stop member 1018 included, whereby member 1018 has some shock absorption properties. As shown in FIG. 51, support bar 1020 and incline member 1022 are also optionally included as will be described in further detail herein.

With respect now to FIGS. 51 and 52, the assembly of the roller/lifter assembly mechanism 972 to the ramp 210 will be described. As shown in FIG. 52, a nut 1026 is welded to the bottom of ramp mechanism 974 and a jack bolt 1028 extends through the ramp 210 and extends downwardly to be threadably engaged with nut 1026. Meanwhile, lip 980 overlies aperture 970 so that the entire assembly 972 can pivot about rod 1000 upwardly or downwardly depending on the location of the jack bolt 1028.

Figure 59:
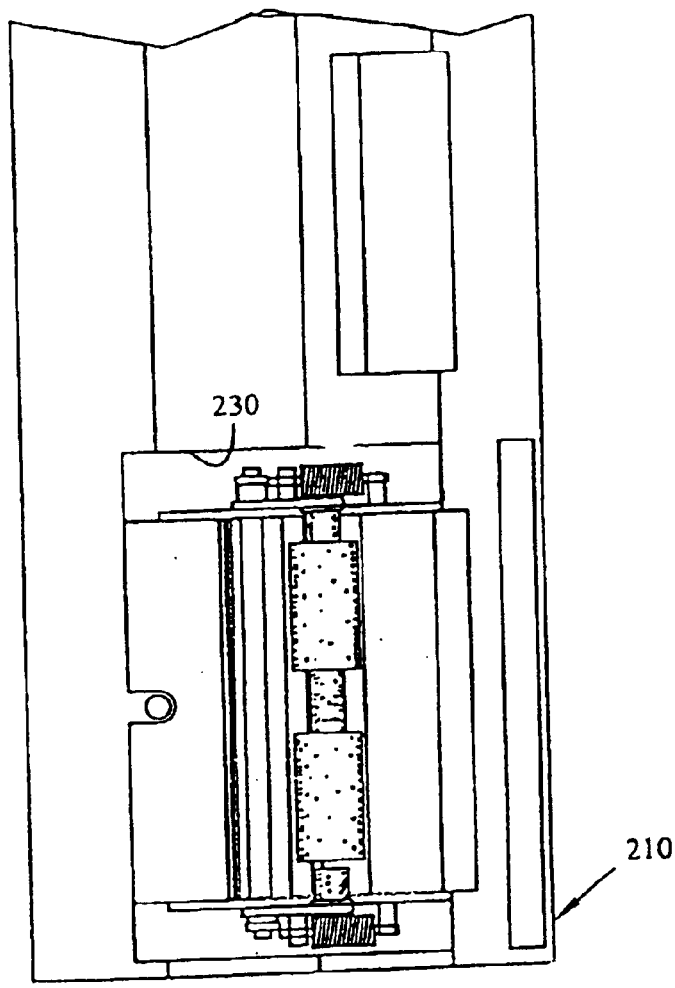
FIGS. 59 and 60 are diagrammatical views showing the roller/lifter assembly mechanism when the slide-out room floor (FIG. 60 only) is in the fully extended position.
Figure 60:
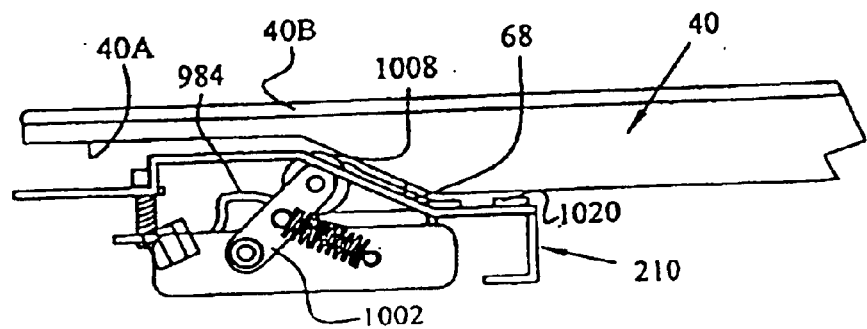

With reference now to FIGS. 59–66, the operation of the roller/lifter assembly mechanism will now be described. With reference first to FIGS. 59 and 60, the unit is shown, where the slide-out room floor 40 is positioned in the fully extended position. It is anticipated that slide-out room floor 40 will include a plastic support member at 40A, which resiliently supports the overhanging carpet portion at 40B.

In this position, pivot arm 1002 is fully sprung to the right-hand side or the full clockwise position, and a portion of the weight of the slide-out room is being borne by ramp mechanism 210 through support bar 1020. It should be appreciated then that as the slide-out room begins its retraction, that is, that as the slide-out room floor 40 begins to move to the left as viewed in FIG. 60, that slide-out room incline surface 68 will begin to ride up the ramp provided by incline member 1022.

Figure 61:
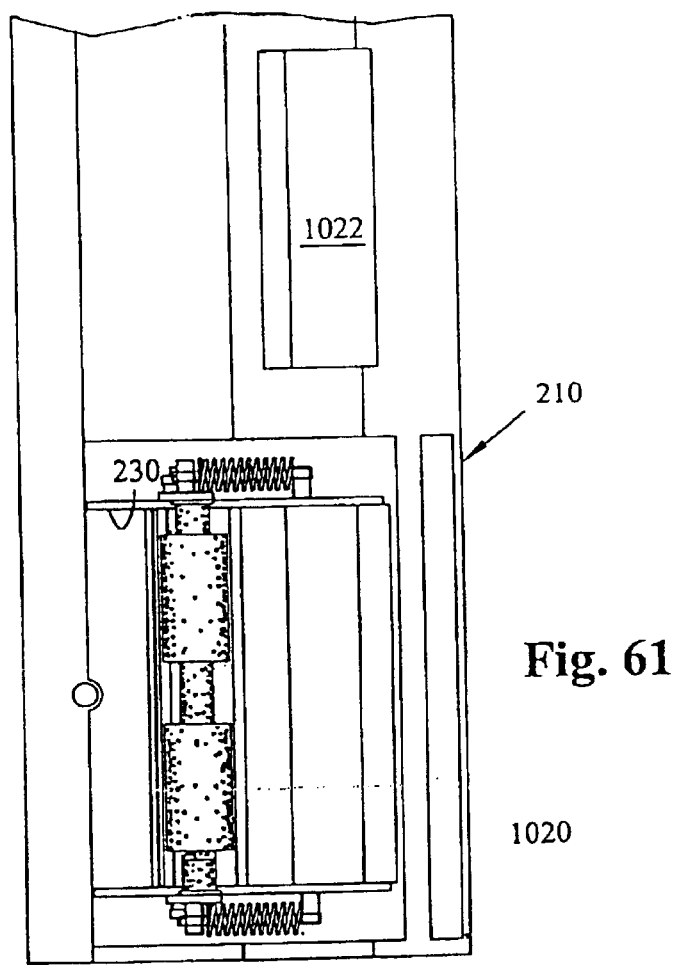
FIGS. 61 and 62 show the slide-out room floor beginning to retract.
Figure 62:
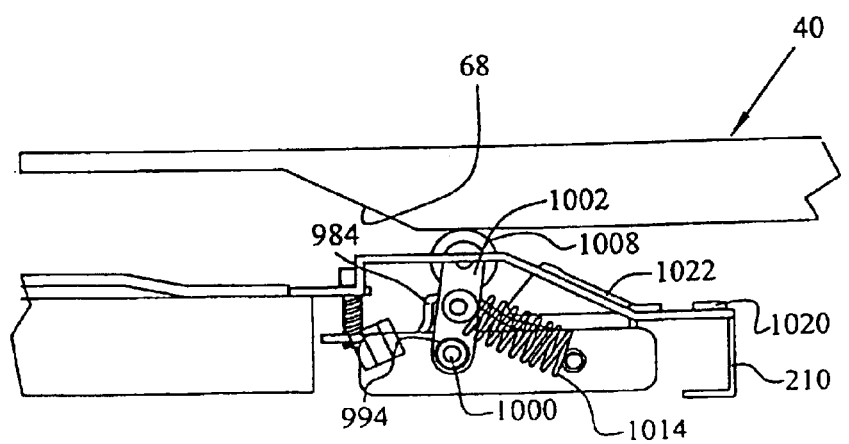

With respect now to FIGS. 61 and 62, the slide-out room has retracted partially and as the slide-out room floor 40 moves towards the left, surface 68 of the slide-out room begins to roll on roller 1008. As shown in FIG. 62, aperture 994 in end plate 976 is larger than rod 1000. This allows for pivotal movement of pivot arm 1002, but it allows the movement of the pivot arm such that contact is always maintained between ramp surface 984 and the roller. As the slide-out room floor 40 is moved to the left, the contact between the slide-out room floor and the roller 1008 causes the roller to "walk up" the ramp surface 984 and begins to tension spring 1014.

Figure 63:
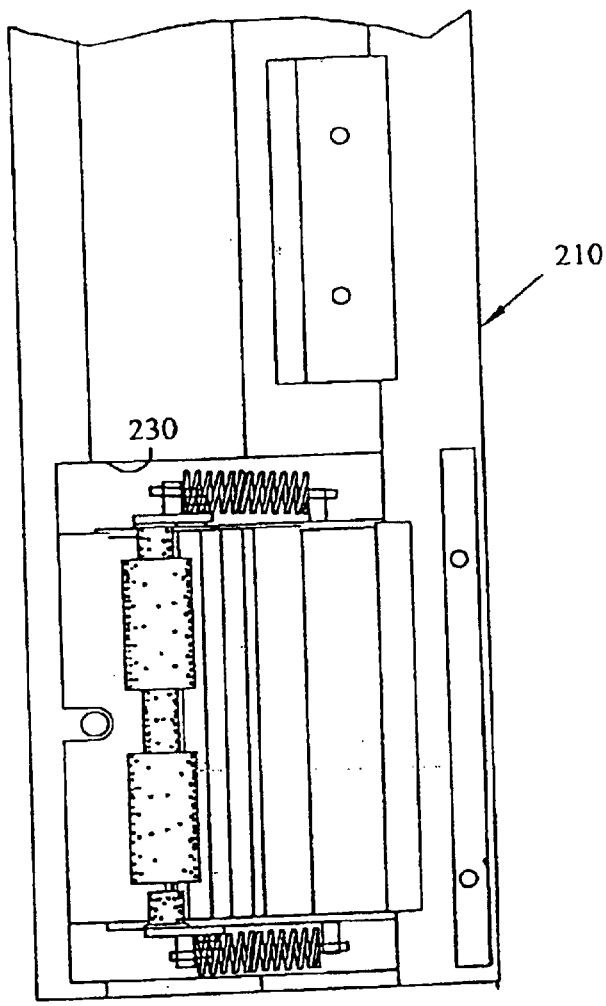
FIGS. 63 and 64 show further retraction of the slide-out room.
Figure 64:
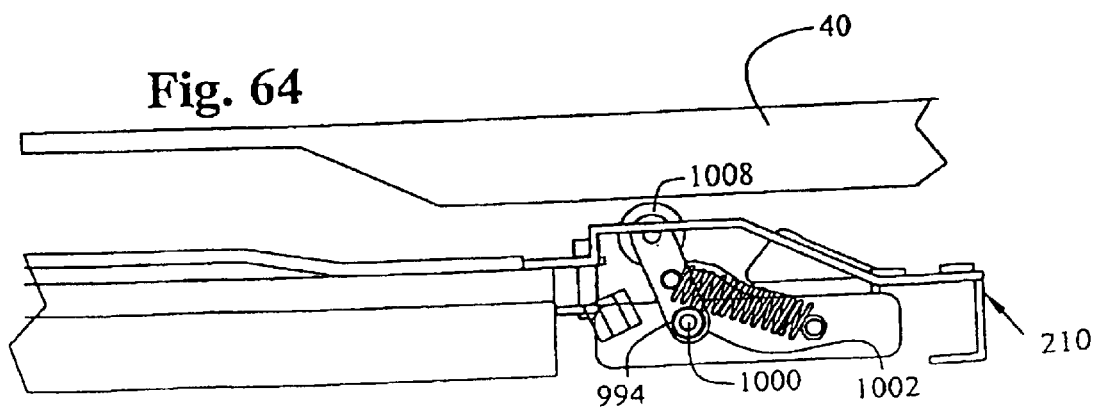
Figure 65:
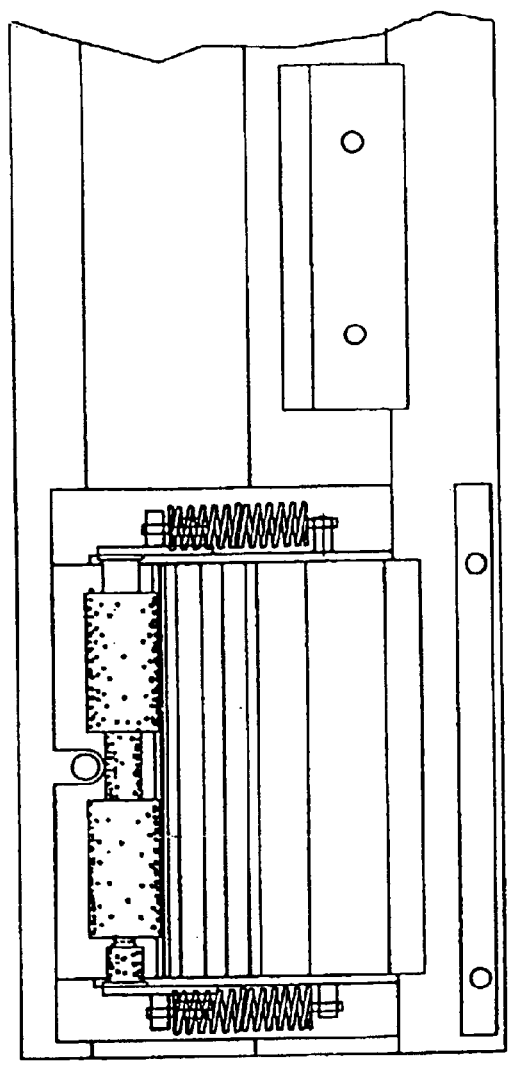
FIGS. 65 and 66 show the slide-out room in its fully elevated position above the main room floor.

As shown in FIGS. 63 and 64, continued movement of slide-out room 30 causes continued movement of the pivot arm 1002 to the position, where the roller 1008 is no longer in contact with ramp surface 984 as it has cleared the apex portion 988 (FIG. 54). However, as viewed in FIG. 64, pivot arm 1002 is now in an over-center position as it relates to its pivot access of aperture 994 and rod 1000 and continued movement to the position shown in FIGS. 65 and 66 causes the pivot arm 1002 to pivot to its full counter-clockwise position where it abuts stop member 1018, wherein the slide-out room 30 can continue its movement to the fully retracted position. As the weight of the slide-out room retains the pivot arm 1002 in the position shown in FIG. 66, the slide-out room floor 40 rolls on roller 1008 to its fully retracted position, and is raised from the carpeting 22C to prevent damage thereof.

Figure 66:
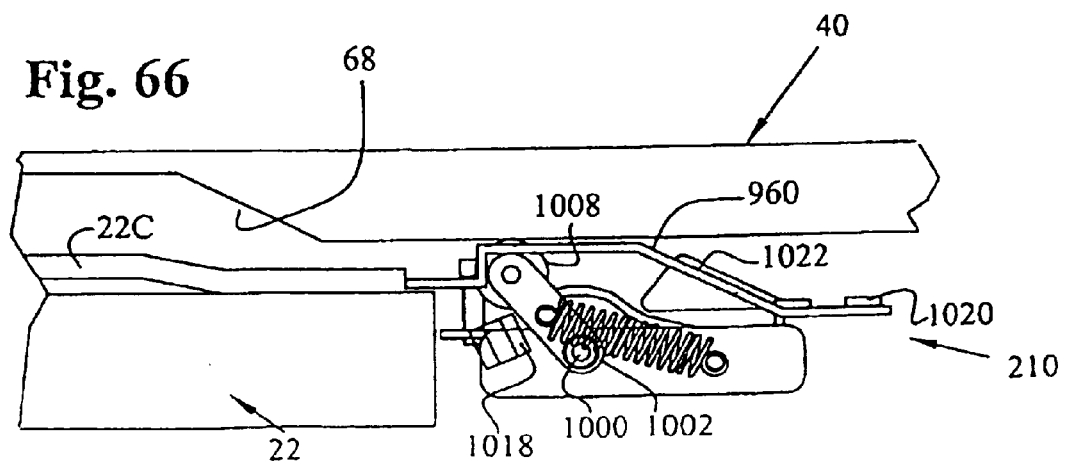

It should be appreciated then that the slide-out room 30 retracts to its fully retracted position with the pivot arm 1002 in the position shown in FIG. 66. When it is desirable to extend the slide-out room 30, the slide-out room is moved to the right as viewed in FIG. 66 to the position, where incline surface 68 begins to clear roller member 1008. At this point, the bottom of slide-out room floor 40 drops down to abut top surface 960 of ramp mechanism 210, whereupon pivot arm 1002 begins to rotate in the clockwise position with roller 1008 following in the area proximate to surface 68 of slide-out room floor 40. Slide-out room 30 continues its movement to the extended position, and again slides relative to incline member 1022 to its fully resting position against support bar 1020 that is, back to the position of FIG. 60.

With reference now to FIGS. 67–75, an alternate embodiment of that shown in FIGS. 51–66 will be described and referred to as lifting assembly 972'. With reference first to FIG. 69, an alternate end plate 976' is shown which includes a similar plate portion 992' having an aperture 994' and pin 996'. However, end plate 976' includes a nest portion shown at 995 as will be described in detail. The remainder of the lifting mechanism 972' is identical to that previously described with respect to FIGS. 51–66.

Figure 70:
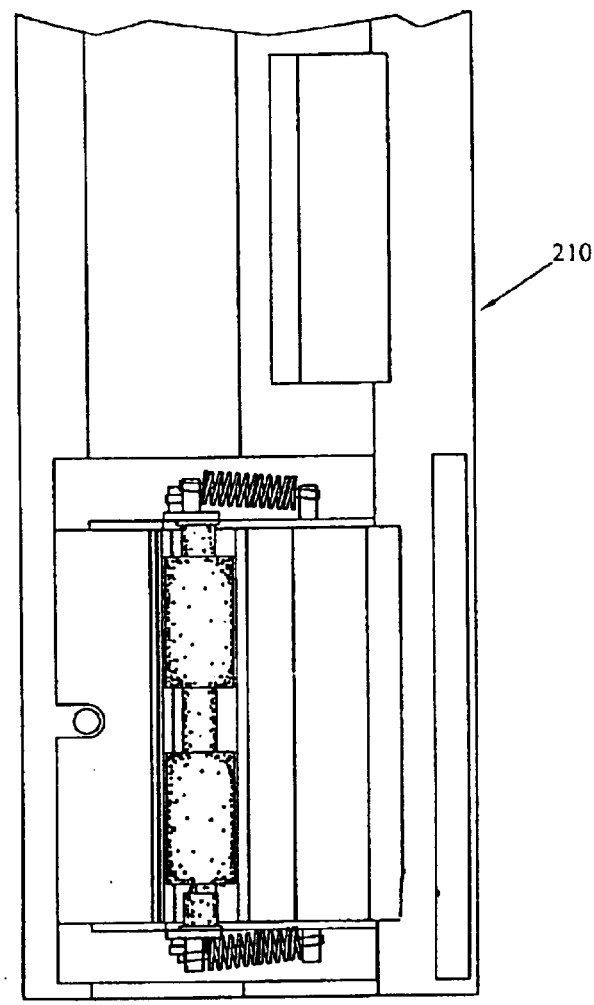
FIGS. 70 and 71 show the slide-out room beginning its retraction function.
Figure 71:
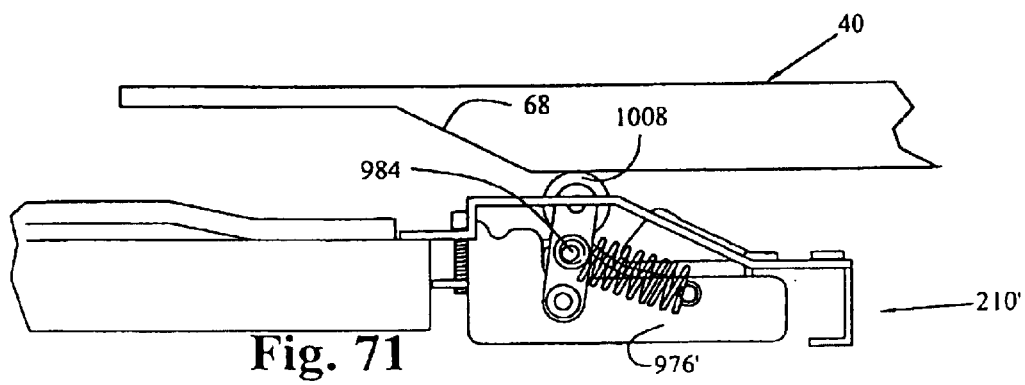
Figure 72:
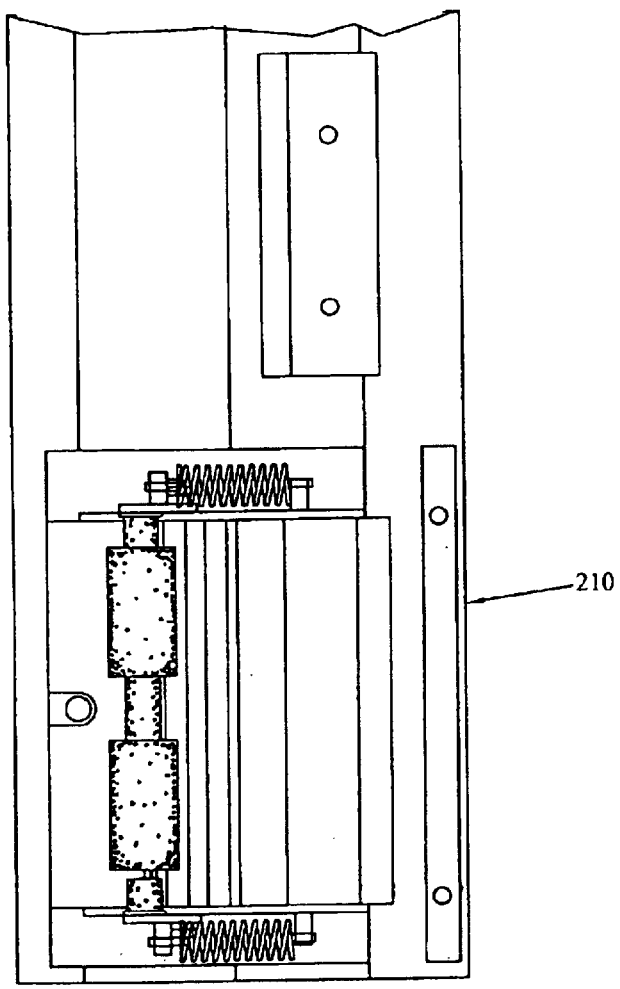
FIGS. 72 and 73 show the continued movement of the slide-out room in its retraction function.
Figure 73:
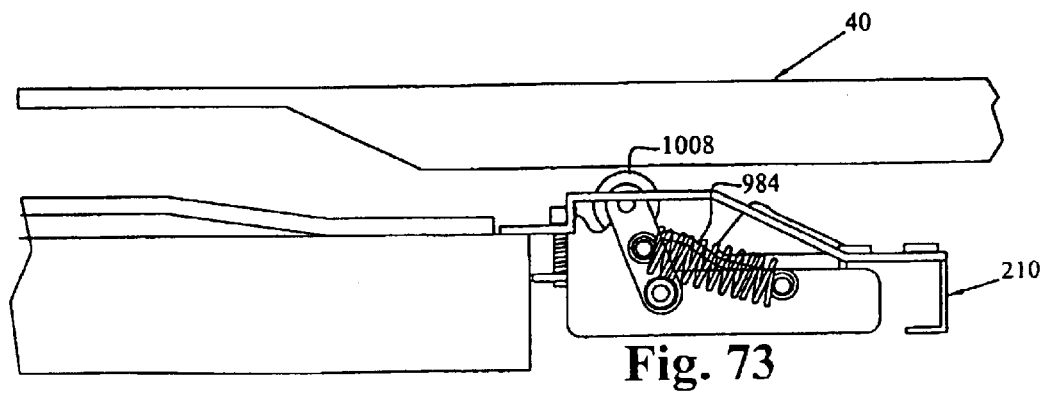
Figure 74:
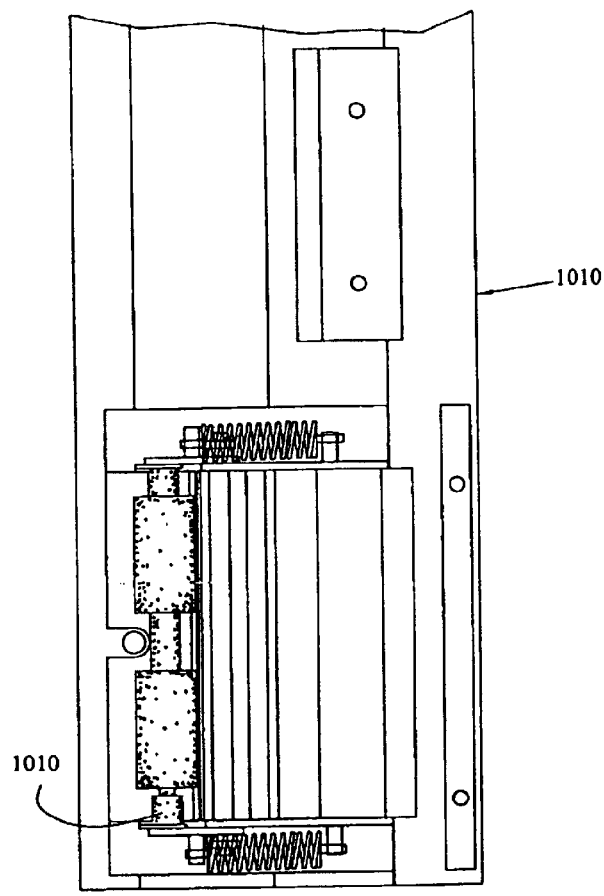
FIGS. 74 and 75 show the retraction of the slide-out room with the lifter/roller assembly mechanism in its locked position.
Figure 75:
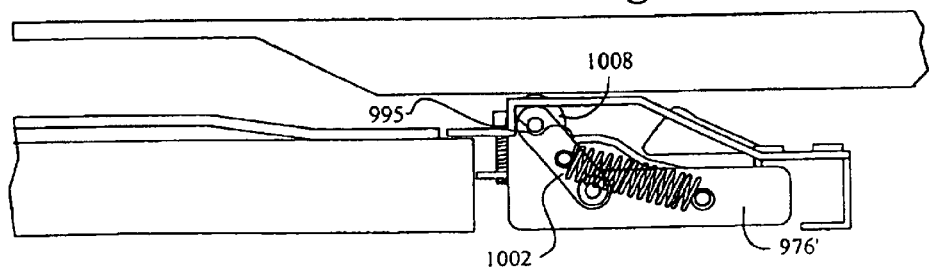

As shown in FIGS. 70 and 71, the slide-out room 30 is shown in the partially retracted position, similar to the position shown with respect to FIG. 62, where lead-in surface 68 contacts roller 1008, and roller 1008 begins to walk up the ramp surface 984. As shown in FIGS. 72 and 73, continued movement of the slide-out room floor 40 to the retracted position, that is, to the left as viewed in FIG. 73, causes roller 1008 to leave contact with the ramp surface 984 to an over-center position. Finally, continued movement of the slide-out room in the retracted function, as shown in FIGS. 74 and 75, causes the lever arm 1002 to move to a position, where the bushings 1010 are positioned within the nest section 995, where the force distribution of the weight of the slide-out room is taken up through the roller 1008, to the bushing 1010, and then distributed to end plate 976' through nest portion 995. The extension of slide-out room 30 is similar to that described above.

Figure 76:
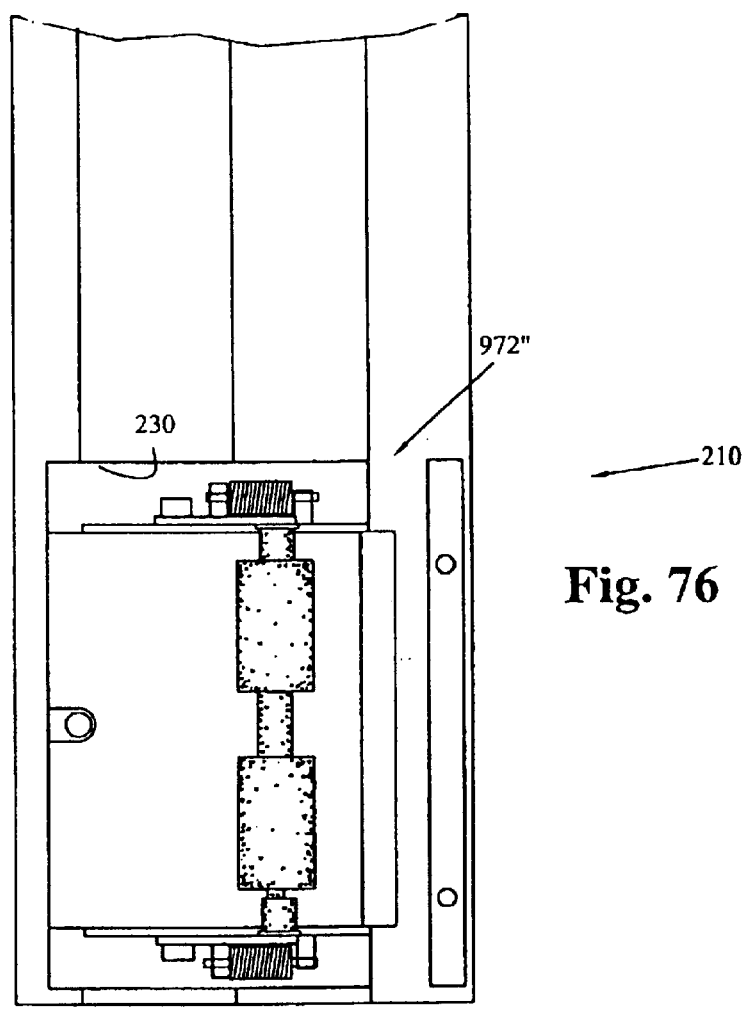
FIG. 76 is a further alternative embodiment to that of FIG. 51.
Figure 77:
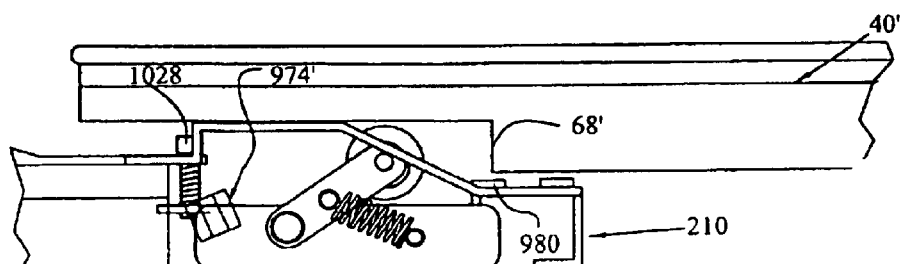
FIG. 77 is an end view of the embodiment of FIG. 76.
Figure 78:
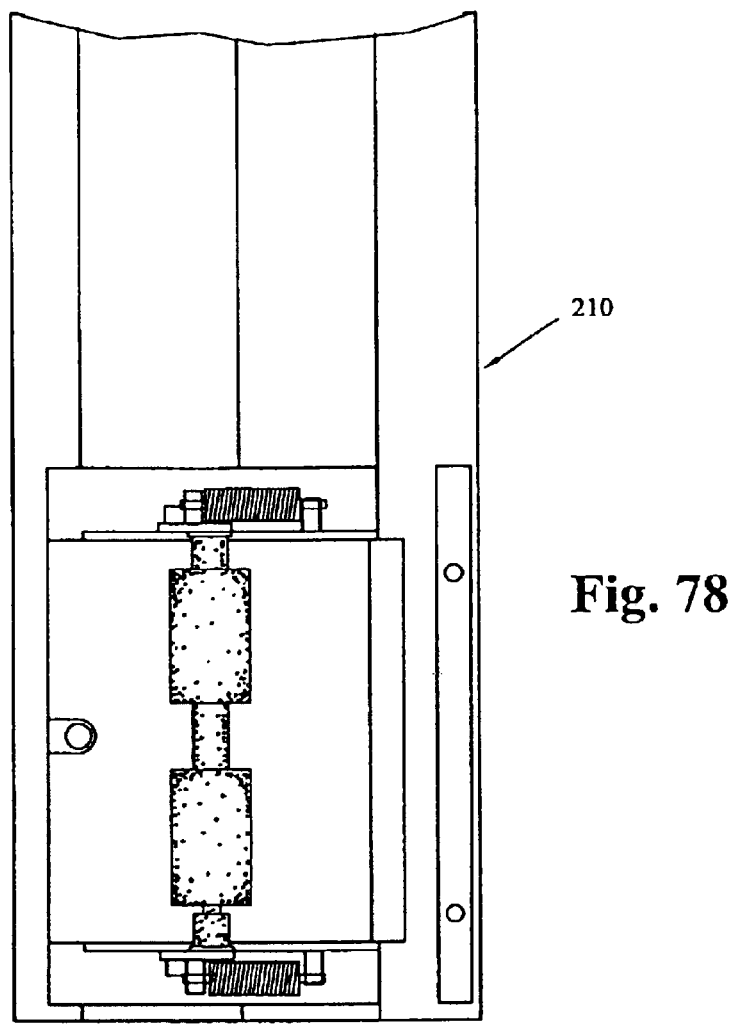
FIG. 78 is a top plan view of the mechanism as the slide-out room begins to retract.
Figure 79:
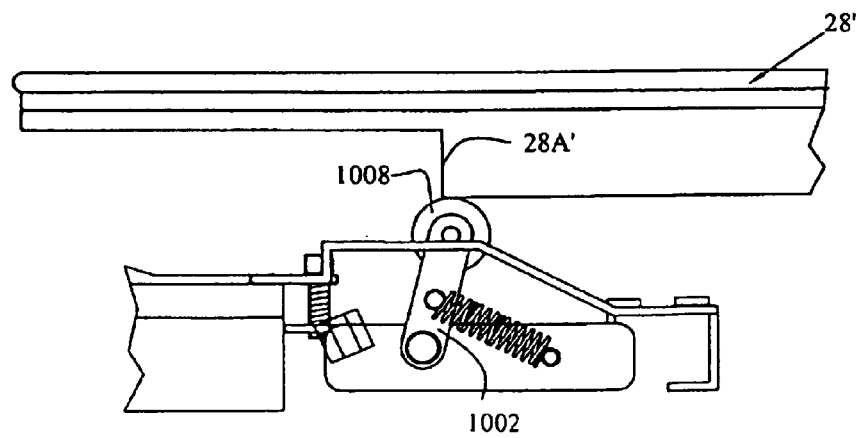
FIG. 79 shows the end view of the slide-out room in the partially retracted position of FIG. 78.
Figure 80:
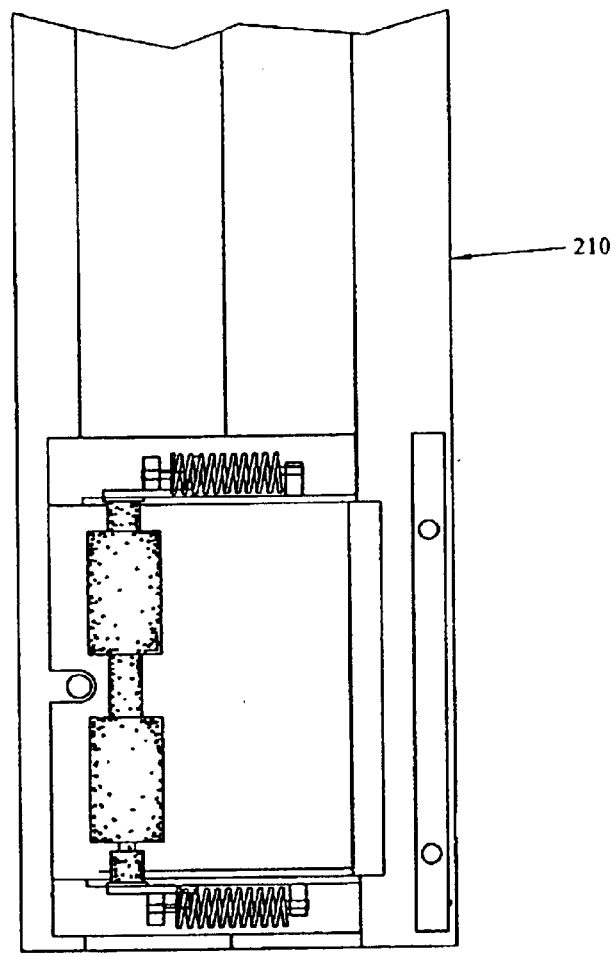
FIG. 80 is a top plan view of the mechanism when the slide-out room continues its retraction.
Figure 81:
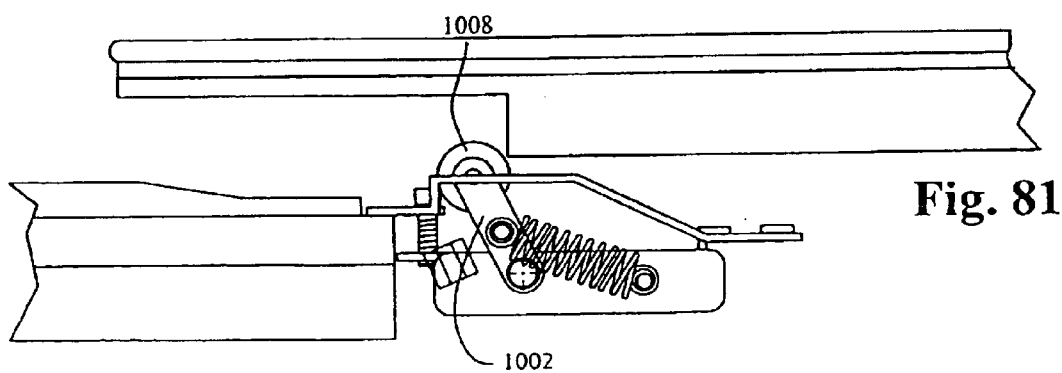
FIG. 81 is a side plan view of the mechanism shown in FIG. 80.
Figure 82:
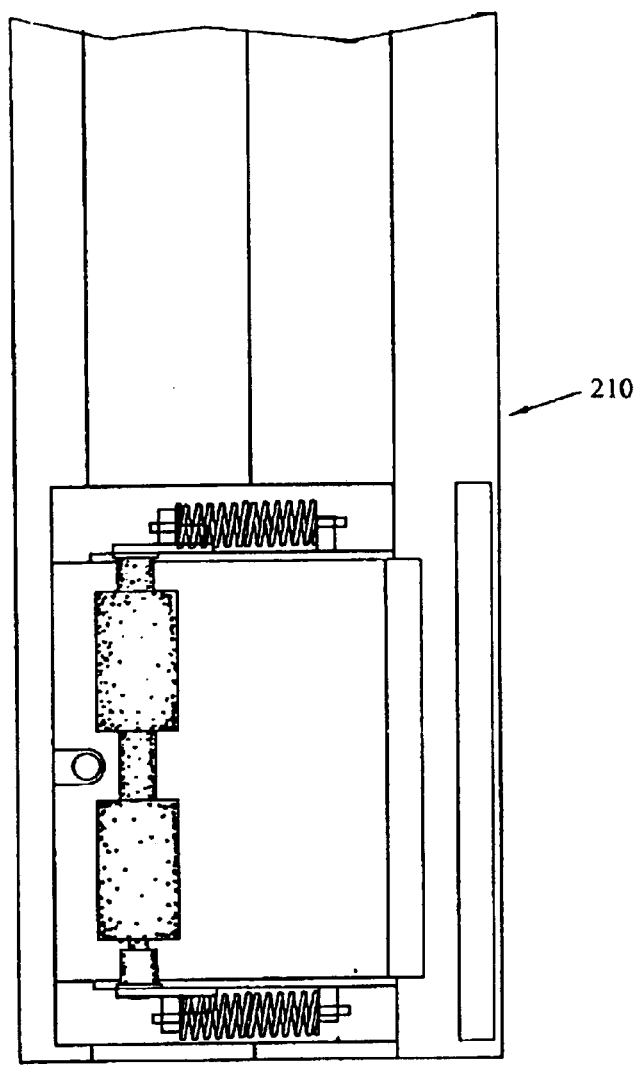
FIG. 82 shows the top plan view of the mechanism with the mechanism in the fully over-center position.

With respect now to FIGS. 76 and 77, another embodiment of the lifting mechanism 972' is shown where the mechanism is substantially identical to that of FIG. 52 with the exception that mechanism 974' does not include a ramp, but rather is a flat surface. The mechanism 974' is still positioned on the ramp mechanism 210 by way of a lip 980 and is adjusted vertically by way of jack bolt 1028. In this embodiment, the slide-out room is also modified and therefore is shown as slide-out room floor 40'. In this embodiment, rather than having a ramped surface at 68, the surface is actually shown as an abutting surface labeled 68'. In this version, as the slide-out room retracts, for example, from the position shown in FIGS. 78 and 79, the surface 68' actually abuts roller 1008 pushing lever arm 1002 to the counter-clockwise position. Continued movement of slide-out room 40' continues the rotation of the pivot arm 1002 to the position shown in FIGS. 80 and 81. Finally, the pivot arm 1002 moves to the position shown in FIGS. 82 and 83, where the pivot arm 1002 abuts the stop member 1018, whereupon the slide-out room rolls to the top of roller 1008, whereupon the slide-out room floor 40' can continue its full retraction.

Figure 84:
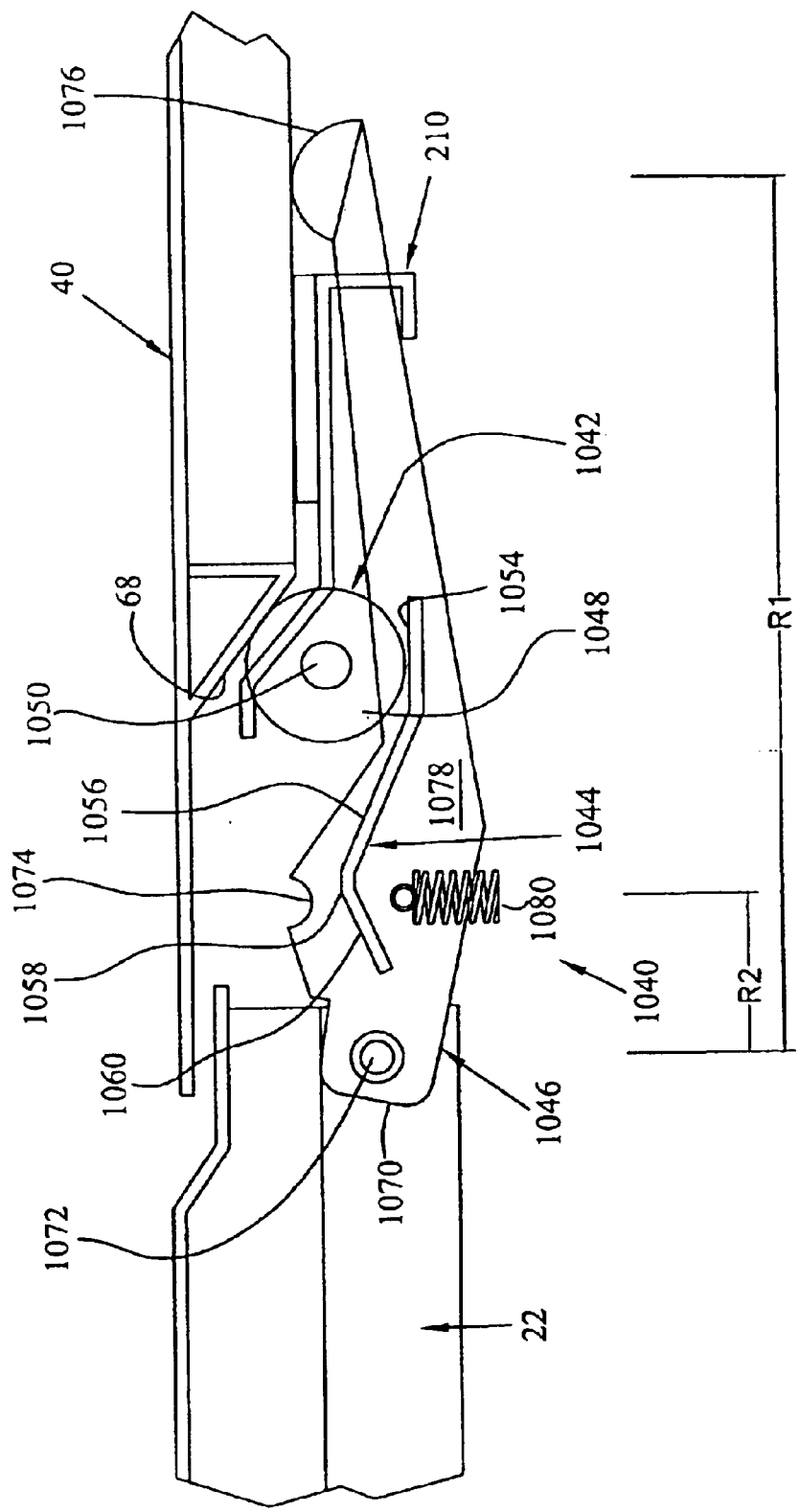
FIGS. 84–85 show an embodiment having a two-position sequence, where a roller, during the retraction of the room, is caused to roll up a ramp, and at the same time lift the slide-out room above the main room floor.
Figure 85:
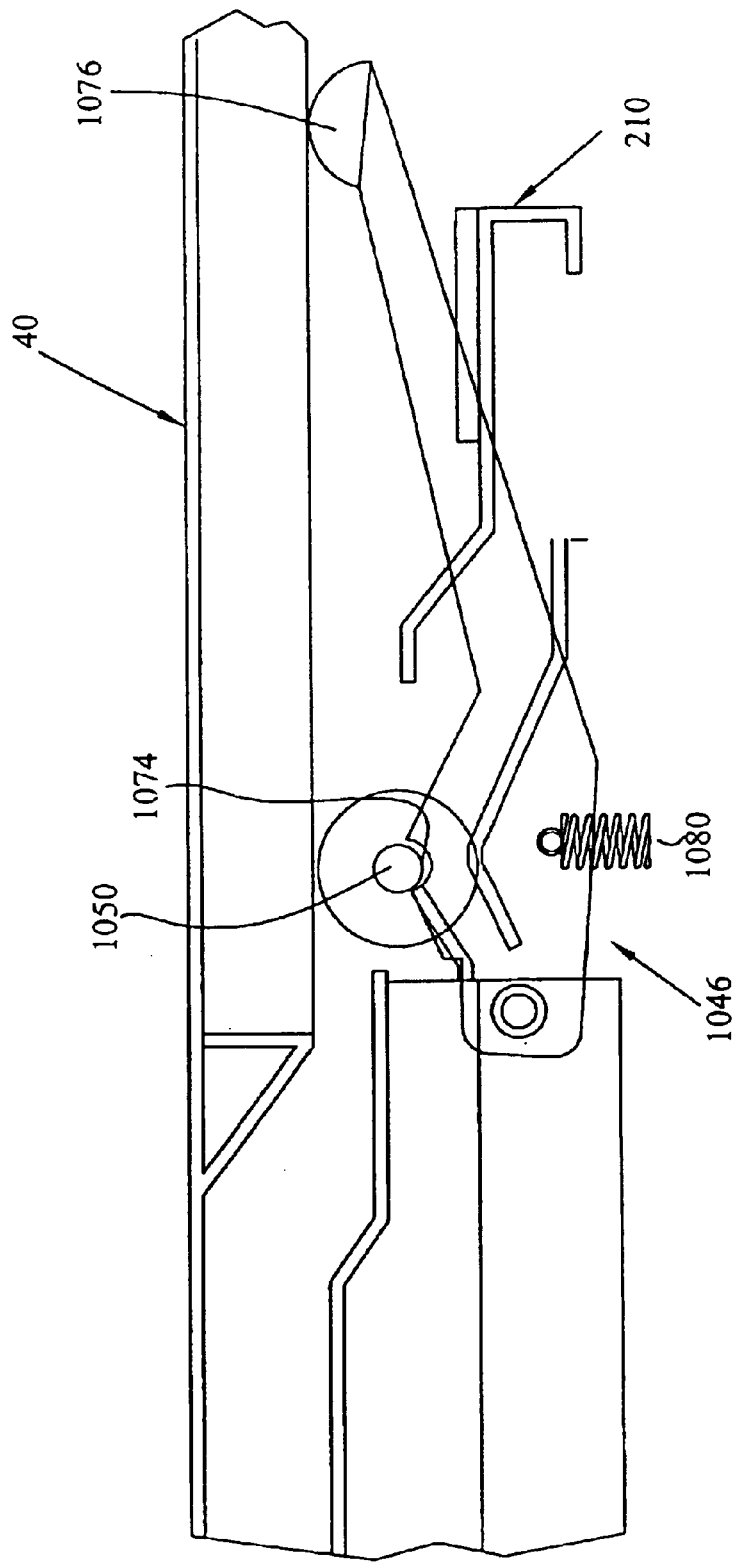

With reference now to FIGS. 84–85, a further embodiment of lifting mechanism is shown at 1040 including a roller mechanism 1042, a contoured ramp portion and a lever arm 1046. With reference to FIG. 84, roller 1042 includes end surfaces 1048 having a pin section 1050 projecting outwardly therefrom. Roller 1042 is similar to previous rollers including the rubber-like gripping outer surface. The embodiment shown in FIGS. 84–85 is a two-position mechanism, where the first and second positions are shown in FIGS. 84 and 85, respectively.

Figure 83:
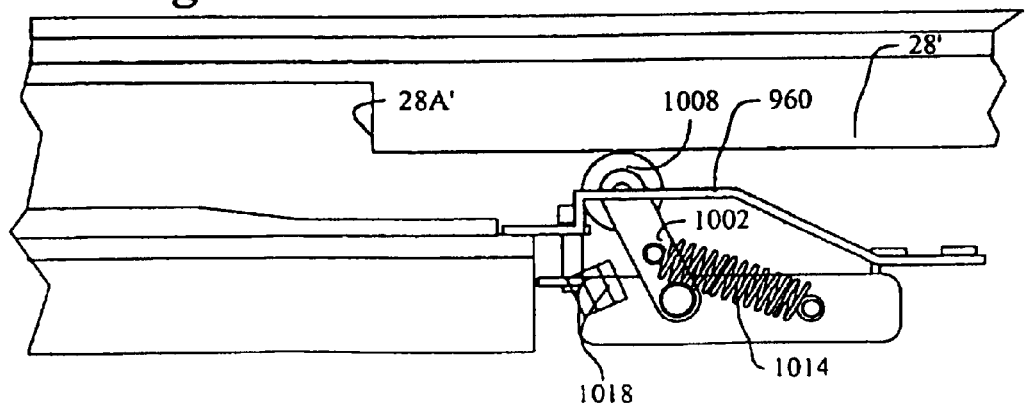
FIG. 83 shows the side plan view of the mechanism in the FIG. 82 position.

Upon extension of the slide-out room 30, the slide-out room floor 40' moves to the right as viewed in FIG. 83 to the point where the slide-out room floor drops down to surface 960, whereupon the roller will move into the void adjacent to surface 68'. The roller then follows surface 68' as the pivot arm 1002 rotates in the clockwise position under the spring load of tension spring 1014. Continued movement of the slide-out room 30 then causes the slide-out room floor 40' to move back down the ramp and back to the position shown in FIG. 77.

Ramp 1044 is shown somewhat diagrammatically (as it will need a support mechanism to hold it to the ramp mechanism 210), but includes a flat section at 1054, an inclined section at 1056, an apex portion at 1058, and a reverse inclined surface at 1060. Lever arm 1046 includes a first end 1070 having a pin aperture at 1072, a notched holding section at 1074, and an actuator pad 1076, at the fee end of lever arm 1046.

It should be understood that two such lever mechanisms 1046 are positioned such that inside surface 1078 of lever mechanism 1046 flanks the end edges 1048 of the rollers, but that shaft ends 1050 extend laterally beyond the width of lever arm 1046. It should also be understood that ramp member 1044 extends between the two lever arms 1046, but the lever arms 1046 rotate about pinned ends 1072 relative to ramp member 1044. Finally, lever arm 1046 is spring-loaded through spring 1080.

As shown in FIG. 84, slide-out room and slide-out room floor 40 are shown in the fully extended position, where floor 40 rests on ramp section 210. In this position, bottom of floor 40 acts on actuator pad 1076 and overcomes spring 1080. It should be appreciated that the force, which is due to the weight of the floor, presses upon actuator pad 1076 and acts through a moment arm $R_1$ which overcomes the force of spring 1080 which only acts through moment arm $R_2$. Retraction of the slide-out room 30 causes room floor 40 to begin moving leftwardly as viewed in FIG. 84, such that incline surface 68 begins to roll on roller 1042. This causes the movement of the roller 1042 leftwardly as viewed in FIG. 84 and to roll up incline section 1056. During this time, floor 40 is being raised upwardly due to the roller moving up ramp 1056 and due to incline surface 68. As floor 40 moves leftwardly, and upwardly, actuator pad 1076, under the influence of spring 1080, follows the bottom of floor 40 upwardly until the position where roller 1042 rests on surface 1058 of ramp 1044. As shown in FIG. 85, at this position actuator pad 1076 is clear from the bottom of the slide-out room floor 40, whereupon spring 1080 rotates through radius $R_2$ and lifts lever arm 1046 to the position shown in FIG. 85. In this position, section 1074 cups shaft section 1050 holding it in place. It should be understood that spring 1080 is sized such that the spring force, when in the position of FIG. 85, is large enough to lift the lever arm 1046 and the room 30, but that the larger moment arm $R_1$, that spring 1080 gives way, and is lowered.

Figure 86A:
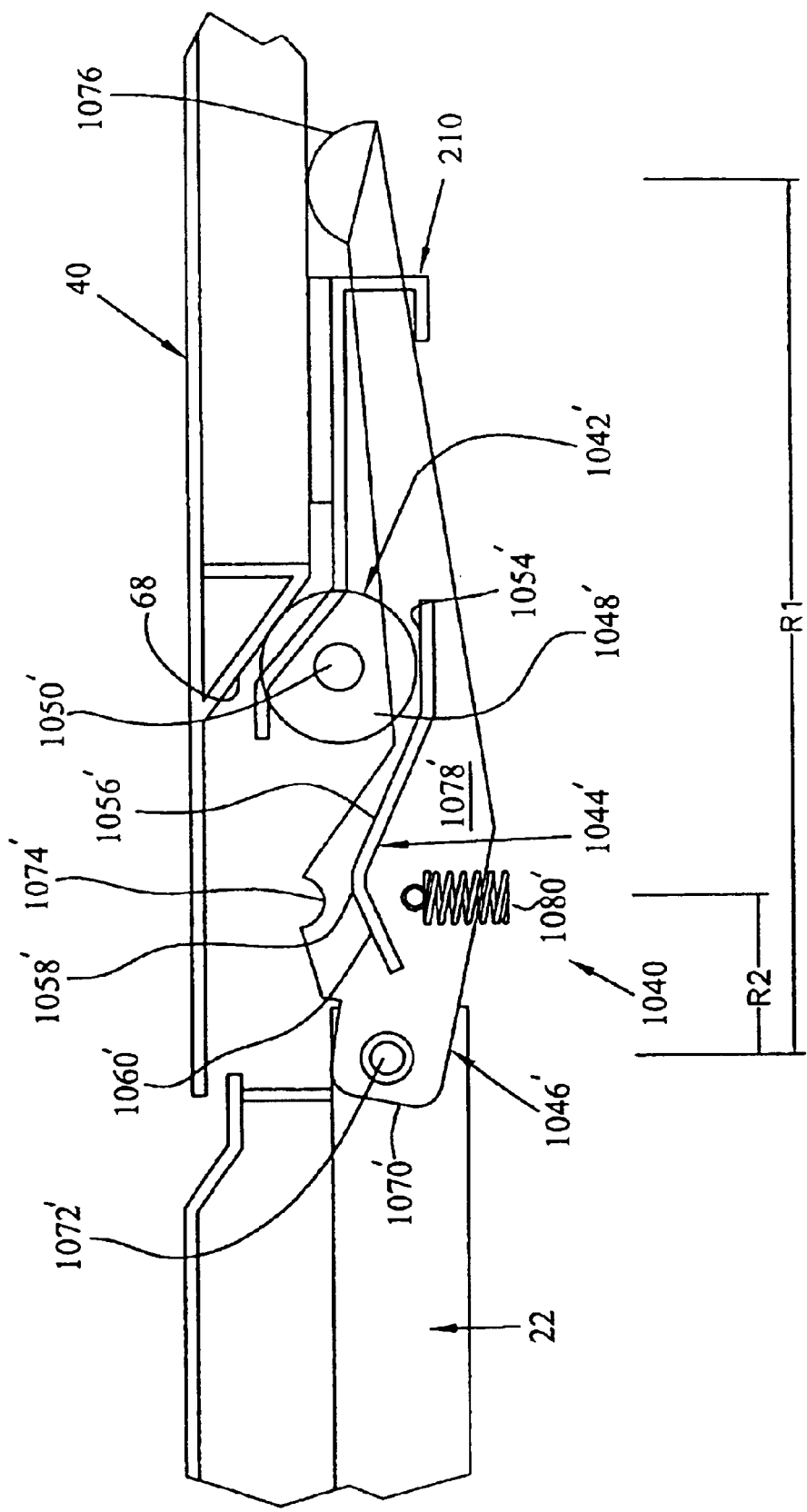
FIGS. 86A–86C show a three-position device, similar to that shown in FIGS. 84 and 85.
Figure 86B:
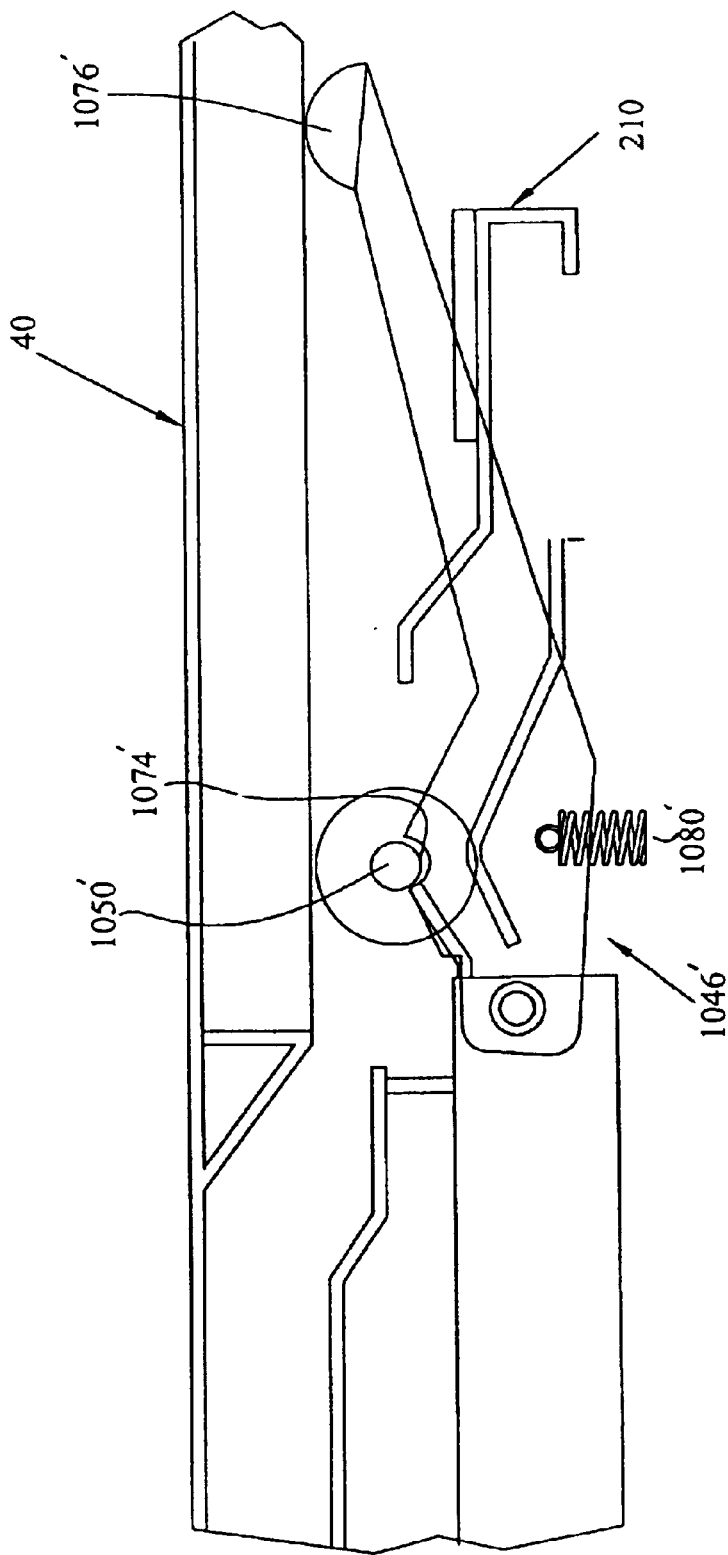
Figure 86C:
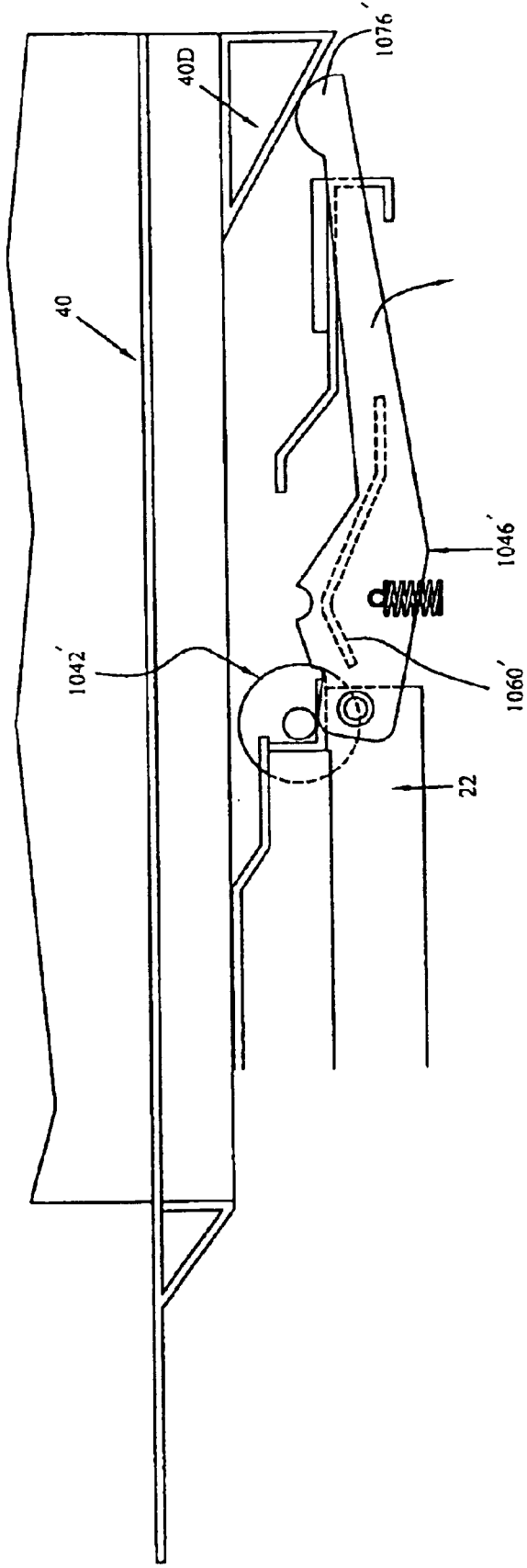

With respect now to FIGS. 86A–86C, a modification to the embodiment of FIGS. 84 and 85 is shown as a three-position lifting mechanism. This embodiment has like components labeled with primed reference numerals. FIG. 86A shows the first position, where roller 1050' rests on ramp surface 1054' of ramp 1044', similar to FIG. 84. Also, FIG. 86B shows the second position, where roller 1042' is positioned with axle 1050' residing in sections 1074'. As shown in FIG. 86B, it should be appreciated that spring 1080' lifts lever arm 1046', which lifts roller 1042' off of ramp 1044', such that roller 1042' is free wheeling.

With respect now to FIG. 86C, floor 40 includes an inverse ramp section at 40D, such that continued movement of slide-out room 40 causes ramp 40D to engage actuator pad 1076' and again rotate lever arm 1046' downwardly due to the weight of the room on the pad, again operating through radius $R_1$. However, due to the continued movement of the slide-out room 30 leftwardly, roller 1042' continues also to roll in the counter-clockwise direction as viewed in FIG. 86C and moves down ramp section 1060', which lowers floor 40 towards main room floor 22. As shown best in FIG. 86C, the ramp includes an edge surface 1090, which supports axle 1050', while roller 1042' remains in its third position. It should be appreciated that the extension of room 30 operates in exactly in opposite manner.

Figure 87:
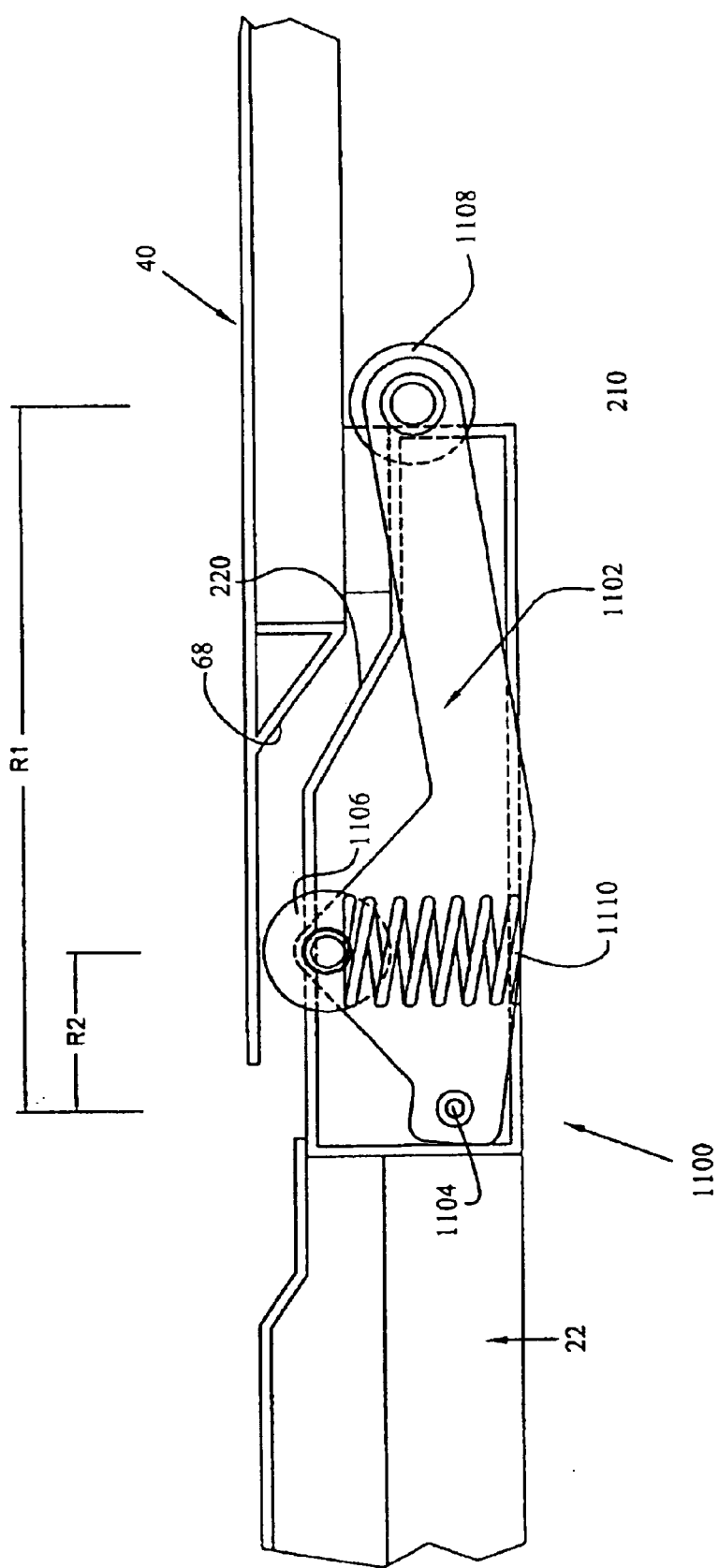
FIGS. 87–89 show an embodiment of the invention having a spring-loaded roller, which lifts the slide-out room during retraction.
Figure 88:
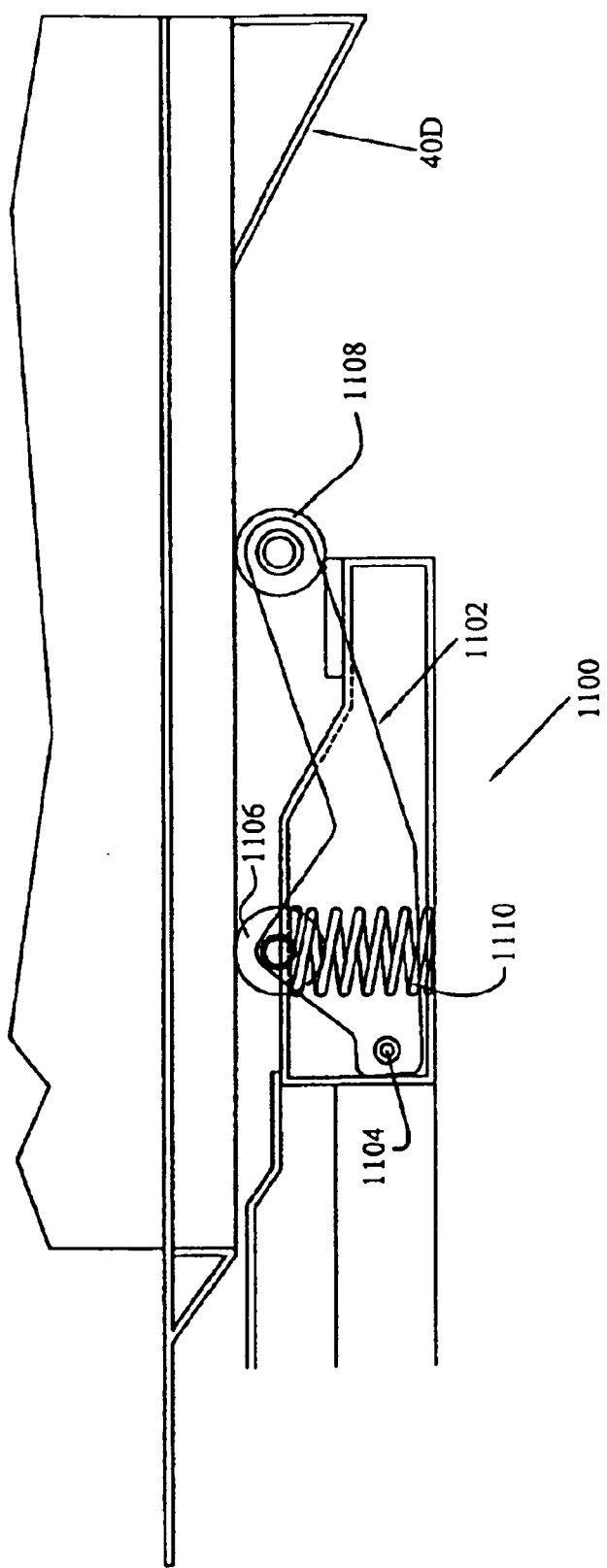
Figure 89:
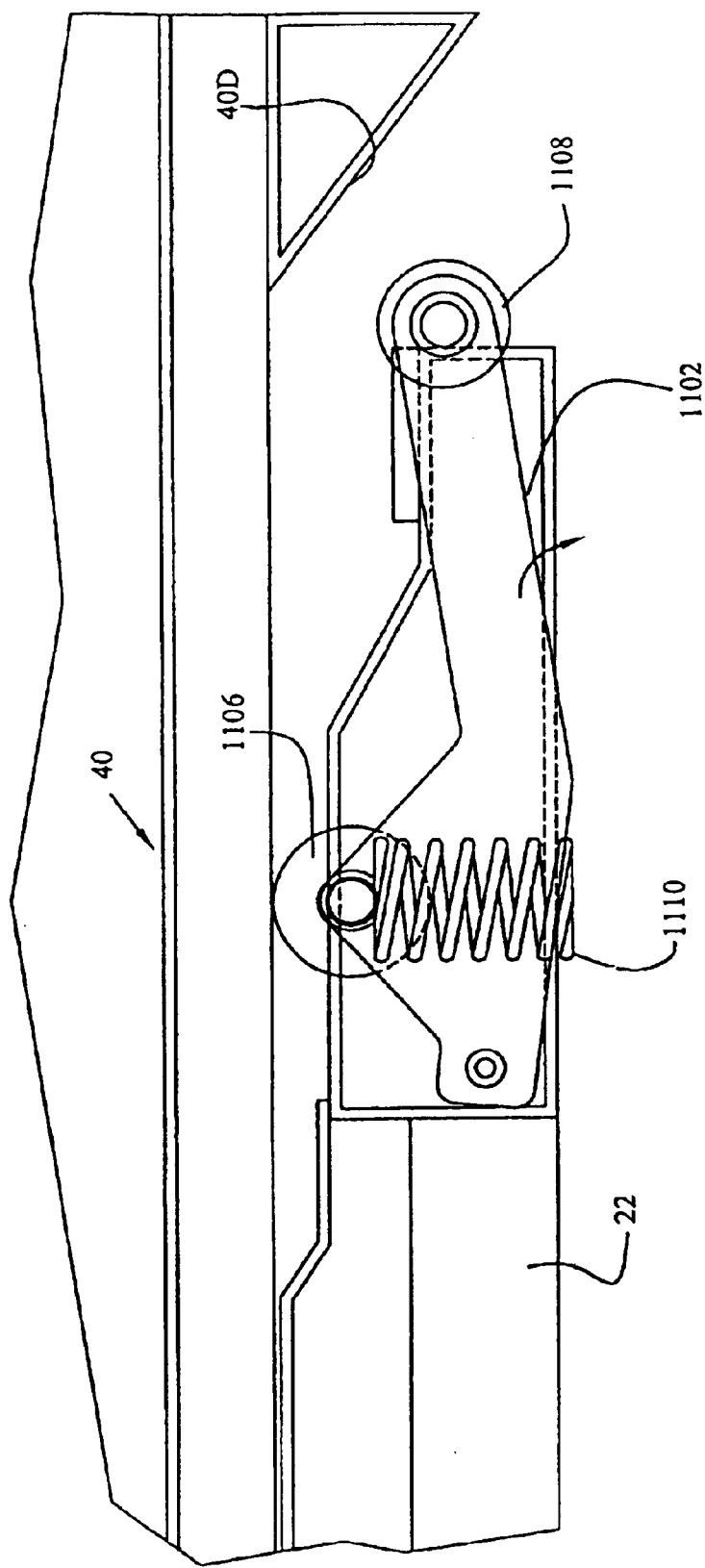
Figure 90:
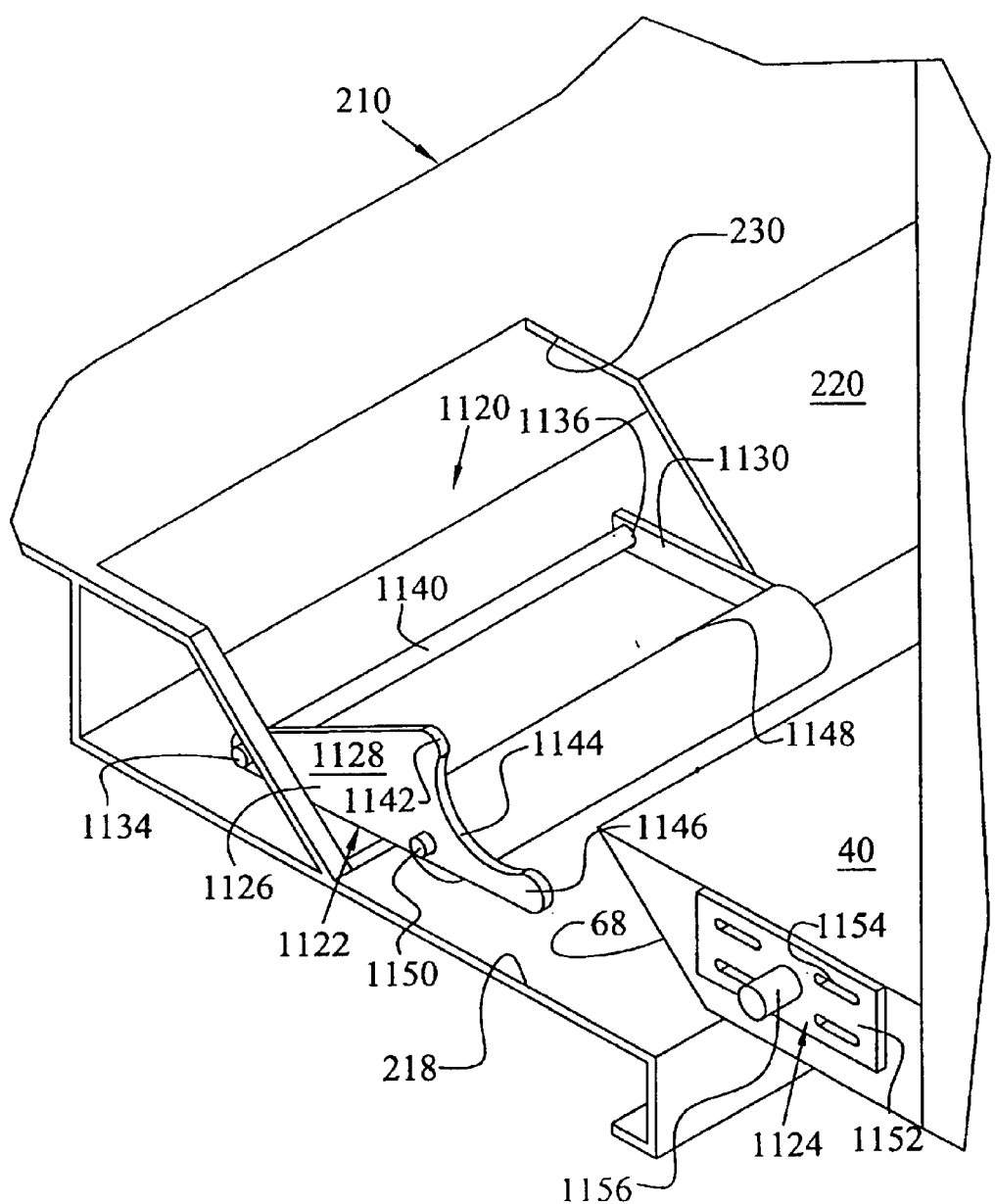
FIGS. 90 and 91 show a roller and lever mechanism, where the lever mechanism moves in an over center position when moving from the extended to retracted position.
Figure 91:
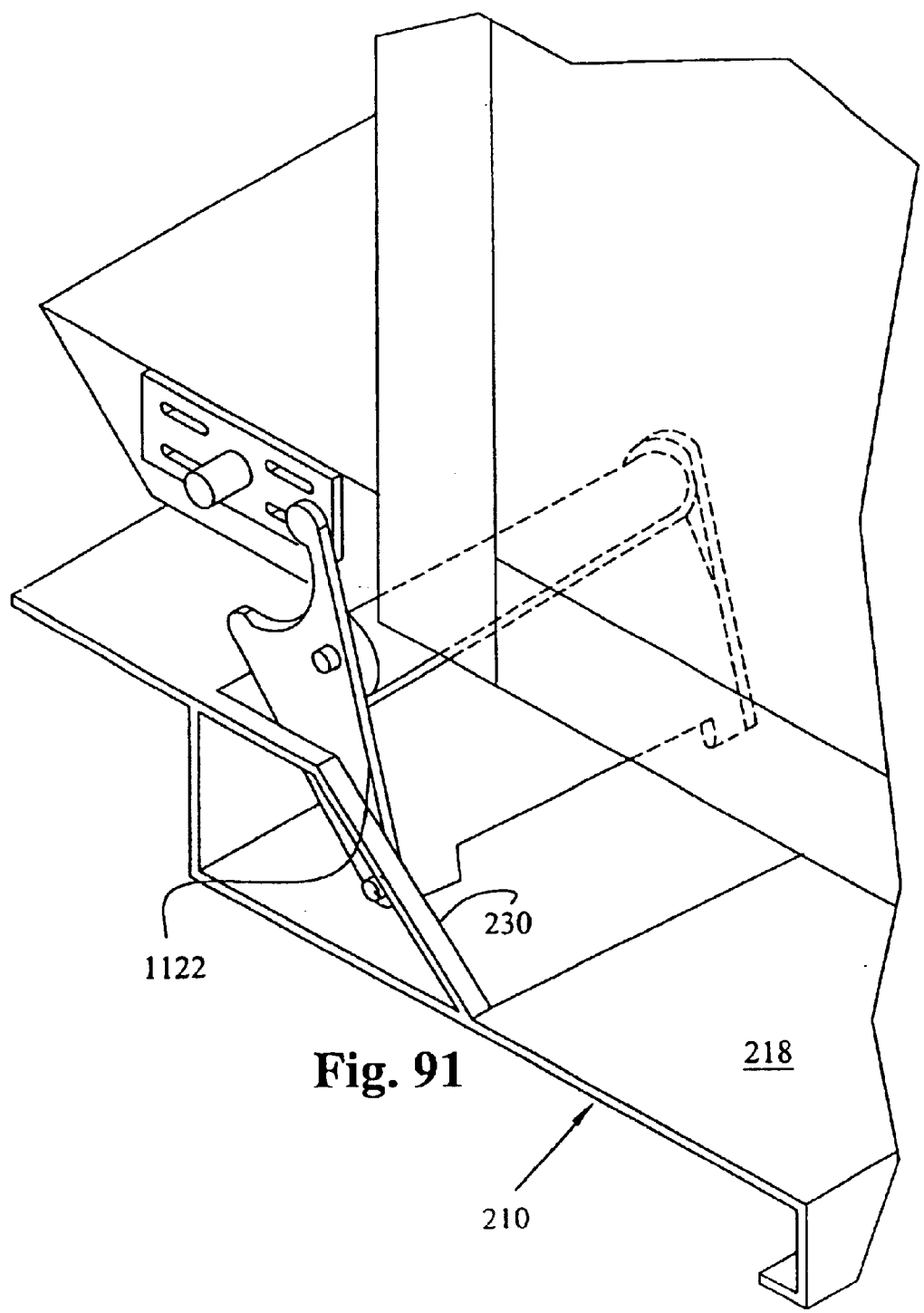

With respect now to FIGS. 87–89, another embodiment of lifting mechanism is shown at 1100. Lifting mechanism 1100 is similar to lifting mechanism 1040, which is substantially comprised of a rotatable link arm 1102, which is preassembled within ramp member 210. Link arm 1102 is pinned at 1104 and includes a first roller 1106 and a second roller 1108 at the opposite end. Spring member 1110 places an upward load on link arm 1102 operating through moment arm $R_2$. Lifting mechanism 1100 operates very similarly to the embodiment of mechanism 1040, such that when in the fully extended position of FIG. 87, and room floor 40 begins to move leftwardly, inclined floor section begins to roll up section 220 of ramp mechanism 210 until it reaches roller 1106. As in the previous embodiment, when the slide-out room is in the fully extended position, the weight of the slide-out room acts upon roller 1108 through moment arm $R_1$ to keep the lever arm 1102 rotated in its fully downward position of FIG. 87. However, as the room continues its movement, for example, to the position shown in FIG. 88, when the room is on top of roller 1108, the force of spring member 1110 rotates lever arm 1102 to its fully counter-clockwise position. Again, as the slide-out room moves into its fully retracted position, that is, as shown in FIG. 89, reverse incline section 40D of floor 40, and through the weight of the slide-out room 30, acts upon roller 1108 rotating lever arm 1102 in the clockwise direction and overcomes spring member 1110 to move lever arm 1102 into the position shown in FIG. 89. This lowers floor 40 towards main room floor 22.

With reference now to FIGS. 90–94, another embodiment of lifting mechanism will be shown and described and is referred to generally as mechanism 1120. Lifting mechanism 1120 is generally comprised of a rotatable 1122 lever mechanism 1122 together with an actuator member 1124, which is mounted to a side edge of slide-out room floor 40. As shown best in FIG. 90, lever mechanism 1122 is comprised of a plate member 1126 comprised of an outer end plate 1128, an opposite end plate 1130 with an intermediate plate at 1132. End plate 1128 includes a pivot section comprising an opening at 1134, whereas plate 1130 includes a pivot opening at 1136. Together these plates carry a pivot axle 1140, which would be carried by some means (not shown) for retaining the axle 1140 and allowing the rotation thereto. Such mechanism could be a bearing mounted to the ramp mechanism 210 or a trunion-like mechanism as in previous embodiments. End plate 1128 further comprises an opposite end section comprising an upstanding projection section 1142, a recessed section at 1144, and an upstanding finger portion at 1146. Finally, the lever mechanism 1122 is comprised of a roller mechanism 1148, similar to all previously described rollers, and extends between plate 1128, 1130 by way of a pinned axle at 1150. Finally, actuator member 1124 is comprised of a plate 1152 having a plurality of elongate openings at 1154 and a pin projection at 1156 for actuating lever mechanism 1122 as will be described.

Figure 92A:
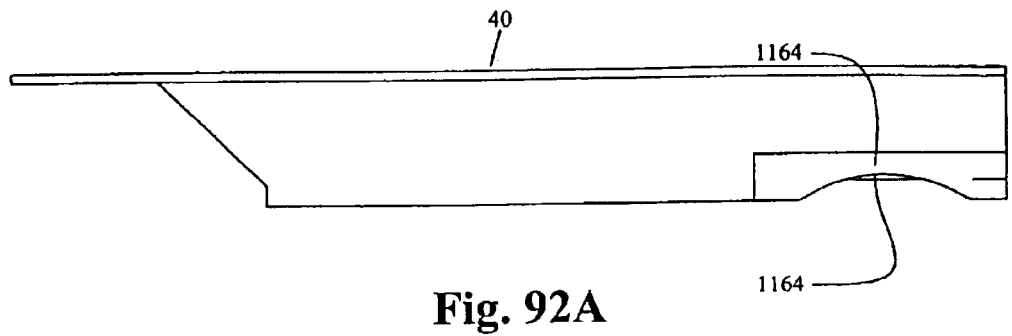
FIGS. 92–94 show the movement of the slide-out room, including the device shown in FIGS. 90 and 91.
Figure 92:
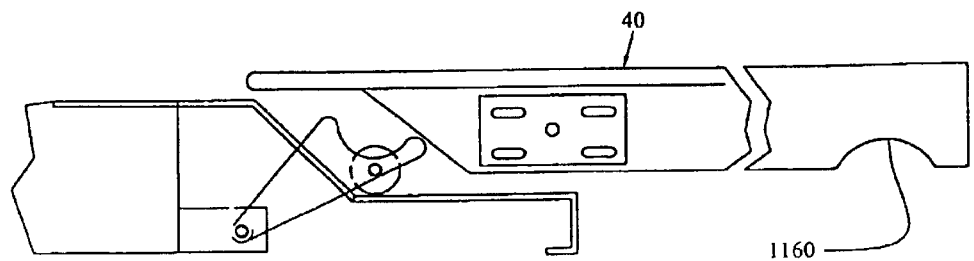
Figure 93:
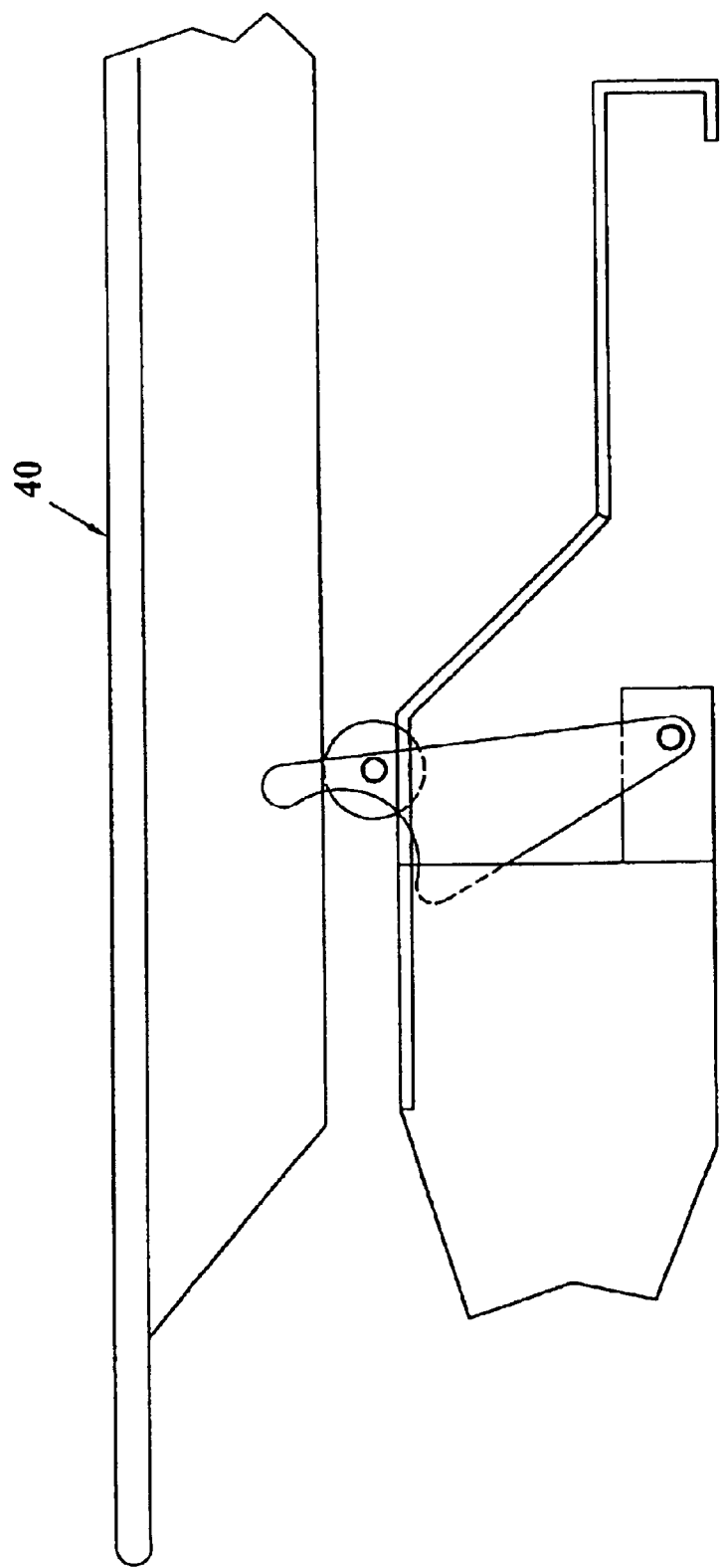
Figure 94:
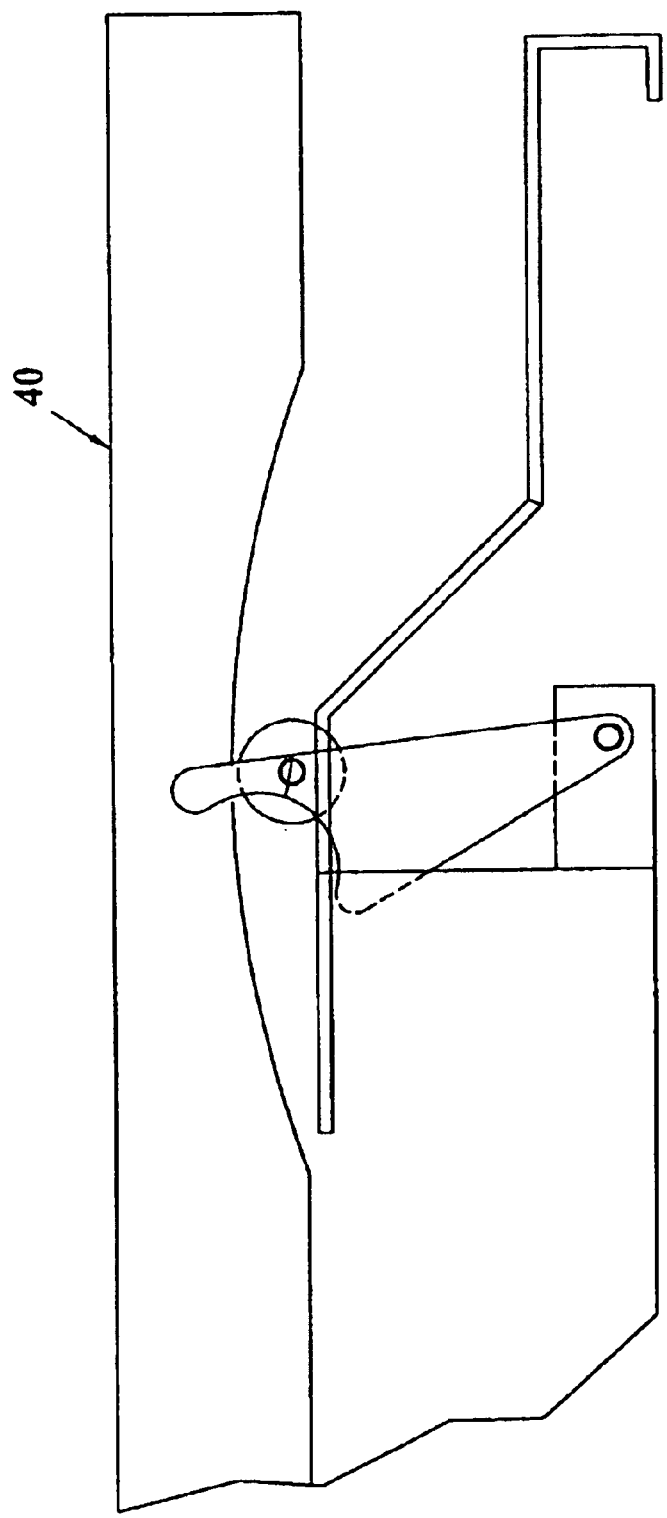

It should be understood that lever mechanism 1122 is mounted within the ramp mechanism 210, such that lever member 1122 is rotatable through opening 230. It should also be appreciated that actuator member 1124 is mounted to the side edge of slide-out room 40 by way of fasteners extending through elongate openings 1154. It should also be appreciated that the actuator member 1124 is mounted to the side edge of slide-out room 40, such that pin 1156 resides at a front-to-back location, such that leading edge 68 begins to slide up inclined section 220, such that pin 1156 passes over finger 1146 and hits within recessed section 1144, as shown in FIG. 92. Continued movement of the slide-out room inwardly causes lever mechanism 1122 to rotate in the counter-clockwise direction to the position shown in FIG. 91, carrying with it roller 1148. Continued movement of the slide-out room 30 and slide-out room 40 into the fully retracted position maintains lever mechanism 1122 in the position of FIG. 91. Thus, the slide-out room 30 and slide-out room floor 40 maintain a vertical height above the main floor when in the retracted position. With reference to FIGS. 92 and 92A, a floor modification is possible where, as shown in FIG. 92A, a recess is positioned within the bottom of the floor shown at 1160, such as that shown in FIGS. 93 and 94, as the slide-out room moves to a position near full retraction, roller 1148 begins to travel down into recess 1160, such that floor is positioned against the main room floor in its resting position.

An alternate version is shown in FIG. 92A, where a side rail 1162 has a cavity at 1164, where instead of an elongate roller, a side roller, which is the width of the rail 1162 only, such that rail 1162 passes along on top of the roller, where the roller then travels into cavity 1164 to lower slide-out room floor 40 towards the main room floor.

FIGS. 95–98 show manually adjustable lifting mechanisms, which extend upwardly through opening 230 of ramp mechanism 210. The devices are intended for usage with rails 50 (FIG. 4), or rails 110 (FIG. 10); and are intended to replace wear pads 102 (FIG. 6), 130 (FIG. 12), 152 (FIG. 15) or 162 (FIG. 17).

Figure 95:
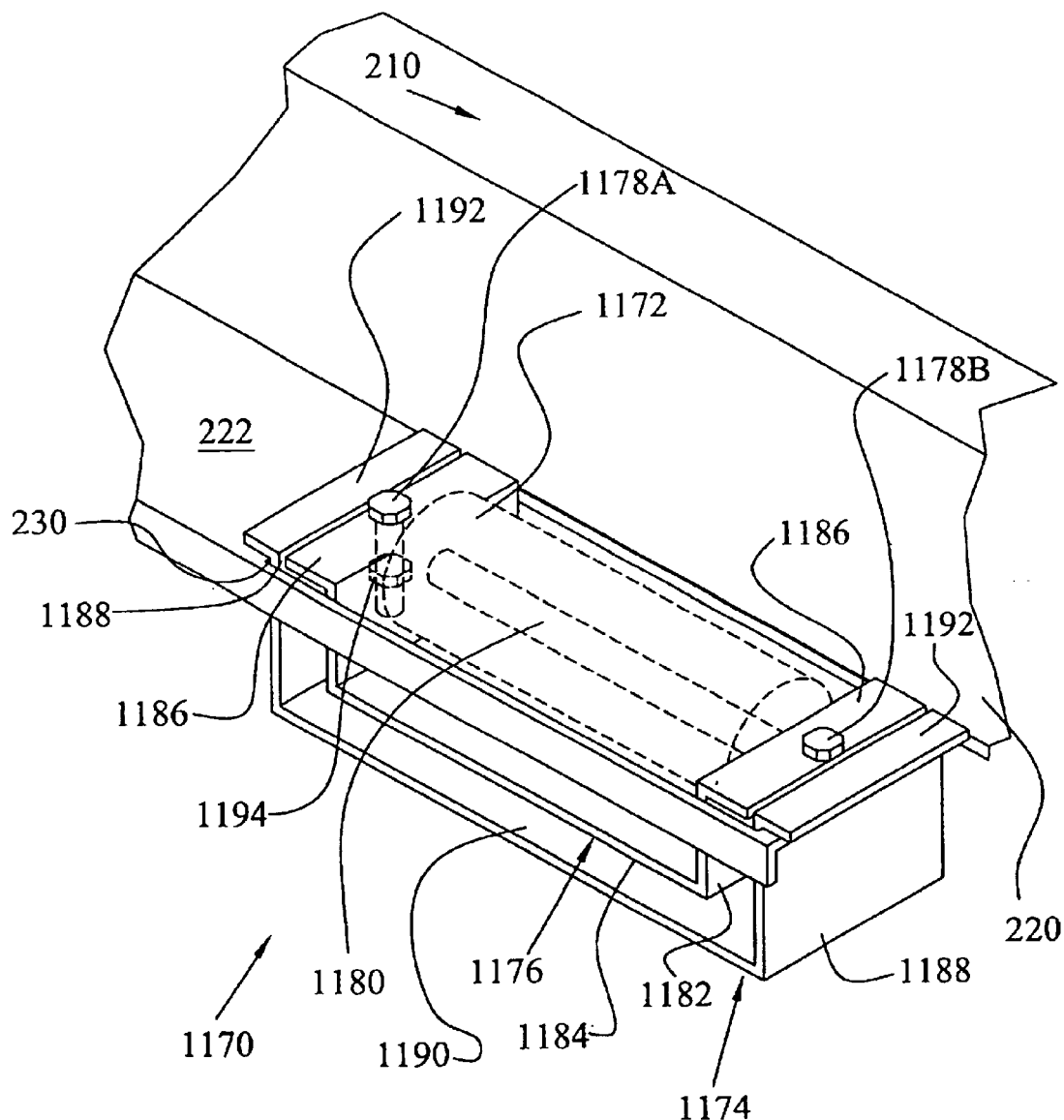
FIG. 95 is a perspective view of another embodiment of the present invention.
Figure 96:
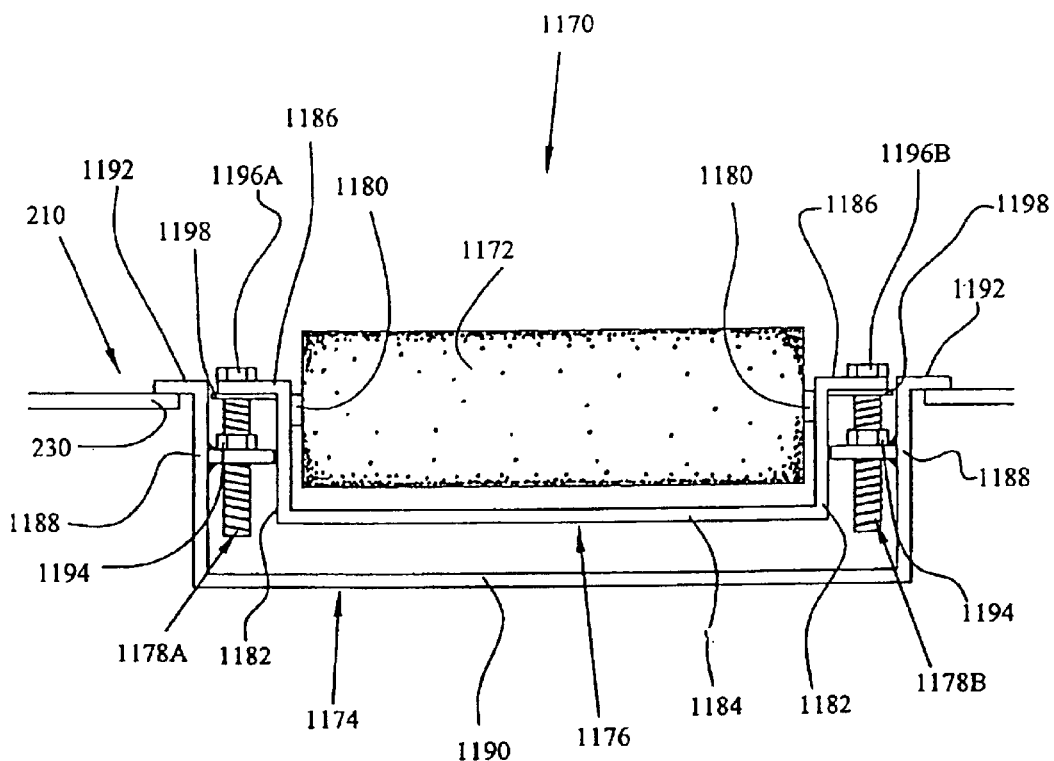
FIG. 96 is a side, elevational view of the embodiment of FIG. 95.

With reference first to FIGS. 95 and 96, a further lifting assembly 1170 is depicted, which is manually adjustable. Lifting assembly 1170 generally includes a roller 1172, an outer bracket 1174, an inner bracket 1176, and a pair of adjusting bolts 1178a, 1178b. The entire assembly is disposed within an opening 230 of ramp mechanism 210. An axle 1180 extends through roller 1172 and is supported by a pair of apertures (not shown) formed in side walls 1182 of inner bracket 1176. Side walls 1182 of inner bracket 1176 are connected together by a central wall 1184 and each includes a flange 1186, which extends from the side wall at a right angle. Each flange 1186 includes a through opening (not shown) through which bolts 1178A, 1178B extend.

Outer bracket 1174 includes a pair of parallel side walls 1188 connected together by a central wall 1190. A pair of flanges 1192 extend from the free ends of side walls 1188 at an angle conforming to the angle of sloping portion 220 of ramp mechanism 210 as best shown in FIG. 95. Flanges 1192 are fixedly mounted to ramp 210. A pair of nuts 1194 are welded onto the opposed, interior surfaces of side walls 1188 of outer bracket 1174 to receive bolts 1178A, 1178B, respectively, as best shown in FIG. 96.

Bolts 1178A, 1178B include heads 1196A, 1196B, respectively, at one end and a washer 1198 fixedly attached (such as by welding) to the bolt at a location spaced apart from heads 1196A, 1196B. As best shown in FIG. 96, bolt heads 1196A, 1196B and washers 1198 capture flanges 1186 of inner bracket 1176. The spacing between heads 1196A and washers 1198 is larger than the thickness of flanges 1186 to permit rotation of bolts 1178A, 1178B to adjust the position of roller 1172 as described below.

Bolts 1178A, 1178B are situated such that they may be manually adjusted when necessary. Also, bolts 1178A, 1178B are dependent from one another. Therefore, one bolt 1178A, 1178B may be adjusted to an extent, which differs from the adjustment of the other bolt. Rotation of bolts 1178A, 1178B in one direction causes the bolts to thread through nuts 1194 farther downward toward central wall 1190, thereby lowering roller 1172. Rotation of bolts 1178A, 1178B in the other direction lifts roller 1172. It should also be noted that the roller 1172 may be fixed, or may be free to rotate. It may be advantageous to allow roller 1172 to roll in order to avoid uneven wear of rollers 1172 over a period of time.

Figure 97:
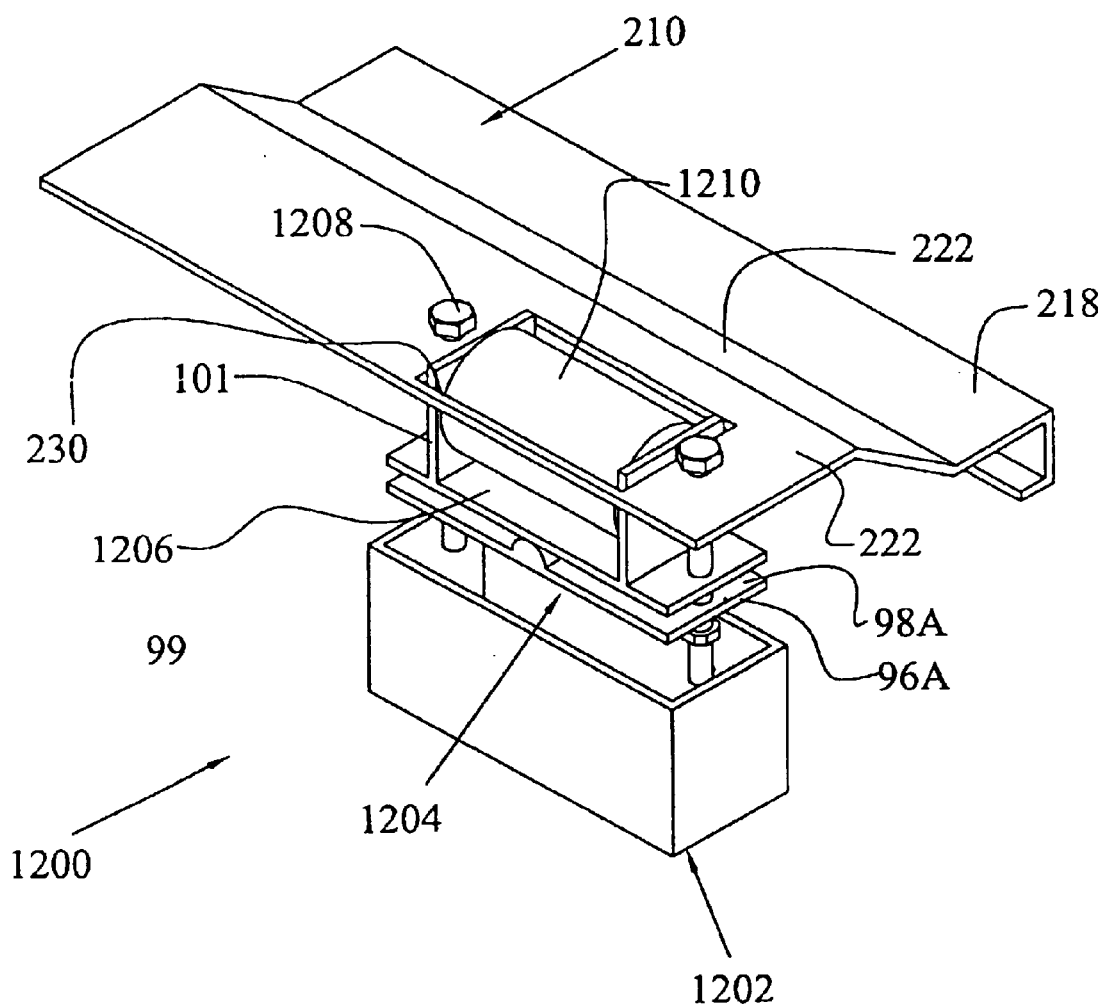
FIG. 97 is a partially fragmented, perspective view of another embodiment of the present invention.

FIGS. 97 and 98 depict another manually adjustable lifting assembly 1200. Lifting assembly 1200 is generally comprised of a housing 1202, a rocker plate 1204, a roller plate 1206, a pair of bolts 1208, and roller 1210. Assembly 1200 is suspended below upper portion 222 of ramp mechanism 210, with a portion extending through opening 230 of ramp mechanism 210.

As best shown in FIG. 98, housing 1202 includes side walls 1214 which form a box, and bottom wall 1216. A pair of openings 1218 are formed in bottom wall 1216 to receive bolts 1208 as is further described below. Housing 1202 prevents dirt and debris from interfering with the operation of lifting assembly 1200. Rocker plate 1204 fits within housing 1202 and includes a rectangular plate 1220 having a pair of threaded openings 1222 which align with housing openings 1218, and a fulcrum 1224 which is substantially centered on plate 1220. Roller plate 1206 rests on top of rocker plate 1204 in contact with fulcrum 1224. Roller plate 1206 includes a rectangular plate 1226 having a pair of through holes 1228 which align with rocker plate openings 1222. A pair of supports 1230 extend upwardly from rectangular plate 1226, and each include an opening (not shown) for receiving axle 1232, which is centrally disposed within roller 1210.

Bolts 1208 extend through apertures 1234 located on either side opening 230 in the upper portion 222 of ramp mechanism 210. These apertures 1234 align with through holes 1228 of roller plate 1206, threaded openings 1222 of rocker plate 1204, and openings 1218 of housing 1202. Upon assembly, bolts 1208 are passed through apertures 1234 and through holes 1228, and are threaded into threaded openings 1222 of rocker plate 1204. Bolts 1208 are threaded through threaded openings 1222 sufficiently far such that a portion of each bolt 1208 extends below rocker plate 1204. Housing 1202 is then installed upwardly toward upper portion 222 of ramp mechanism 210 such that bolts 1208 extend through openings 1218 and housing 1202 substantially encloses rocker plate 1204 and roller plate 1206 (FIG. 97). A pair of lock nuts 1236 are then threaded onto and fixedly attached to bolts 1208. Accordingly, lifting assembly 1200 is suspended below ramp mechanism 210 by bolts 1208.

Bolts 1208 are accessible, and can be manually manipulated, either individually, or in combination. Rotation of either bolt 1208 either raises or lowers rocker plate 1204 and, therefore, roller plate 1206 and roller 1210. This adjusts the extent by which roller 1210 extends upwardly through opening 230, thereby adjusting the alignment within vehicle opening 28 of the side of room 30 corresponding to lifting assembly 1200. Since roller plate 1206 rocks or pivots on fulcrum 1224, roller 1210 can tilt somewhat side-to-side to ensure full contact with the bottom surface of room floor 40 and prevent uneven wear to roller 1210 or damage to room floor 40.

Although the present invention has been shown and described in detail, the same is to be taken by way of example only and not by way of limitation. It should be understood that only exemplary embodiments have been shown and described and that all changes and modifications that come within the spirit of the invention and the scope of the appended claims are desired to be protected.

What is claimed is:

1. A mobile living quarters comprising a frame, a structure supported by said frame defining a main room including side walls, a ceiling and a floor, with one of said sidewalls defining an opening therethrough, a slide-out room mounted for movement through said opening between a retracted position retracted into the main room and an extended position extended from the main room to provide an auxiliary living area, said slide-out room including a back wall, sidewalls, a ceiling and a floor, and a lifting mechanism for lifting said slide-out room floor off of said main room floor during the retraction and extension of said slide-out room wherein a lower edge of said opening includes an inclined ramp having an aperture, said lifting mechanism projecting upwardly through said aperture, a leading edge of said slide-out room resting on said inclined ramp when said slide-out room is in the retracted position.

2. The mobile living quarters of claim 1, wherein said lifting mechanism is comprised of a roller movable through said aperture, and cooperable with said leading edge of said slide-out room floor to raise said-slide-out room floor.

3. The mobile living quarters of claim 1, wherein said lifting mechanism is mounted within said ramp, and exerts pressure on the bottom of said slide-out room floor.

4. The mobile living quarters of claim 2, wherein said roller is movable under the influence of fluid pressure.

5. The mobile living quarters of claim 4, wherein a fluid actuated cylinder moves said rollers.

6. The mobile living quarters of claim 2, wherein said roller is cooperable with said slide-out room floor, whereby when said slide-out room floor contacts said roller, the rotation of said roller, moves said roller vertically.

7. The mobile living quarters of claim 6, wherein said roller is interconnected to a linkage which causes said vertical movement.

8. The mobile living quarters of claim 7, wherein said roller includes at least one gear mounted thereto, whereby said at least one gear meshes with a mating bevel gear, and said mating bevel gear is attached to a jack screw, and the roller rotation causes the jack screw to also rotate lifting said roller from a base to which said roller mounts.

9. The mobile living quarters of claim 7, wherein said roller is mounted on a threaded shaft, and said lifting mechanism further comprises at least one threaded collar cooperable with said threaded shaft, and said threaded collar moves laterally upon rotation of said roller, and said linkage includes a pivot arm movable by said threaded collar, whereby said pivot arm raises said roller.

10. The mobile living quarters of claim 9, wherein said threaded shaft extends from opposite ends of said roller and has threaded portions with opposite hand threads.

11. The mobile living quarters of claim 9, wherein said roller is mounted to a carrier member, which is movable relative to a base member, and said pivot arm pivots relative to said base member, said pivot arm being operatively attached to said carrier member to raise said carrier member and roller.

12. The mobile living quarters of claim 1, wherein said lifting mechanism is mounted to a carrier member, which is mounted adjacent to said opening, and said carrier member is vertically adjustable to vary the position of said lifting mechanism.

13. The mobile living quarters of claim 2, wherein said roller is mounted to a rotatable lever, and said lever is rotated in response to the inward movement of the room, to a position increasing the vertical component of the roller, whereby said slide-out room floor is raised by said roller.

14. The mobile living quarters of claim 12, wherein said roller is rotated in response to engagement of said slide-out room floor with said roller.

15. The mobile living quarters of claim 13, wherein said lifting mechanism further comprises a contoured ramp positioned intermediate said roller and said lever, when said slide-out room is in the extended position, and said roller rolls up said contoured ramp upon retraction of said slide-out room.

16. The mobile living quarters of claim 14, wherein said lever is movable to an over center position, whereby said slide-out room floor is maintained at a vertical spacing above said main room floor.

17. The mobile living quarters claim 12, wherein said lever is rotated in response to engagement by an actuator attached to said slide-out room.

18. The mobile living quarters of claim 1, wherein said lifting mechanism is comprised of at least one pair of cooperable rollers, said rollers being linked together, whereby, when said slide out room contacts a first roller, the rolling of the first roller causing the second roller to raise vertically.

19. The mobile living quarters of claim 1, wherein said lifting mechanism is further profiled to lower said slide-out room, when in the extended position, such that the main room floor is in a substantially flush position with respect to the slide-out room floor.

20. The mobile living quarters of claim 19, wherein a ramp mechanism is positioned in said opening, said ramp mechanism includes a lower edge with an inclined ramp.

21. The mobile living quarters of claim 20, wherein a roller mechanism is held in position adjacent said inclined ramp, and has first and second vertical positions, when said roller mechanism is raised to said second vertical position, said slide-out floor rolls on said roller mechanism at a vertical height above said main room floor, and when said slide-out room moves toward the extended position, and said roller mechanism is lowered to said first position, said slide-out room floor moves to said substantially flush position.

22. A lifting mechanism for a mobile living quarters comprising a frame, a structure supported by said frame defining a main room including side walls, a ceiling and a floor, one of said sidewalls defining an opening for slidably receiving a slide-out room mounted for movement through the opening between a retracted position retracted into the main room and an extended position extended from the main room to provide an auxiliary living area, said lifting mechanism comprising a lever mechanism, pivotable relative to said main room, and a roller mechanism, having a first position and a second position, where said second position has a vertical component higher than said first position, said lever mechanism being responsive to the movement of said slide-out room, causing said roller mechanism to move to said second position, whereby said slide-out room may retract with said slide-out room floor rolling against said roller mechanism.

23. The mobile living quarters of claim 22, further including a ramp including an aperture therethrough, and at least a portion of said lever mechanism projects upwardly through said aperture.

24. The mobile living quarters of claim 23, wherein said roller mechanism is mounted to said lever mechanism, and said lever mechanism is pivoted in response to inward movement of the room, to move said roller mechanism to said second position, whereby said slide-out room floor is raised by said roller mechanism.

25. The mobile living quarters of claim 24, wherein said lever mechanism is pivoted in response to engagement of said slide-out room floor with said roller mechanism.

26. The mobile living quarters of claim 25, wherein said lifting mechanism further comprises a contoured ramp positioned intermediate said roller mechanism and said opening, when said slide-out room is in the extended position, and said roller mechanism is caused to roll up said contoured ramp upon retraction of said slide-out room.

27. The mobile living quarters of claim 26, wherein said lever mechanism is movable to an over center position, whereby said slide-out room floor is maintained at said second position above said main room floor.

28. The mobile living quarters of claim 27, wherein said lever mechanism is comprised of a pair of levers and said roller mechanism is mounted between said pair of levers by way of an axle.

29. The mobile living quarters of claim 28, wherein said lever mechanism is spring loaded to position said roller mechanism in said first position.

30. The mobile living quarters of claim 29, wherein said lever mechanism includes end plates having receiving areas for receiving said axle when in the over center position.

31. The mobile living quarters of claim 24, wherein said lever mechanism is rotated in response to engagement by an actuator attached to said out room.

32. The mobile living quarters of claim 22, wherein said lever mechanism is pivot mounted relative to said main room, and has a lever arm extending outwardly, with a free end pad for contacting an actuating surface of said slide-out room, and said lever mechanism is spring loaded upwardly, at a position intermediate a pivot position and the free end pad, whereby when said slide-out room is retracted initially, the weight of said slide-out room is transferred off of said free end pad, and said lever mechanism is spring loaded upwardly moving said roller mechanism and said slide-out room vertically upwardly.

33. The mobile living quarters of claim 32, wherein said roller mechanism is attached to said lever mechanism.

34. The mobile living quarters of claim 33, wherein said roller mechanism rolls independently of said lever mechanism.

* * * * *